(12) United States Patent
Nguyen

(10) Patent No.: US 11,277,520 B1
(45) Date of Patent: Mar. 15, 2022

(54) COMMUNICATION USING COMMUNICATION TOKENS, SUCH AS QR CODES

(71) Applicant: William H. Nguyen, San Jose, CA (US)

(72) Inventor: William H. Nguyen, San Jose, CA (US)

( * ) Notice: Subject to any disclaimer, the term of this patent is extended or adjusted under 35 U.S.C. 154(b) by 61 days.

(21) Appl. No.: 16/937,028

(22) Filed: Jul. 23, 2020

Related U.S. Application Data

(60) Provisional application No. 62/944,493, filed on Dec. 6, 2019, provisional application No. 62/877,454, filed on Jul. 23, 2019.

(51) Int. Cl.
| | |
|---|---|
| *H04M 7/06* | (2006.01) |
| *H04M 7/00* | (2006.01) |
| *H04L 61/5007* | (2022.01) |

(52) U.S. Cl.
CPC ...... *H04M 7/0066* (2013.01); *H04L 61/2007* (2013.01)

(58) Field of Classification Search
CPC .................. H04M 7/0066; H04L 61/2007
See application file for complete search history.

(56) References Cited

U.S. PATENT DOCUMENTS

| | | | | |
|---|---|---|---|---|
| 2006/0020684 | A1* | 1/2006 | Mukherjee | H04L 67/2804 709/219 |
| 2019/0297122 | A1* | 9/2019 | Harrison | G06F 21/10 |
| 2019/0347426 | A1* | 11/2019 | Coffing | G06F 21/60 |
| 2019/0386981 | A1* | 12/2019 | Ramesh Kumar | H04L 63/0853 |

* cited by examiner

*Primary Examiner* — Hashim S Bhatti
(74) *Attorney, Agent, or Firm* — Tue Ngyuen

(57) ABSTRACT

A VoIP communication service using communication tokens, such as QR codes, to identify the receivers can provide callers with the ability to communicate with the receivers using VoIP technology, without the need to pre-registering with the VoIP service provider that hosts the communication. The tokens can be customized by having a profile, which can include conditions imposed by the receivers on the callers. The tokens can be used in a call center to provide VoIP communication services.

19 Claims, 40 Drawing Sheets

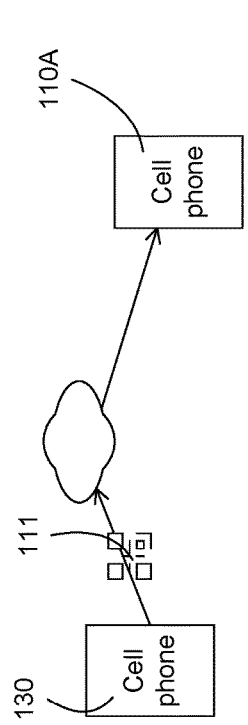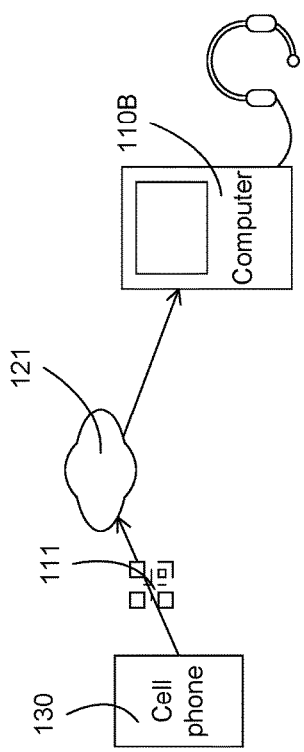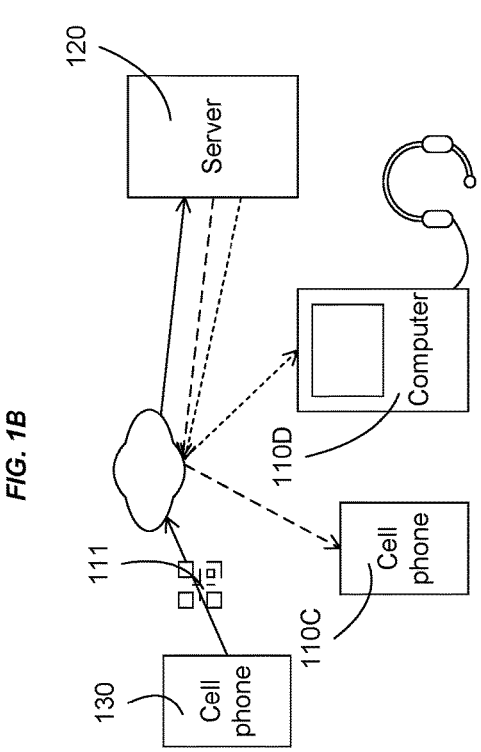

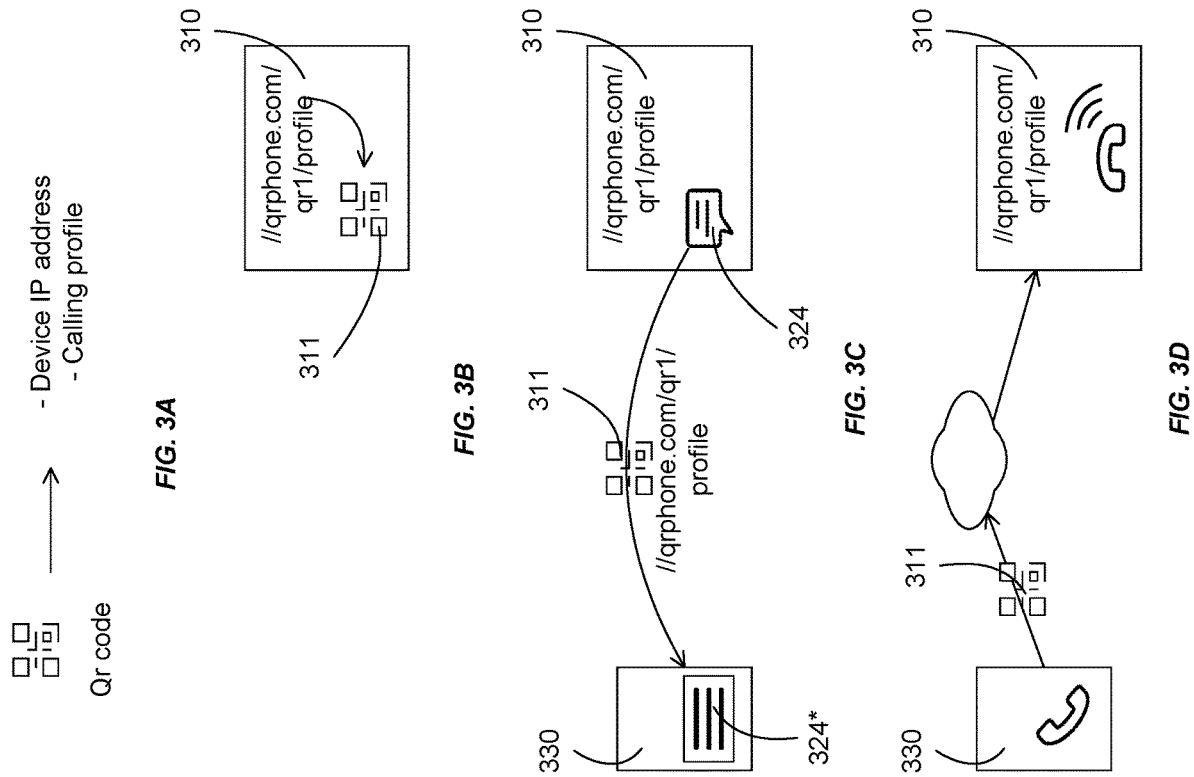

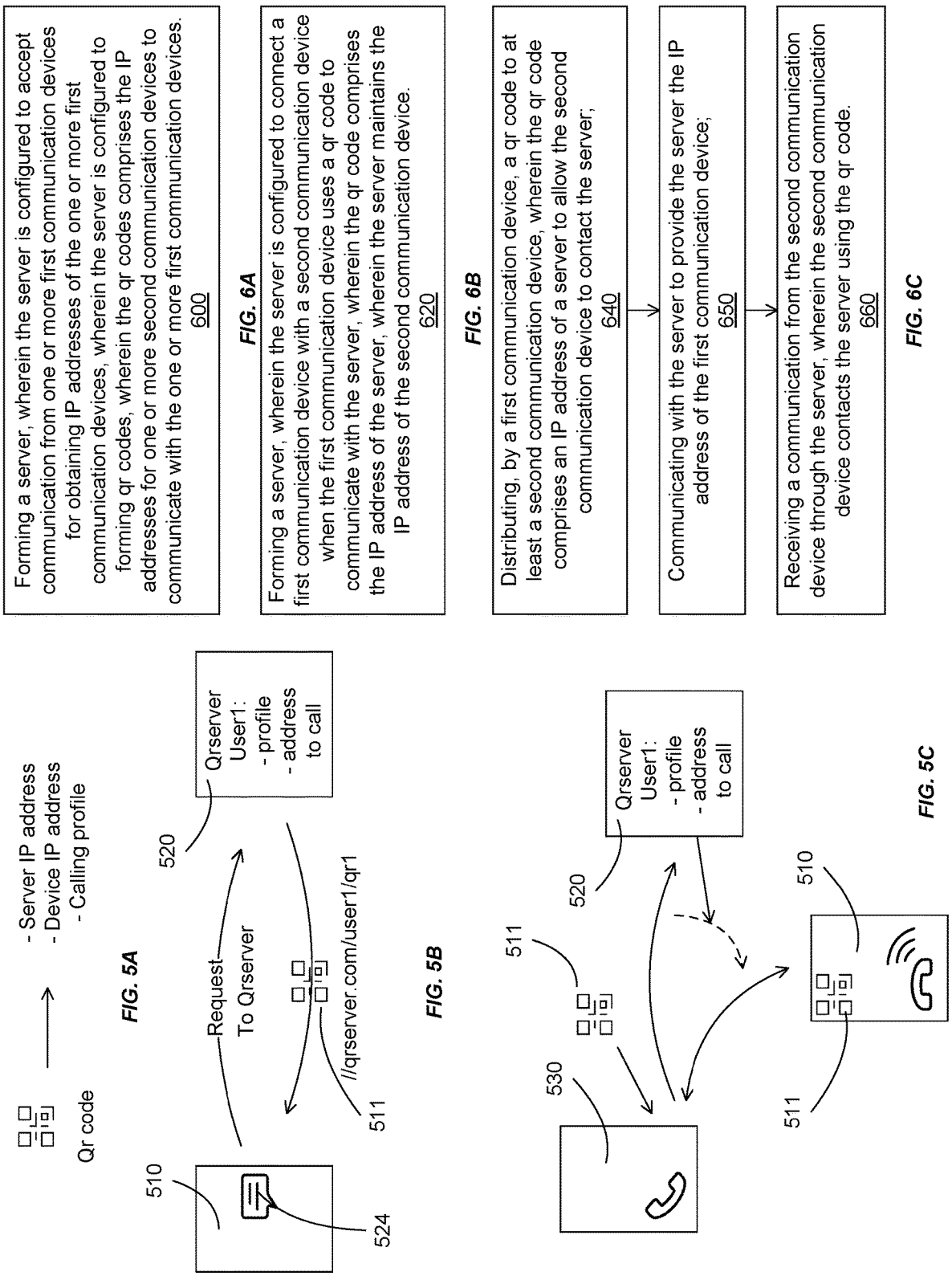

Forming, by a server, a qr code for a first communication device, wherein forming the qr code comprises storing an IP address of the first communication device;
700

Receiving a communication from a second communication device using the qr code;
710

Connecting the second communication device with the first communication device using the IP address.
720

FIG. 7A

Requesting, by a first communication device, a qr code from a server, wherein requesting the qr code comprises providing an IP address of the first communication device to the server;
740

Receiving a communication from a second communication device, wherein the second communication device contacts the first communication device by using the qr code to contact the server.
750

FIG. 7B

Obtaining, by a first communication device, a qr code for contacting a second communication device;
770

Using the qr code to connect with a server, wherein the server establishes a connection between the first and second communication device.
780

FIG. 7C

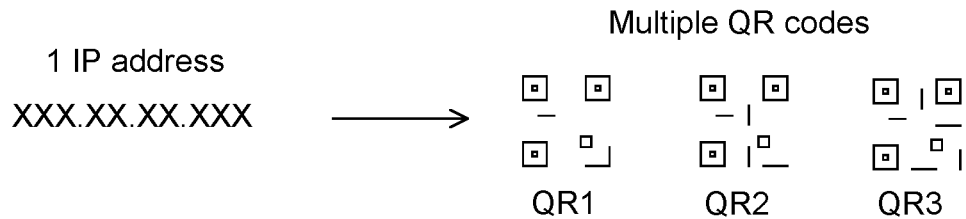

FIG. 9A

| Profile | QR1 | QR2 | QR3 |
|---|---|---|---|
| - Status | - Active | - Active | - Active |
| - Outgoing message | - | - | - Key message |
| - Expiration date | - 2020-06-10 | - | - |
| - Available time | - 6pm – 10pm | - 8am – 6pm | - |
| - Call duration | - 10 minutes | - 10 minutes | - |
| - Number of calls | - Unlimited | - Unlimited | - 1 |
| - Users to call | - Self | - Self, User 1 | - Server |
| - Multiple call property | - | - Sequential | - |
| - Conference call | - | - | - |
| - File to get | - | - | - |
| - Password | - | - | - |
| - Phone number | - | - | - |

| Profile | QR4 | QR5 | QR6 |
|---|---|---|---|
| - Status | - Active | - Active | - Active |
| - Outgoing message | - | - | - |
| - Expiration date | - | - | - |
| - Available time | - | - | - |
| - Call duration | - | - | - |
| - Number of calls | - Unlimited | - 1 | - 1 |
| - Users to call | - Self, User 2 | - Self | - Server |
| - Multiple call property | - | - | - |
| - Conference call | - | - | - |
| - File to get | - | - | - NDA |
| - Password | - | - | - pass |
| - Phone number | - XXX.XX.XXXX- | - | - |

FIG. 9B

Forming a qr code, wherein the qr code comprises a link to a website, a link to a communication device, and a profile comprising characteristics or limitations to communicate with the communication device.
1300

*FIG. 13A*

Forming a qr code, wherein the qr code comprises a link to a website and characteristics or limitations to communicate with a communication device, wherein the website comprises a link to the communication device.
1320

*FIG. 13B*

Forming a qr code, wherein the qr code comprises a link to a website, wherein the website is configured to communicate with a communication device subjected to characteristics or limitations provided by the communication device.
1340

*FIG. 13C*

Forming a qr code, wherein the qr code is configured to provide communicate with a communication device subjected to characteristics or limitations,
wherein the characteristics or limitations comprises at least one of an outgoing message, an expiration date, an available time, a call duration, a number of calls, users to call, multiple call property, conference call, file to get, or phone number.
1360

*FIG. 13D*

Responding to a first communication device request using a qr code linked to a second communication device, wherein the respond is based on characteristics or limitations related to the qr code, wherein the respond comprises a communication with the first communication device or a connection of the first communication device with the second communication device using an IP address linked to the qr code.
1500

*FIG. 15A*

Receiving, by a server, a communication from a first communication device using a qr code linked to a second communication device;
1520

Obtaining characteristics or limitations related to the qr code;
1530

Based on the characteristics or limitations, communicating with the first communication device or connecting the first communication device with the second communication device using an IP address linked to the qr code.
1540

*FIG. 15B*

Offering access to a message, responding with a message, accepting a message, or connecting a first communication device to a second communication device, wherein the respond is based on characteristics or limitations related to a qr code provided by the first communication device.
1560

*FIG. 15C*

Receiving a request for communication connection from a first communication device using the qr code identifying a second and one or more third communication devices;
2200

Connecting the first communication device with the second and the one or more third communication devices using corresponding IP addresses based on the identification in the qr code.
2210

*FIG. 22A*

Receiving a request for communication connection from a first communication device using the qr code identifying a second and one or more third communication devices;
2230

Simultaneously or sequentially notifying the second and the one or more third communication devices using corresponding IP addresses based on the identification in the qr code;
2240

Connecting the first communication device with a communication device among the second and the one or more third communication devices that first corresponds to the request
2250

Stopping the notification of the remaining communication devices in the second and the one or more third communication devices.
2260

*FIG. 22B*

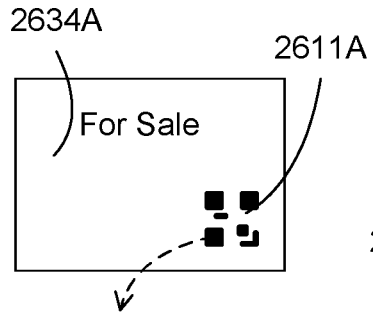
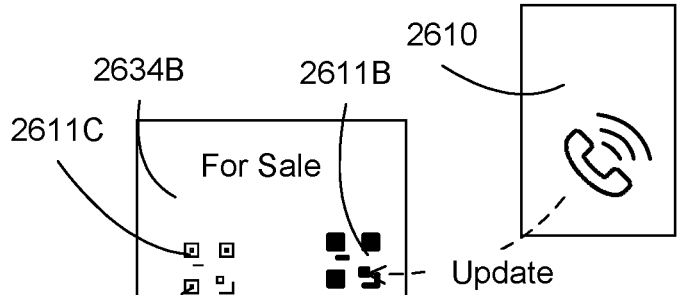
FIG. 26A
FIG. 26B
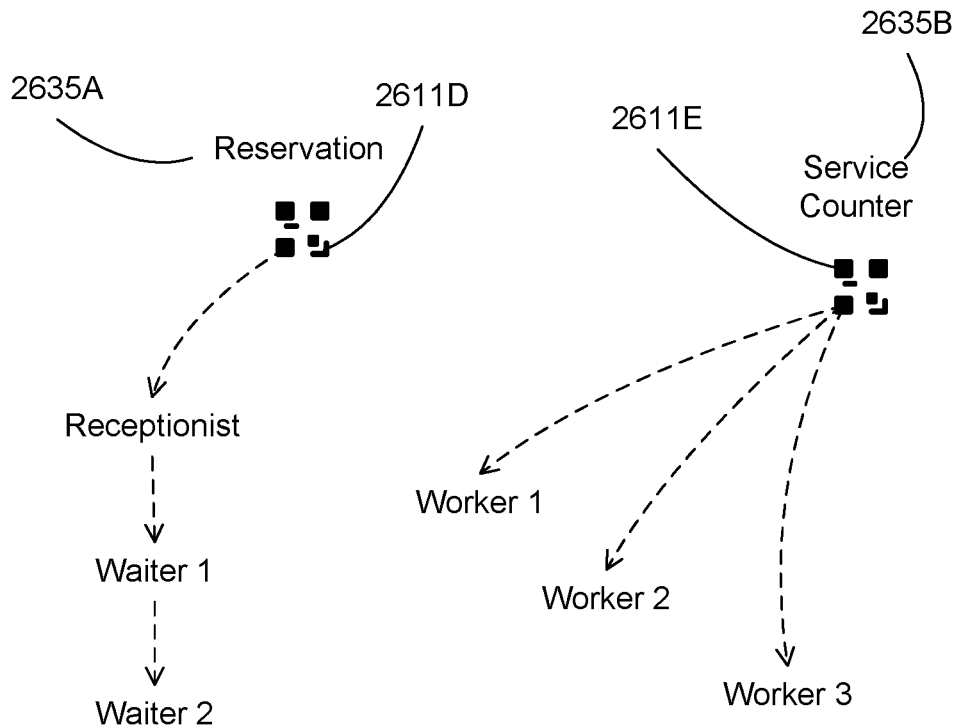
FIG. 26C
FIG. 26D

Forming a brochure for personal information, wherein the brochure comprises multiple qr codes for contact information and for additional information.
2700

FIG. 27A

Forming a brochure for selling an item, wherein the brochure comprises a qr code for callers with calling conditions and a qr code for getting information regarding the item.
2720

Updating the calling conditions when there is a change in the selling process.
2730

FIG. 27B

Listing a service, wherein the listing comprises a qr code for a caller to call, wherein the qr code is linked to multiple recipients, wherein the multiple recipients are configured to be called in series or in parallel until one of the multiple recipients answers the call
2750

FIG. 27C

Receiving, by a server, a call requesting a communication using a qr code from a first communication device;
3000

Responding based on the conditions and limitations of the qr code, wherein the response comprises one of connecting the first communication device to a second communication device, sending a message from the first communication device to the second communication device, or sending a message to the first communication device.
3010

*FIG. 30A*

Receiving, by a server, a message using a qr code from a first communication device;
3030

Sending the message to a second communication device based on limitations of the qr code, regardless of whether the qr code is for message or not .
3040

*FIG. 30B*

Receiving, by a server, a message using a qr code from a first communication device;
3060

Responding to the first communication device, wherein the respond comprises a menu of calling, messaging, emailing, or receiving a message.
3070

*FIG. 30C* company.com/1000
Customer #1000
FIG. 32A
company.com/europe
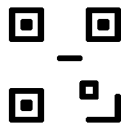
Europe
company.com/us
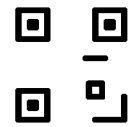
US
FIG. 32B
company.com/desktops
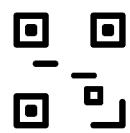
Desktops
company.com/laptops
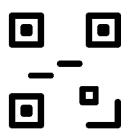
Laptops
company.com/
components
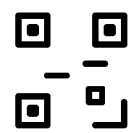
Components
FIG. 32C
company.com/sale
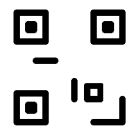
Sale
company.com/service
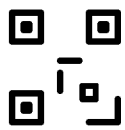
Service
company.com/support
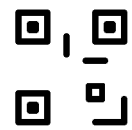
Support
FIG. 32D
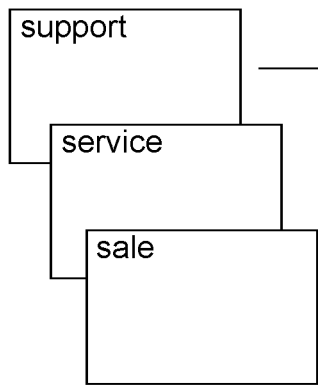
FIG. 32E
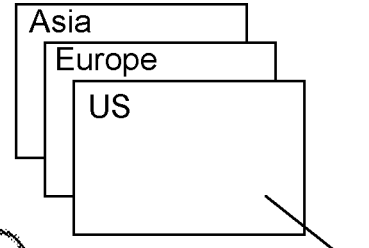
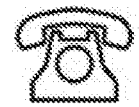
FIG. 32F

Forming a call center, wherein the call center comprises one or more servers configured to receive and process communication requests from callers using qr codes, wherein the call center comprises one or more operators configured to receive communication from the one or more servers to communicate with the callers, wherein the one or more server is configured to provide identification of the callers based on the qr codes for the one or more operators
3300

*FIG. 33A*

Forming a call center, wherein the call center comprises one or more servers configured to receive and process communication requests from callers using qr codes, wherein the call center comprises one or more operators configured to receive communication from the one or more servers to communicate with the callers, wherein the one or more server is configured to classify the callers based on the qr codes to distribute to the one or more operators
3320

*FIG. 33B*

Forming a call center, wherein the call center comprises one or more servers configured to receive and process communication requests from callers using qr codes, wherein the call center comprises one or more operators configured to receive communication from the one or more servers to communicate with the callers, wherein the one or more server is configured to distribute callers calling from different companies or from different departments or from different concerns to a same operator of the one or more operators
3340

*FIG. 33C*

```
┌─────────────────────────────────────────────┐
│ Providing a server, wherein the server      │
│ comprises a number of operators configured  │
│ to adequately respond to a number of        │
│ calls using qr codes;                       │
│ 3800                                        │
└─────────────────────────────────────────────┘
                      ↓
┌─────────────────────────────────────────────┐
│ Increasing the number of operators when     │
│ the number of calls increases to maintain   │
│ the adequacy of responses.                  │
│ 3810                                        │
└─────────────────────────────────────────────┘
```

*FIG. 38A*

```
┌─────────────────────────────────────────────┐
│ Providing a server, wherein the server      │
│ comprises a number of operators configured  │
│ to adequately respond to calls from         │
│ multiple companies or multiple departments  │
│ or multiple products using qr codes to      │
│ distinguish between the companies,          │
│ the departments, or the products;           │
│ 3830                                        │
└─────────────────────────────────────────────┘
                      ↓
┌─────────────────────────────────────────────┐
│ Increasing the number of operators when     │
│ the calls increases to maintain the         │
│ adequacy of responses.                      │
│ 3840                                        │
└─────────────────────────────────────────────┘
```

*FIG. 38B*

```
┌─────────────────────────────────────────────┐
│ Providing a call center for responding to   │
│ calls using qr codes, wherein the qr codes  │
│ are configured to allow the call center to  │
│ distinguish between multiple companies,     │
│ multiple departments, or multiple products, │
│ wherein the qr codes are configured to      │
│ allow a scalability of number of operators  │
│ with number of calls.                       │
│ 3860                                        │
└─────────────────────────────────────────────┘
```

*FIG. 38C*

Providing a server, wherein the server comprises one or more operators configured to respond to callers using qr codes;
3900

↓

Sending records of the callers to the one or more operators based on the qr codes.
3910

FIG. 39A

Providing a server, wherein the server comprises one or more operators configured to respond to callers from multiple companies or multiple departments or multiple products using qr codes to distinguish between the companies, the departments, or the products;
3930

↓

Sending records of the callers to the one or more operators based on the qr codes.
3940

FIG. 39B

Providing a call center for responding to calls using qr codes, wherein the qr codes are configured to allow the call center to distinguish between multiple companies, multiple departments, or multiple products, wherein the qr codes are configured to allow retrieval records of callers to provide to operators receiving the calls.
3960

FIG. 39C

Providing a server, wherein the server comprises one or more operators configured to respond to callers using qr codes;
4000

↓

Sending the callers to operators of the one or more operators with appropriate languages based on the qr codes.
4010

FIG. 40A

Providing a server, wherein the server comprises one or more operators configured to respond to callers from multiple regions or countries using qr codes to distinguish between the regions or the countries;
4030

↓

Sending the callers to operators of the one or more operators with appropriate languages based on the qr codes.
4040

FIG. 40B

Providing a call center for responding to calls using qr codes, wherein the qr codes are configured to allow the call center to distinguish between multiple regions or multiple countries, wherein the qr codes are configured to allow sending the callers to operators with appropriate languages.
4060

FIG. 40C

COMMUNICATION USING COMMUNICATION TOKENS, SUCH AS QR CODES

The present invention claims priority from U.S. Provisional Patent Application 62/877,454, filed on Jul. 23, 2019, and from U.S. Provisional Patent Application 62/944,493, filed on Dec. 6, 2019, hereby incorporated by reference in their entirety.

BACKGROUND

Voice over Internet Protocol (VoIP), also called IP telephony, is a method and group of technologies for communication, including text messages, voice communications and multimedia sessions, over Internet Protocol (IP) networks, such as the Internet. The VoIP service, e.g., Internet telephony, broadband telephony, and broadband phone service, refers to the provisioning of communications services (SMS, voice, fax, voice-messaging, file transfer) over the public Internet, rather than via the public switched telephone network (PSTN).

Voice over Internet Protocol technology (VoIP) provides a more cost effective way for communication than traditional public switch telephony network technology (PSTN). Both VoIP and PSTN require clients, e.g., caller and receiver parties, to register with the communication service provider before they can use the communication service. For example, in PSTN technology, all clients, after registered with the PSTN service provider, can be provided with a telephone number. The telephone number can allow the PSTN service provider to locate the caller and receiver parties, so that the PSTN service provider can connect the caller and receiver parties for a communication session.

Similarly, current VoIP systems, such as Skype, Viber, Messenger, and WeChat, also require both caller and receiver parties to register to the VoIP service providers to allow the VoIP service providers to locate the caller and receiver parties, so that communication data can be transferred between the parties.

The registration requirements for both caller and receiver parties can provide a significant barrier for VoIP communication, such as the ability to make a spontaneous VoIP connection between two or more parties. In contrast to PSTN technology, there is no sharing of registration data between different VoIP service providers, and thus a person would need to register to multiple VoIP service providers. Specifically, a caller would have to ask the receiver for the VoIP service provider that the receiver uses, and then register for the same VoIP service provider before starting a communication session with the receiver.

SUMMARY

In some embodiments, the present invention discloses a VoIP communication service, and elements and systems related to the method, in which a caller can call a receiver to communicate with the receiver using VoIP technology, without the need to pre-registering with the VoIP service provider that hosts the communication.

In some embodiments, the communication method can include a communication token, such as a QR code, which can be an element to identify the receiver, equivalent to a telephone number for the PSTN technology. The communication token can be configured to locate the receiver, such as by containing the IP address of the receiver, either directly, e.g., having the IP address embedded in the communication token, or indirectly, e.g., having a link to a server which stores the IP address. The caller then can use the communication token to directly contact the receiver, or to contact the server, which then can connect the caller with the receiver.

In some embodiments, the communication token can have a profile, which can include conditions imposed by the receiver on the caller. Unless the conditions are satisfied, the call from the caller using the communication token can be rejected. The profile can include response for rejection, such as a voice message or a text message, informing the caller of the reason for the non-connection.

In some embodiments, the present invention discloses a call center utilizing tokens, such as QR codes, as contact information. There can be a large number of QR codes, for example, one for each function, which can allow the call center to distinguish the clients based on the QR codes. The number of QR codes can be much larger than the available communication devices in the call center, e.g., larger than the number of operators of the call center, since multiple QR codes can be directed to a same communication device. The QR codes can be fully customizable for its destination, scanning limit, one-time calling validity, expiration date, call duration, and other communication purposes to ensure complete privacy control. For example, a classified advertisement can be posted with a time-limited QR code, which can allow contact from prospective buyers for a certain time only. Once the transaction is completed, the QR code can be expired and there will be no valid contact information in the QR code.

In some embodiments, the present invention discloses a VoIP service utilizing a distributed server network, e.g., a network of independent servers functioned to transfer communication data between the callers and the receivers.

BRIEF DESCRIPTION OF THE DRAWINGS

FIGS. 1A-1C illustrate communication configurations according to some embodiments.

FIGS. 2A-2D illustrate flow charts for communication configurations according to some embodiments.

FIGS. 3A-3D illustrate communication configurations according to some embodiments.

FIGS. 4A-4C illustrate flow charts for a communication configuration according to some embodiments.

FIGS. 5A-5C illustrate communication configurations according to some embodiments.

FIGS. 6A-6C illustrate flow charts for a communication configuration according to some embodiments.

FIGS. 7A-7C illustrate flow charts for a communication configuration according to some embodiments.

FIGS. 9A-9B illustrate communication tokens according to some embodiments.

FIGS. 13A-13D illustrate flow charts for QR code token configurations according to some embodiments.

FIGS. 15A-15C illustrate flow charts for communication operations according to some embodiments.

FIGS. 22A-22B illustrate flow charts for communication according to some embodiments.

FIGS. 26A-26D illustrate applications of the communication according to some embodiments.

FIGS. 27A-27C illustrate flow charts for communication according to some embodiments.

FIGS. 30A-30C illustrate flow charts for communication according to some embodiments.

FIGS. 32A-32F illustrate a scheme for the call center according to some embodiments.

FIGS. 33A-33C illustrate flow charts for communication according to some embodiments.

FIGS. 38A-38C illustrate flow charts for communication according to some embodiments.

FIGS. 39A-39C illustrate flow charts for communication according to some embodiments.

FIGS. 40A-40C illustrate flow charts for communication according to some embodiments.

DETAILED DESCRIPTION OF THE EMBODIMENTS

Figure 8:
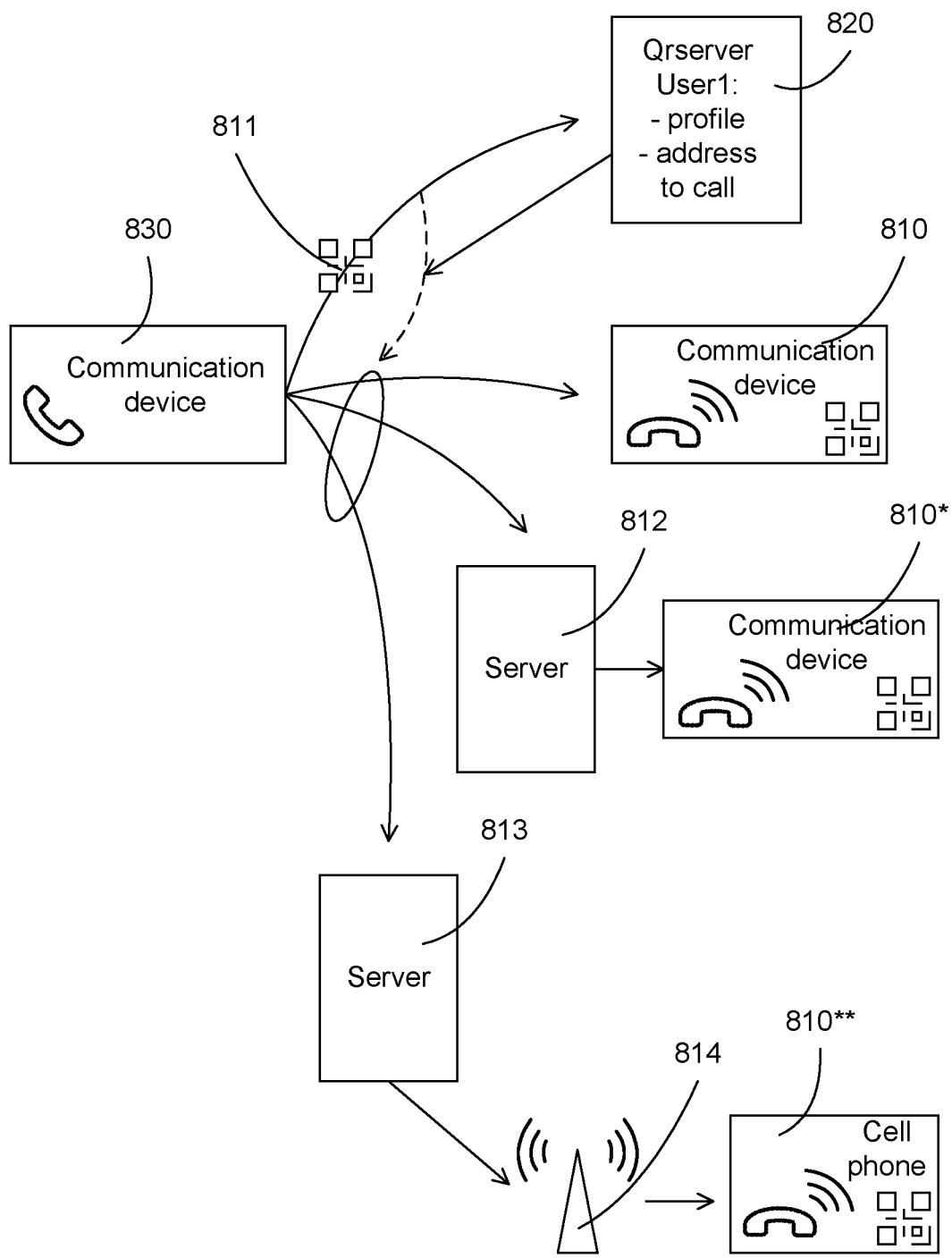
FIG. 8 illustrates a communication method according to some embodiments.

In some embodiments, the present invention discloses a communication method, such a VoIP communication service, and elements and systems related to the method, in which a caller can call a receiver to communicate with the receiver using VoIP technology, e.g., through the Internet, without the need to pre-registering with the VoIP service provider that hosts the communication.

The communication over the Internet, e.g., the VoIP communication, can be considered as a transfer of data over the Internet network. Thus, the caller can use any application, such as a browse, to be connected to the Internet to perform the communication, together with analog-to-digital (A/D) modules to convert the analog signal of voice and images to a data file to be sent through the Internet network. The analog-to-digital modules, such as a microphone, a speaker, a camera, and appropriate A/D components, and the browser can be readily available in a communication device, such as in a mobile device, e.g., a cellular phone, or in a data processing device, e.g., a computer, or any device having a processor, a memory, and communication peripherals. Thus, the communication method can allow a caller using a communication device to spontaneously call a receiver party through the Internet network, e.g., without first asking and then joining the VoIP service of the receiver party.

In some embodiments, the communication method can include a communication token, which can be an element to identify the receiver, equivalent to a telephone number for the PSTN technology. The communication token can be a string of alphanumeric characters, which can be linked to an icon in the caller communication device. The caller then can type the string of alphanumeric characters, or can press the icon which represents the alphanumeric characters. The string of alphanumeric characters can be embedded in a machine-readable optical label such as a barcode, including a two-dimensional barcode or a Quick Response (QR) code. The caller can scan the optical label code, for example, using a scanner application in a mobile phone. The caller can access the communication token using an Internet application, such as using a browse.

For example, the caller can open a browser, such as Firefox or Google Chrome, and enter the string of alphanumeric characters of the communication token representing the receiver party. Alternatively, the caller can scan the machine-readable optical label having the string of alphanumeric characters embedded therein. The scan application can automatically launch a browser application with the string of alphanumeric characters. Alternatively, the caller can assist in launching the browser application after scanning the machine-readable optical label.

For the caller to communicate with the receiver by using the communication token, the communication token can be configured to locate the receiver, such as by containing the network address of the receiver, either directly, e.g., having the network address embedded in the communication token, or indirectly, e.g., the communication token containing a link to a location having the network address.

In some embodiments, the communication token can include the network address of the receiver. For example, the network address can be the Internet Protocol (IP) address, or Internet address, including the port number. When the communication device of the receiver is connected to the Internet, the communication device can be assigned an Internet address, and a port number, if the communication device is connected to the Internet through a Local Area Network (LAN). This Internet address can be embedded in the communication token. Thus, when a caller launches a browser using the communication token as an argument, the browser can locate the receiver, for example, by extracting the Internet address of the receiver in the communication token.

In some embodiments, the IP address of the receiver can be a static address, e.g., does not change after the receiver communication device is disconnected from the Internet network.

In some embodiments, the Internet address of the receiver can be a domain name, e.g., the name of a website, or a Universal Resource Locator (URL), e.g., the complete web address used to find a particular web page. Through Domain Name Service (DNS), the domain name or the URL can be translated into an IP address. Thus, the receiver communication device can have a dynamic IP address, e.g., the address can change every time the device is connected to the Internet. The caller still can locate the receiver with the domain name or the URL, with DNS application running in the background to direct the caller to the current IP address of the receiver device.

In some embodiments, a receiver party can form a communication token, which contains the IP address of the communication device of the receiver. For example, the communication token can contain a URL, which is a complete IP address for a particular webpage of the receiver device. In the webpage, a program can be running so that when a caller access the webpage, a communication with the receiver can be initiated, such as a notification on a screen of the device or a ring tone on the device. The receiver can accept the call, and the communication session can start.

The receiver can distribute the communication token, such as send it to potential callers, or post it in an advertisement. A caller, desiring to contact the receiver, can access the communication token to communicate with the receiver.

In some embodiments, the communication token can include the network address of a server, e.g., a data processing device connected to the Internet. For example, the communication token can contain a URL, which is a complete IP address for a particular webpage of the server.

In operation, a receiver can register with the server, and can supply the IP address to the server. The receiver can then request the server to form a communication token for the receiver. The communication token can contain the URL of the server, dedicated to the receiver newly generated communication token. The communication token can contain a link to the IP address of the communication device of the receiver. The IP address of the receiver communication device can be constantly updated, such as updated when the receiver connects to an Internet network or to a LAN linked to an Internet network. Thus, the server can keep a current IP address of the receiver, which can allow the server to locate the receiver device when a caller communicate with the server using the communication token.

In the URL webpage of the server, a program can be running so that when a caller access the webpage, the server can use follow the link in the communication token to retrieve the IP address of the receiver device, and then can connect the caller with the receiver through the IP address of the receiver.

In some embodiments, the communication method only requires that the receiver prepares the communication device to accept calls, though the formation of communication token. Alternatively, the receiver can register with a server representing a VoIP service, to provide IP address and to receive communication tokens. The communication method does not require the caller to register with the VoIP service. The communication method only requires the caller to have a communication device, which can be trivial since the caller would need a communication device to communicate.

FIGS. 1A-1C illustrate communication configurations according to some embodiments. A receiver can generate a communication token, such as a QR code, which contains the IP address or a link to the IP address of the receiver. The generation of the QR code can be performed by a registration to a VoIP service by the receiver. The QR code can be used by any caller to communicate with the receiver. The caller does not need to register to the same VoIP service of the receiver to call.

In FIG. 1A, a receiver using a cell phone 110A can generate a QR code 111. A caller can use a cell phone 130 to call, using the QR code 111, to contact the receiver 110A, through the Internet 121, e.g., the communication between the caller 130 and the receiver 110A is a VoIP communication, e.g., communication data is sent and received through the Internet network.

In FIG. 1B, a caller can use a cell phone 130 to call, using the QR code 111, to contact the receiver using a communication device 110B such as a computer having a headset, through the Internet 121. Alternatively, the caller can use a computer, or any communication device to call.

In FIG. 1C, a receiver using a cell phone 110C or using a computer 110D can communicate with a server 120 to generate a QR code 111. The receiver can register with the server, and can supply IP address to the server. In some embodiments, the server can be a server for a VoIP service, which can service registered users with generating QR codes and with performing VoIP service.

A caller can use a cell phone 130 to call, using the QR code 111, to contact the receiver 110C or 110D, through the server 120. For example, the QR code can contain the webpage address, e.g., a URL configured for servicing the QR code 111. Thus, by using the QR code, the caller 130 can contact the server, for example, using the domain name or the website portion in the QR code.

Upon receiving the communication from the caller using the QR code, the server can look up for the IP address of the receiver, using the link embedded in the QR code. For example, the link in the QR code can be the webpage address, and the server can look at the webpage to find the IP address for the receiver. The server then can connect the caller 130 with the receiver 110C or 110D, so that the caller can communicate with the receiver.

The operation can be automatic, e.g., the server can have a program running, which can receive a communication data from the caller, automatically retrieve the IP address of the receiver from the webpage information in the QR code, and automatically connect the caller with the receiver.

In some embodiments, the QR code can have a profile, which can include conditions imposed by the receiver on the caller. For example, the profile can include a condition of not accepting calls after 10 pm. When a caller uses the QR code to call, the receiver or the server can verify the conditions listed in the QR code before connecting the caller with the receiver. For example, if the call occurs before 10 pm, the QR code condition is satisfied, and the caller can be connected with the receiver. If the call occurs after 10 pm, the call is rejected, e.g., not connected to the receiver. The profile can include response for rejection, such as a voice message or a text message, informing the caller of the reason for the non-connection. Alternatively, there can be no response, and the rejected call can be treated as not going through.

In some embodiments, the present invention discloses a communication method, and elements and systems related to the method, using a communication token, such as an access code, as identification. The communication method can include calling, sending a message, sending an email, chatting, acting to receive information, and other actions relating to communications. The communication token can be used as an identity of an entity, such as a person, a company, or a product, which can be changed or new communication tokens added by the entity. For example, the communication token can include a link to an IP address, to an email address, to a social media link such as a facebook page, to an Internet calling account such as a Viber, Skype, or messenger ID. The communication token can provide a large amount of information in a limited space, by carrying a link, for example, to a web page.

In some embodiments, the communication method can include reading a communication token, for example, by a caller communication device such as a mobile phone, to retrieve a link stored in the communication token. The communication device can access the link, for example, to retrieve the contact information, such as to obtain an identification of the receiver communication device, such as the IP address of the communication device. The caller communication device then can communicate through the identification of the receiver communication device to establish the communication. Information provided by the link, e.g., the identification, can be hidden to provide privacy. The identification can be Internet calling user name, such as a Viber ID, a Skype ID, a messenger ID, or an IP address, for calling using the Internet. The calls can be voice calls or video calls. Other communication processes can be used, such as texting or chatting, instead of calling. The link can be a link to a web page, and the information provided by the link can contain other data, in addition or instead of, the caller identification. For example, the web page can contain an email address, which can allow the communication device to send an email. The web page can contain files, which can allow the communication device to retrieve the files.

The communication tokens can provide an easy way to modify the owner identity, e.g., the receiver identity, such as modifying the identification of the receiver communication device, without the need to notify the persons having the communication tokens. For example, the data in the link provided by the communication tokens can be modified to reflect the change. Thus, when the communication tokens are accessed, the new identity, such as the new identification of the receiver communication device, can be represented.

The communication tokens can provide controllable privacy for the owners, such as to allow a caller to communicate with the owners, without exposing the identification of the owner. Thus, a caller can only call using the communication tokens without knowing the identification. Further, the communication tokens can be controlled by the owners, for example, the communication tokens can be invalidated, so that a caller cannot perform the call, even with the communication tokens.

The communication tokens can be subjected to restrictions imposed by the owner, thus an identity of an owner can be represented by multiple communication tokens, with each communication token having a different restriction. For example, a temporary communication can be generated by a communication token having an expiration date. The expiration restriction can provide privacy to the owner, so that the owner information, e.g., the owner identification, cannot be widely or publicly distributed. A working hour communication access can be generated by a communication token having restricted calling time. A hot line telephone access can be generated by a communication token having no restriction.

Further, the communication tokens can provide a scalable operation for an entity. For example, different communication tokens can be used to represent different sale and service regions, such as the US, Europe, or Asia. Different communication tokens can also be used to represent different operations, such as sale operation, service operation, or support operation. Different communication tokens can also be used to represent different products, such as desktop computers, laptop computers, or electronic components. For small companies, multiple communication tokens can be linked to a same receiver communication device, with the data from the communication tokens visible to allow identification of the caller purpose. With the growth of the companies, additional receiver communication devices can be added, and the data of the linkage of the communication tokens can be modified to reflect the new receiver communication devices.

The communication method can include using a mobile phone as a means to perform the communication. Other communication devices can also be used, such as a computer, a personal digital assistant (PDA), a telephone device such as a desk phone, a cell phone, a mobile device, a smart phone, or any communication devices capable of carrying the communication. In the following specification, a mobile phone is used in describing the communication method and elements and systems of the method, but the invention is not so restricted, and other communication devices can be used.

The communication method can use a communication token, such as a QR code (Quick Response code) as a user-controlled identity of entities. For example, a QR code can be linked to a communication device, e.g., the IP address of the device, and thus, by using the QR code, a caller communication device can establish a communication link with a receiver communication device by calling the linked IP address. Other communication tokens can be used, as long as the communication token can provide information, which can be read by a person or by a machine such as by the mobile phone equipped with a reader for reading the communication token. For example, the communication token can include a printed code such as a linear barcode such as a UPC barcode, or a matrix or two dimensional bar code such as a QR code, an Aztec code, or a Data Matrix code. The communication token can include an electronic device such as a Radio Frequency Identification (RFID), which can return information when being read. In the following specification, a QR code is used in describing the communication method and elements and systems of the method, but the invention is not so restricted, and other communication tokens can be used.

In some embodiments, the present invention discloses methods to extend the functionality of the QR codes. The QR codes can be used as contact information, for example, instead of telephone numbers or email addresses. The contact information utilizing QR codes can be customized with privacy controls.

In some embodiments, the communication method can use a QR code to establish the communication between two parties, such as between two cell phones. The method can include reading a QR code, for example, by a scanner. The QR code can already be stored in the cell phone, for example, in a contact page, listing a person name and an associated QR code as the means to communicate with the person. The QR code can be obtained by visiting a web site or a store showing the QR code. The scanner can be used to read the shown QR code in the web site or in the store. The QR code can be obtained by receiving a message or email containing the QR code.

After reading the QR code to obtain the information contained in the QR code, the communication device can then access the resource provided by the QR code information, such as connected to a web address. After connected to the web site, the person can decide on the modes of communication, such as selecting calling, sending a text, sending an email, or receiving a file.

The decision can be performed before reading the QR code. For example, the person can select calling when scanning the QR code. The communication device then can connect to the web site indicated by the link in the QR code, and automatically route the communication to the destination phone to establish a phone call.

FIGS. 2A-2D illustrate flow charts for communication configurations according to some embodiments. In FIG. 2A, operation 200 forms a communication token, such as a QR code, by a communication device of a receiver. The QR code can include the IP address of the communication device of the receiver, so that a communication device of a caller can contact and communicate with the receiver device using the QR code.

In FIG. 2B, operation 220 forms a QR code by a server. The QR code can include an IP address of a server, with a communication device of a receiver is configured to maintain constant communication with the server. The constant communication can provide the server with the IP address of the receiver device, to allow the server to contact the receiver device when the receiver device is connected to the network. A communication device of a caller can communicate with the server using the QR code for the server connecting the caller device with the receiver device.

In FIG. 2C, operation 240 communicates, by a caller communication device, with a receiver communication device using a QR code. The QR code can include an IP address of a receiver communication device, which can allow the caller communication device to locate the receiver communication device before connecting for communication.

In FIG. 2D, operation 260 communicates, by a caller communication device using a QR code, to a server. The QR code can include an IP address of the server, which can allow the caller device to communicate with the server using the QR code. A receiver communication device is configured to maintain constant communication with the server. The constant communication can provide the server with the IP address of the receiver device, to allow the server to contact the receiver device when the receiver device is connected to the network. The caller communication device communicates with the server using the QR code, with the server obtaining the IP address of the receiver device from the QR code, in order to connect the caller communication device with the receiver communication device.

In some embodiments, the communication method can include a receiver communication device generating a communication token, which can include the IP address of the receiver device. The communication token can enable a caller communication device to locate the receiver device using the communication token. The communication token can optionally include a profile, which can list conditions, e.g., limitations of the calls, and directions, e.g., what would happen if the call is rejected.

FIGS. 3A-3D illustrate communication configurations according to some embodiments. FIG. 3A shows a QR code, e.g., a communication token, which can provide information about a receiver device IP address, and optionally a calling profile for the QR code. The QR code can contain the information, or can contain a link showing where to get the information. For example, the QR code can include a receiver device IP address, and a link to a calling profile for the QR code. The receiver IP address can be used to locate the receiver device. And the calling profile can be used as conditions for the communication, e.g., the conditions listed in the calling profile have to be satisfied for the communication to take place. Further, the calling profile can include different scenarios for different conditions. For example, the conditions can include a number of times that the caller can call. If the condition is satisfied, the caller can communicate with the receiver. The profile can include directions when the condition is not satisfied. For example, if the number of calls exceeds the limit, the profile can provide an instruction of ignoring the caller. Alternatively, the profile can provide an instruction of a pre-recorded message, informing the caller that the QR code is no longer valid, or that the number of calls has exceeded the limit set by the receiver.

FIG. 3B shows a process of forming a QR code 311 by a receiver communication device 310. The QR code can include a receiver device IP address, and a link to a calling profile of the QR code. For example, the QR code 311 can include the receiver IP address of a website address, such as //qrphone.com. The QR code can include a link to a profile, such as a link to the webpage of the website that contains the profile, e.g., /qr1/profile which indicates the webpage of the profile for the QR code qr1.

FIG. 3C shows a process for a caller to obtain the QR code 311. The receiver communication device 310 can send the QR code 311 to a caller communication device 330, such as using a SMS process 324 to send a SMS message 324* to the caller device 330. Alternatively, the caller device can obtain the QR code by other means, such as by scanning the QR code in an advertisement brochure.

FIG. 3D shows a process for the caller device 330 to call the receiver device 310 using the QR code 311. The caller can use a browser to locate the webpage containing in the QR code. The webpage can contain a program, such as a script or an applet, to look for the conditions and directions in the profile, and then connect the caller with the receiver subjected to the conditions of the profile.

FIGS. 4A-4C illustrate flow charts for a communication configuration according to some embodiments. In FIG. 4A, operation 400 forms a receiver communication device. The receiver communication device can be configured to link to a network using an IP address. The receiver communication device can include a processor configured to forming a QR code. The QR code can include the IP address for a caller communication device to communicate with the receiver communication device.

In FIG. 4B, operation 420 forms a receiver communication device. The receiver communication device can be configured to link to a network using an IP address. The receiver communication device can include a processor configured to communicate with a caller communication device using a QR code. The QR code can include the IP address.

In FIG. 4C, operation 440 distributes, by a receiver communication device, a QR code to at least a caller communication device. The QR code can include an IP address of the receiver communication configured to allow the caller communication device to contact the receiver communication device. Operation 450 receives a communication from the caller communication device. The caller communication device contacts the receiver communication device by using the QR code.

In some embodiments, the communication method can include a network server, e.g., a data processing device having a network interface for connecting to a network, such as to an Internet network. The network server can be configured to generate a communication token, which can include the IP address of the network server and the IP address of the receiver device. The communication token can enable a caller communication device to communicate the receiver device using the communication token by going through the network server, which can locate the receiver device and connect the caller and receiver devices. The communication token can optionally include a profile, which can list conditions and directions for the communication process.

FIGS. 5A-5C illustrate communication configurations according to some embodiments. FIG. 5A shows a QR code, e.g., a communication token, which can provide information about a server IP address, a receiver device IP address, and optionally a calling profile for the QR code. The QR code can contain the information, or can contain a link showing where to get the information. For example, the QR code can include a server IP address, and a link to a receiver device IP address and a calling profile for the QR code. The server IP address can be used for the caller device to contact the server. The receiver IP address can be used to locate the receiver device by the server. And the calling profile can be used as conditions for the communication, and directions or guidance instructing the server about what to do if one of the conditions is not satisfied. For example, the conditions can include a flag indicating that the QR code is valid or not valid. If the condition is satisfied, e.g., the QR code is valid, the caller can communicate with the receiver. The profile can include directions or guidance when the condition is not satisfied. For example, if the QR code is not valid, the profile can provide an instruction of ignoring the caller, e.g., there is no answer to the request for communication from the caller. Alternatively, the profile can provide an instruction of a pre-recorded message, informing the caller that the QR code is not valid. The profile can also provide information for an alternative contact.

FIG. 5B shows a process of forming a QR code 511 by a network server 520. A receiver communication device 510 can send a request to the network server 520, for example, in the form of a text message or other means of communication. The receiver communication device 510 can also provide its IP address, and optionally a profile for the QR code. The IP address can be obtained by the network server, for example, after an agreement by the receiver communication device 510. The profile can be presented by the server, for example, in the form of a fill in questionnaire, for the receiver communication device 510 to enter.

In some embodiments, the network server can operate as a VoIP service provider, e.g., providing communication services using VoIP technology, including all forms of communication such as voice communication, text or message communication, video communication, fax communication, email communication, and file sending and retrieval communication.

The receiver communication device 510 can register with the network server, e.g., register with the VoIP service that the network server represents. During the registration, the receiver communication device 510 can agree to allow the network server to obtain and track the IP address of the receiver communication device 510. For example, every time the receiver communication device 510 is connected to the network, e.g., the Internet, the server can query and obtain the IP address of the receiver communication device 510 for the current Internet connection. Thus, the server can know the IP address of the receiver communication device 510 if or when the receiver communication device 510 is connected to the Internet.

After the registration, the receiver communication device 510 can log in to the VoIP service, and request for QR codes, e.g., communication tokens that allow caller communication devices to communicate with the receiver communication device 510. Since the server already knows the IP address of the receiver communication device 510, due to the registration and log in processes, the receiver communication device 510 only need to supply or fill in the form for the optional profiles.

After receiving the request for a QR code from the receiver communication device 510, the server 520 can generate the QR code. The QR code can include the IP address of the server, such as the website of the server, e.g., //qrserver.com. The QR code can contain a link to the IP address and a link to the profile generated by the receiver communication device 510. The QR code can contain a complete webpage, such as //qrserver.com/user1/qr1, which provides IP address of the receiver 510 through the argument "user1", and the profile of the QR code through the argument "qr1".

After generating the QR code, the server 520 can send the QR code to the receiver communication device 510, for example, in a form of a text message 524. The receiver can distribute the QR code to callers, e.g., to persons who would be interested in calling the receiver.

FIG. 5C shows a process for the caller device 530 to call the receiver device 510 using the QR code 511. The caller can use a browser to locate the webpage containing in the QR code. The webpage directs the caller to the server 520, e.g., to a webpage of the server 520. The webpage can contain a program, such as a script or an applet, to look for the IP address of the receiver device 510, and optionally the conditions and directions and guidance in the profile. The server then connects the caller with the receiver subjected to the conditions of the profile.

FIGS. 6A-6C illustrate flow charts for a communication configuration according to some embodiments. In FIG. 6A, operation 600 forms a server. The server can be configured to accept communication from one or more receiver communication devices for obtaining IP addresses of the one or more receiver communication devices. The server can be configured to forming QR codes. The QR codes can include the IP addresses for one or more caller communication devices to communicate with the one or more receiver communication devices.

In FIG. 6B, operation 620 forms a server. The server can be configured to connect a caller communication device with a receiver communication device when the caller communication device uses a QR code to communicate with the server. The QR code can include the IP address of the server. The server maintains the IP address of the receiver communication device.

In FIG. 6C, operation 640 distributes, by a receiver communication device, a QR code to at least a caller communication device. The QR code can include an IP address of a server to allow the caller communication device to contact the server. Operation 650 communicates with the server to provide the server the IP address of the receiver communication device. Operation 660 receives a communication from the caller communication device through the server. The caller communication device contacts the server using the QR code.

FIGS. 7A-7C illustrate flow charts for a communication configuration according to some embodiments. In FIG. 7A, operation 700 forms, by a server, a QR code for a receiver communication device, with the QR code including an IP address of the receiver communication device. The receiver communication device then can distribute the QR code to one or more caller communication devices. Operation 710 receives a communication from a second communication device using the QR code. Operation 720 connects the second communication device with the first communication device using the IP address.

In FIG. 7B, operation 740 requests, by a receiver communication device, a QR code from a server. The receiver communication device provides an IP address of the receiver communication device to the server. Operation 750 receives a communication from a caller communication device. The caller communication device contacts the receiver communication device by using the QR code to contact the server.

In FIG. 7C, operation 760 obtains, by a caller communication device, a QR code for contacting a receiver communication device. Operation 770 uses the QR code to connect with a server. The server establishes a connection between the caller and receiver communication device.

In some embodiments, the caller and receiver communication devices can include a data processing system, such as a computer or a mobile device, including a cellular phone. The QR code can include a profile. The server then can connect the receiver communication device with the caller communication device if the caller communication satisfies the conditions in the profile of the QR code.

In some embodiments, the communication method can include VoIP communication, e.g., voice, text, video, fax, email, file transfer communication through the Internet network. The communication can include a cellular gateway to allow a connection from the Internet network to a cellular network.

FIG. 8 illustrates a communication method according to some embodiments. A caller communication device 820 can communicate with a receiver communication device 810, 810*, or 810* by using a communication token, such as a QR code 811. The caller does not need to sign up for any VoIP service, such as to the same VoIP service that hosts the receiver devices. The caller only needs a network interface for connecting to the Internet network. The caller also needs a communication interface, such as a headset, a camera, and a display. All of the requirements for the caller can be included in a communication device, such as a computer or a mobile device, such as a laptop or a cellular phone.

The caller 830 can communicate, for example, by calling, a receiver using a QR code, which serves as an identification of the receiver communication device. For example, the caller can open a browser and access the content of the QR code. The QR code contains a webpage of a server 820, and by accessing the webpage, it triggers a set of operations in the server 820. For example, the server can retrieve the IP address of the receiver based on the QR code, e.g., based on the webpage. The server can also retrieve the profile, if there is one, which has been set up by the receiver when the QR code is formed. The server can verify the conditions in the profile, and if the conditions are satisfied, the server can connect the caller with the receiver. For example, the server can connect the caller directly to the receiver, e.g., the communication data can go directly between the caller and the receiver, without passing through the server. The server can forward the communication data between the caller and the receiver. For example, the communication data from the caller can be received by the server, and then the server sends the received communication data to the receiver.

In some embodiments, there can be no installation of software or program in the caller device and the receiver device. Since the caller and receiver devices are communication devices, the communication can occur using built in Internet connection and communication interfaces such as microphone, speaker, display, and camera.

After verifying the conditions in the profile, the server can connect the caller with the receiver. The receiver communication device 810 can be a mobile device, such as a mobile phone, that connects directly to the Internet. The receiver communication device 810* can be a mobile device that connects to the Internet through a server 812, e.g., through a local area network servicing by the server 812. The receiver communication device 810* can be a cellular phone, which is connected to the Internet through a gateway 813, e.g., a server transferring the VoIP communication into cellular signal.

In some embodiments, the communication can be through multiple networks, such as through a cellular network or through a local area network, in addition to the VoIP network. A caller communication device can use a QR code to perform a communication, such as calling, messaging, or emailing A caller communication device, such as a cell phone, can start a call by first reading a QR code. There can be multiple icons in the caller communication device, and the caller can select the call icon to start the call. The QR code can be scanned by a scanner of the communication device, or the QR code can be stored or sent to the communication device. The communication device can then access the web address stored in the QR code. After accessing the web site hosted by a server, the server can direct the communication device to the receiver communication device, such as a cell phone or a desk phone, through a gateway to a cellular network. For example, the server can send calling information, such as the telephone number of the receiver device, to the caller communication device so that the caller communication device can call the receiver device though the cellular network.

The caller can select other icons, such as the message icon, compose the message and then start reading the QR code for sending the message. Alternatively, the caller can compose the message after reading the QR code and before access the web address. For example, the caller communication device can access the web address with an argument containing the message. Thus, after connected with the server and receiving receiver device information, the message can be sent to the receiver device through a gateway to the cellular network.

In some embodiments, the method of using QR codes for communication can provide flexibility and privacy to the owners of the QR codes, e.g., the receivers of the communication provided by the communication token, through controlled access to the functionalities of the QR codes. For example, the owners can give out QR codes as the contact means for communication with the owners, without concern about future changes or distribution abuse. The contact means can be easily changed, without the need to inform the persons having the QR codes. The contact means can also be easily terminated, for example, when the need for communication no longer exists.

In some embodiments, a QR code can contain a web address, such as a URL. The communication device then can access the web page at the web address provided by the QR code to obtain contact information. Thus, the contact information can be easily changed or deleted by modifying the contact information in the web page. Further, restrictions can be imposed on the contact information, for example, through a profile. For example, the profile can contain restrictions such as the status of the QR code, the outgoing message, the expiration date, the available time for communication, in addition to the contact information. Access to the web page can be restricted, e.g., the restriction profile can be hidden from outsiders to preserve privacy.

In some embodiments, a receiver can have multiple communication tokens. For example, all tokens can have the server IP address. Some tokens can have a link to the receiver IP address to allow the caller to contact the receiver. Some tokens can have a link to another receiver IP address, e.g., to a receiver different from the one setting up the tokens, to allow the caller to contact the other receiver. Some tokens can have different profiles, so that different tokens can be used to serve different purposes.

In some embodiments, the communication token can be set up with a profile, which can provide conditions for the communication. The profile can reside in the server, e.g., in the VoIP service server, which can verify the conditions in the profile after receive a communication from a caller using the token. The profile can reside in the receiver, which can verify the conditions in the profile after being connected with the caller by the server. The profile can allow the communication to be terminated, e.g., when the conditions are not met. The profile can also provide resolution, e.g., solutions of how to treat the communication request from the caller, if the communication does not meet the conditions provide in the profile.

FIGS. 9A-9B illustrate communication tokens according to some embodiments. In FIG. 9A, a receiver can have multiple tokens, e.g., QR codes. The QR codes can all be linked to the receiver communication device, e.g., linked to the IP address of the receiver communication device. By linking same contact information to multiple QR codes in the web pages that the QR codes are linked to, multiple QR codes can contain or represented by same contact information. Thus, when a caller uses the QR tokens, the communication will be between the caller and the receiver. Alternatively, the receiver can form, or can have a token formed, using another receiver IP address. Thus, when a caller uses the QR token, the communication will be between the caller and the other receiver. For example, a person can form a token using the IP address of a secretary communication device, so that communication can go to the secretary.

The access control can be imposed on the QR codes. For example, a QR code can contain a link to a web address. The web address can be the address of a web page, which contain the contact information, such as the receiver identity, or the email address. The contact information can be encrypted or hidden, so that a person having the QR code cannot access the contact information.

The QR code can contain a link to a web address, together with one or more arguments. The arguments can serve as restrictions or limitations to the QR code. For example, a QR code can be calling QR code, meaning the arguments of the QR code can specify that access the web page automatically launch the communication device into a calling mode. Different arguments can generate different QR codes, such as texting QR code or emailing QR code. Thus, by scanning a calling QR code, the communication device has selected to perform a call using the QR code.

FIG. 9B shows examples of different profiles for the tokens. The number of QR codes for a contact information, e.g., to a receiver communication device such as the IP address of the device, can be unlimited, e.g., new QR codes can be added at any time. Further, the number of active QR codes can be controllable, for example, by invalidate old QR codes.

A QR code can be invalidated by setting the expiration date in the QR code profiles, or by setting the status of the QR codes to be inactive. Thus, privacy can be preserved, and unnecessary calls, messages, or emails can be avoided. For example, a person can generate an advertisement using a QR code as the contact information. After the need is fulfilled, the QR code can be invalidated, for example, by changing the status to inactive or to set the expiration date.

For example, a token can have a status flag, which can indicate that the token is active, e.g., valid and can be used for communication with the receiver, or inactive, e.g., invalid and cannot be used for communication with the receiver. After receiving a communication from a caller using a token, the server can check the status flag to see if the token is valid or not. If the status flag is invalid, it means the token is not valid, and the communication from the caller is rejected.

The profile can include directions for treating the communication from the caller if the token is invalid. For example, if the token is invalid, the server can do nothing, e.g., ignoring the call. Alternatively, the server can give the caller a message, saying that the token is not valid. The message can also explain the reason for the invalidity of the token, and can provide means or ways for the caller to obtain an alternative solution.

Alternatively, the person can set the expiration date, for example, when generating an advertisement for selling an item, such as allowing one or two weeks for the advertisement. The QR code thus can have an expected future expiration date. Other restrictions can be added, such as a limited calling time for sale and marketing purpose, a longer calling time for home use, an unlimited calling time for emergency purpose. The duration of the call can also be specified.

For example, a token can have an expiration date, which can indicate that the token is active before the expiration date, and inactive after the expiration date. On the expiration date, the token can be active, or can be inactive, depending on the setting of the receiver. After receiving a communication from a caller using a token, the server can check the date of the call and the expiration date to see if the call is earlier or later than the expiration date. If the call is later than the expiration date, it means the token is not valid, and the communication from the caller is rejected.

The profile can include directions for treating the communication from the caller if the call is after the expiration date. For example, if the call is after the expiration date, the server can do nothing, e.g., ignoring the call. Alternatively, the server can give the caller a message, saying that the token is expired. The message can also explain the reason for the expiration date, and can provide means or ways for the caller to obtain an alternative solution.

A token can have an available time to call, which can indicate that the token is active during the available time, and inactive outside the available time. After receiving a communication from a caller using a token, the server can check the time of the call and the available time to see if the call is within or outside of the available time. If the call is outside of the available time, it means the token is not valid, and the communication from the caller is rejected.

The profile can include directions for treating the communication from the caller if the call is outside of the available time. For example, if the call is outside of the available time, the server can do nothing, e.g., ignoring the call. Alternatively, the server can give the caller a message, saying that the receiver is unavailable, and please call back during the available time.

A token can have a call duration, which can indicate the time for the call. After the connection is started between the caller and the receiver, the server or the receiver device can check the duration of the call, and terminate the connection after the call duration time.

The profile can include directions for treating the communication from the caller after the call is terminated. For example, the server can do nothing, e.g., simply terminating the call after the call duration set up in the profile. Alternatively, the server can give the caller a message, saying that the receiver is unavailable.

A token can have a maximum number of call flag, which can indicate that the caller can only call the receiver up to the maximum number of times. After receiving a communication from a caller using a token, the server can record the number of times the caller has been calling the receiver. If the number of calls is more than the maximum number, it means the token is not valid, and the communication from the caller is rejected.

The profile can include directions for treating the communication from the caller if the number of calls is larger than the maximum number. For example, if the number of calls is larger than the maximum number, the server can do nothing, e.g., ignoring the call. Alternatively, the server can give the caller a message, saying that the receiver is unavailable, or that the token is no longer valid.

A token can have a list of receivers, which can indicate the recipients that the server can connect for communicating with the caller. The multiple receiver property can include a flag, indicating the manner of the multiple receivers, such as parallel ringing, sequential (or serial) ringing, or conference call.

If the multiple receiver flag indicates a conference call, all receivers are connected, after the server verifies that other conditions in the profile are met.

If the multiple receiver flag indicates a parallel ringing, the server can attempt to communicate with all receivers at a same time. For example, the server can provide a ring tone to all receivers. When one receiver of the ringed receivers answers, the server can connect the caller with the answered receiver, and stop the ringing on other receivers. The connection with the answered receiver is also subjected to other conditions in the profile.

If the multiple receiver flag indicates a sequential or serial ringing, the server can attempt to communicate with one receiver at a time, until one receiver answers the call. For example, the server can provide a ring tone to a first receiver. After a certain time, such as 10, 20, 30, 40, or 50 seconds, the server can provide a ring tone to a second receiver, and stop the ring tone on the first receiver. The process is continued until one receiver answers. If the last receiver in the list does not answer, the server can return to the first receiver in the list, or the server can stop the call from the caller.

A token can have an outgoing message or a file to send to the caller. After receiving a communication from a caller using a token, the server can send the outgoing message or the file to the caller. Alternatively, the server can provide a link to the caller for the caller to retrieve the message or the file.

A token can have a provision to accept a file from the caller. After receiving a communication from a caller using a token, the server can send a message stating that the server is ready for receiving the file. After receiving the file, the server can send the receiver a message saying that a file is received. The server can send the file or a link of the file to the receiver.

Other information can be provided in the profile of a token, such as a password or a telephone number. A password can provide an extra security to remove unauthorized callers. A telephone number can be used for transferring the VoIP to a cellular network. The server can provide the telephone number to the caller, if instructed by the profile, for example, in case of emergency.

For example, a token can include a telephone number, with instruction to provide the telephone number to the caller if the receiver cannot be connected. The token can be used as an emergency token, to ensure that the caller can contact the receiver, even if the VoIP network is not available, or if the receiver is not connected to the Internet.

In some embodiments, the tokens can include the actual IP address of the server, the IP address of the receiver and the profile. Alternatively, the tokens can include a link to the IP address of the receiver and a link to the profile. Alternatively, the tokens can contain values of the profile.

Figure 10A:
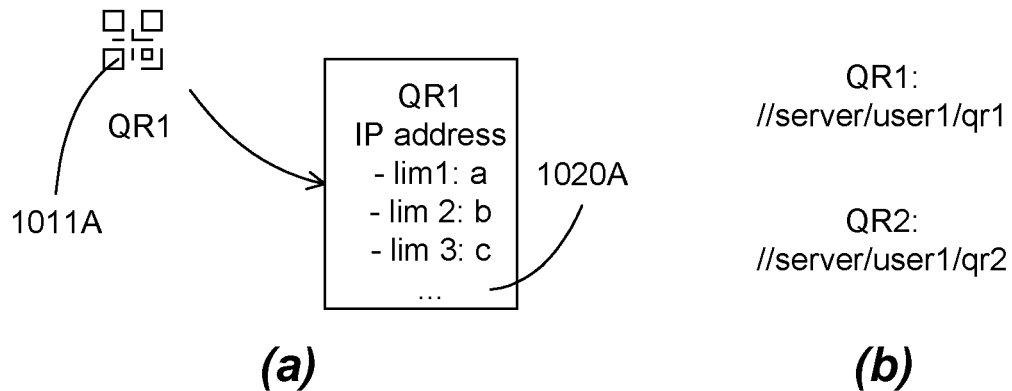
FIGS. 10A-10C illustrate configurations for communication tokens according to some embodiments.
Figure 10B:
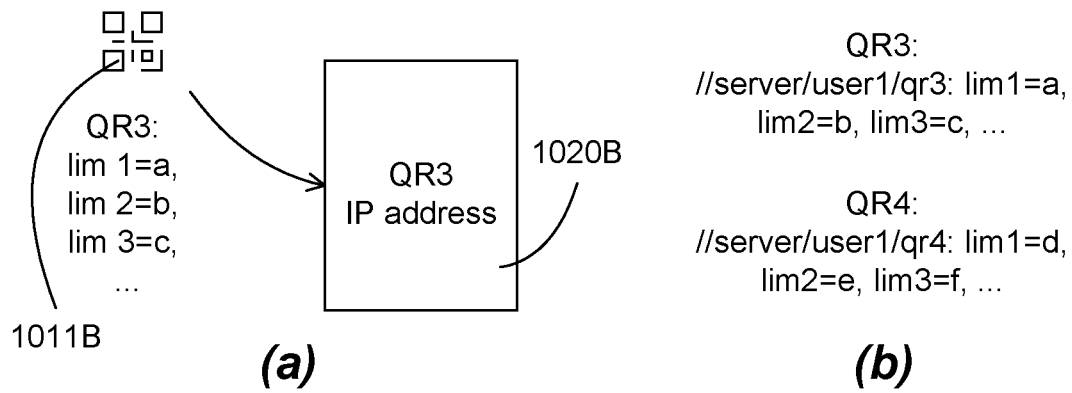
Figure 10C:
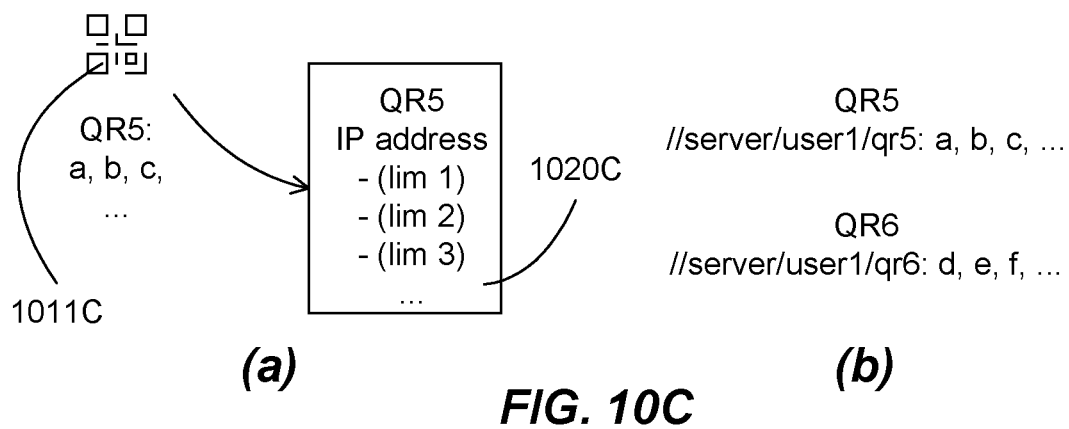

FIGS. 10A-10C illustrate configurations for communication tokens according to some embodiments. In FIG. 10A, a token 1011A can include the actual IP address of the server, and a link to the IP address of the receiver and the profile, indicated as the webpage of the server. The server 1020A can store the IP address of the receiver, and the profile of the token 1011A. In FIG. 10B, a token 1011B can include the actual IP address of the server and the profile, indicating as the limitations 1-n. The server 1020B can store the IP address of the receiver. In FIG. 10C, a token 1011CA can include the actual IP address of the server, and the values of the profile, indicating as the values of the limitations 1-n. The server 1020C can store the IP address of the receiver, and a mapping of the values to the limitations of the token.

In some embodiments, the tokens can be generated by the server or by the receiver. The receiver can simply register with the server, and allow the server to generate the tokens, after supplying the optional profiles. An advantage of the server-generated tokens is the minimum set up required for the receiver. For example, the receiver can simply use a communication device, such as a cell phone equipped with a network interface for connecting to the Internet. The receiver can use a built in browser to register with the server, e.g., with a VoIP service provider represented by the server. There can be no other requirements imposed on the receiver.

The requirements for the callers can be less, which can only require that the caller uses a communication device having a network interface, such as a cell phone, a mobile device, or a computer with voice and/or video interface.

Alternatively, the receiver can generate the tokens, with the optional profile. The receiver can register the tokens with the server, e.g., with a VoIP service provider represented by the server. The server can be responsible to manage the tokens, e.g., to accept communication from callers, to verify conditions of the callers based on the profile, and to connect the callers with the receivers if the conditions are met.

In some embodiments, the communication token can provide a high degree of flexibility and privacy. The communication methods using the tokens can be inexpensive, e.g., well suited for communication in a small business. For example, the communication methods can include a one-time or a limited-time communication setting, which can allow a recipient to send out communication contact without concern about loss of privacy. Further, the communication methods can include a multiple-recipient setting, which can ensure complete communication, e.g., no missing out on a sale or business opportunity due to missed calls.

In some embodiments, the communication methods can focus on receiving calls, which can be similar to a call center for small business. The communication methods can allow a person or a small business to easily and inexpensively set up a call center to receive inquiries from callers. There can be no special requirements from the callers, such as no special software or hardware requirements.

In some embodiments, the present invention discloses an application software that can allow a person to set up an inexpensive call center with high privacy and flexibility. For example, a person can install the application software, either in one or more cell phones or computers. The person can set up a call center, including contact information, such as QR codes, to receive calls (e.g., communication including messaging, texting, chatting, emailing, sending or receiving files). The call center can be flexible, such as a call can be received by multiple recipients to ensure no loss of communication, or a contact information can be expired to ensure privacy after the calling window is passed.

Figure 11A:
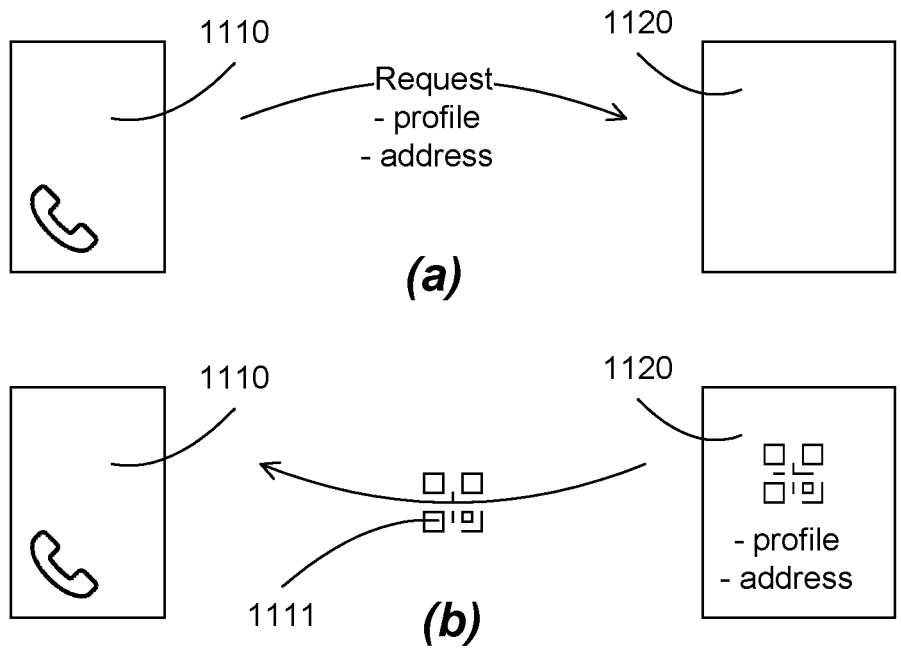
FIGS. 11A-11B illustrate configurations for token generation according to some embodiments.
Figure 11B:
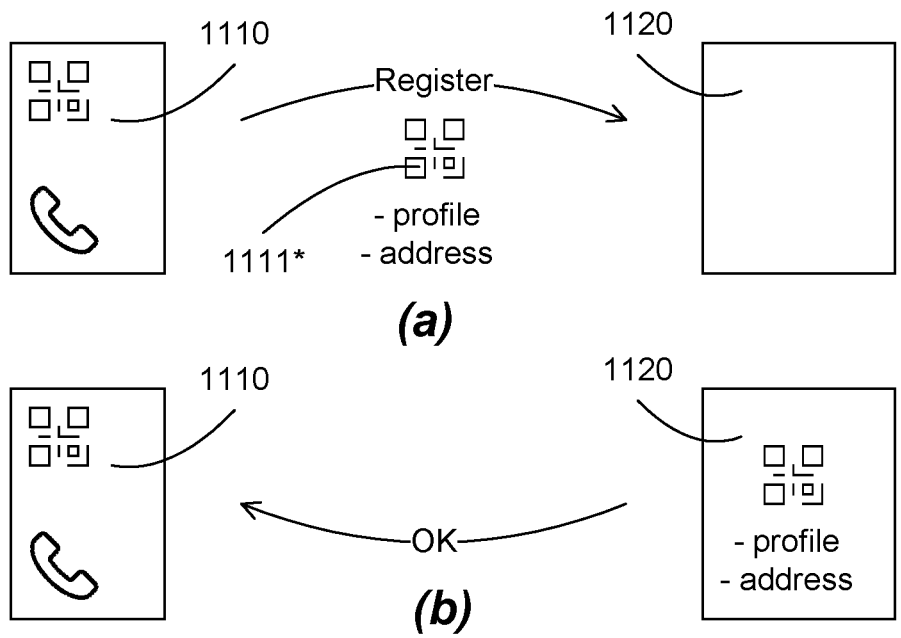

FIGS. 11A-11B illustrate configurations for token generation according to some embodiments. In FIG. 11A(a), a receiver 1110 can send a request to a server 1120 to request the issuance of a token. The receiver can also supply a profile for the requested token. The receiver also supplies its IP address to the server, for example, by registering with the server and to allow the server to acquire the IP address of the receiver when the receiver is online. In FIG. 11A(b), the server generates the token 1111, and sends the token to the receiver.

In FIG. 11B(a), a receiver 1110 can generate a token 1111* with its profile, and then register the token 1111* with the server 1120. The receiver also supplies its IP address to the server, for example, during the registration process with the server to allow the server to acquire the IP address of the receiver when the receiver is online. In FIG. 11B(b), the server acknowledges the registration of the token 1111*, and sends a confirmation to the receiver.

In some embodiments, the token can be formed using an application software, e.g., a software installed in the receiver communication device. For example, a person can download an apps into a communication device, such as to a cell phone. The person then can set up contact information, such as create a QR code, including restrictions or profiles for the contact. The profiles can include a list of persons to receive the call, the type of call (e.g., voice call, video call, message, text, chat, email, send or receive files), and characteristics of the call (e.g., one time call, expiration date, call time limit, budget limit, or no restriction).

After the set up, the person can be ready to receive communication, e.g., voice calls, video calls, texts, messages, chats, emails, or other forms of communication. The person can assist others in setting up the communication receiving platform.

The set up contact information can include setting calling characteristics, conditions, and restrictions. For example, a contact information can be set up so that a call to the contact can ring on multiple recipients. Once a recipient picks up the phone to establish communication with the caller, the communication for other recipients, e.g., the phone ringing, can be stopped. This characteristic can ensure that a call can always be answered, since the chance that multiple recipients are occupied and not free to answer calls is small. Other characteristics of the multiple recipients can be used, such as a priority for call. For example, one or more first recipients can be ringed first. If none of the first recipients pick up the phone after a few rings, then one or more second recipients can be ringed. The list can continue for multiple recipients.

A QR code can also be set up for one time calling only. The one time calling can be limited to a same caller, e.g., each caller can only call one time, or can be applied to all callers, e.g., the call can only go through for one caller.

In operation, a caller can use a scanner in a cell phone to read a QR code. The reading can displayed a web address indicated by the QR code, with a notification whether to contact the web address. The notification can be skipped, for an automatic contacting the web address right after reading the QR codes. After reaching the web page indicated by the web address, the web page can call the recipients identified by the profile of the QR code. Other communication modes can be used instead of calling, such as texting, messaging, emailing, sending or receiving files. Further, the selected mode of communication can be predetermined, e.g., set up in the profile. For example, all communication using the QR code will be voice call. Alternatively, another set up can be to provide a selection of communication modes for the caller to choose.

The call can be subjected to the characteristics and restrictions in the profile. For example, if the call is a second call for a one-time call or the QR code is expired, the web page can terminate the call, and the recipients are not disturbed. Or if the QR code specifies multiple recipients, then all the recipients can be called, parallelly, sequentially, or some in parallel and some in sequential, based on the profile.

For example, in a Bed and Breakfast business, a contact information can be posted, which is linked to the owner and his partners. Thus, when a customer or a prospective customer calls the contact information, the phones for the owners and his partners can ring. If the owner is free, he can pick up the phone to answer, and the phones can stop ringing in his partners. If the owner is busy, one of his partners can pick up the phone to answer, and the phones can stop ringing in other persons. Similarly, in other businesses such as in a restaurant, the contact information for reservation or inquiry can ring on multiple waiters and cashiers to ensure of no miss calls.

In some embodiments, a profile can be linked to each token, to set the directions, such as conditions, limitations, characteristics, and treatments of the call. Thus, when a caller contacts a server using a token, the server can retrieve the profile associated with the token, and then follow the directions cited in the profile to treat the call. The profile can also provide provisions for different scenarios, such as the actions taken by the server when a call is rejected due to a condition in the profile.

Figure 12A:
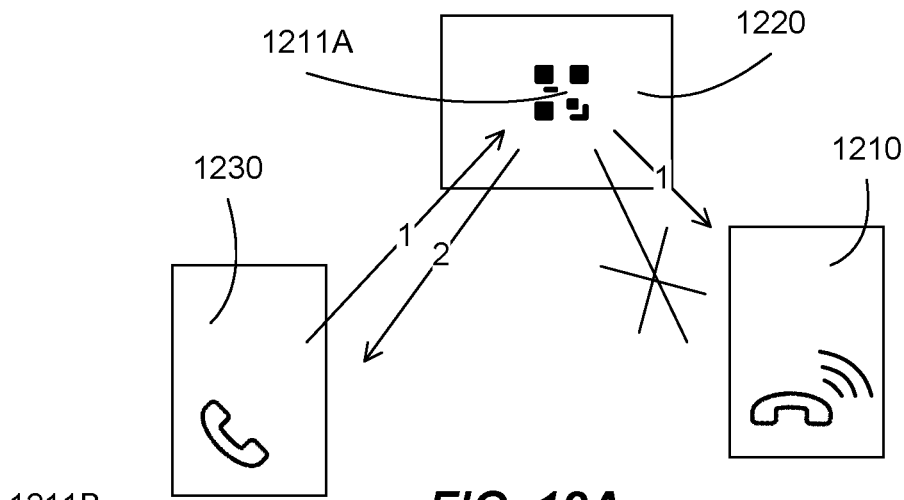
FIGS. 12A-12C illustrate configurations for profile conditions according to some embodiments.
Figure 12B:
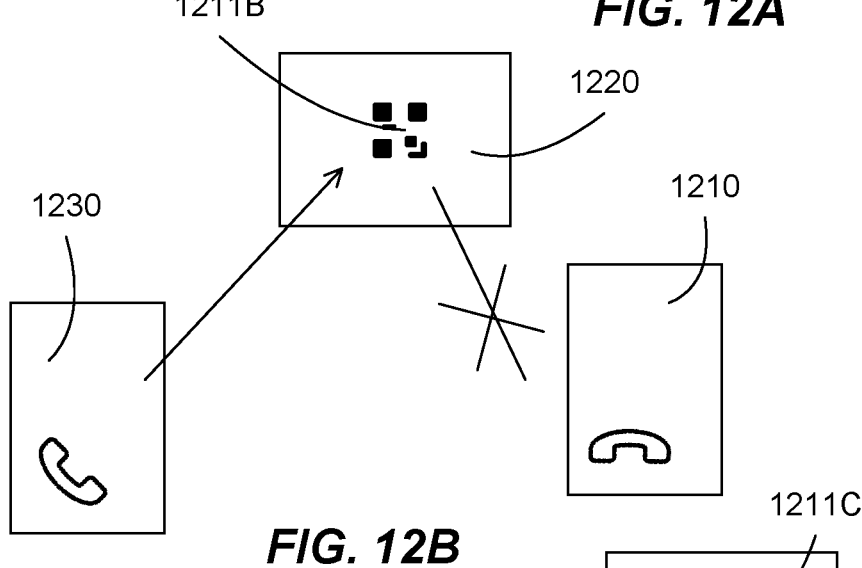
Figure 12C:
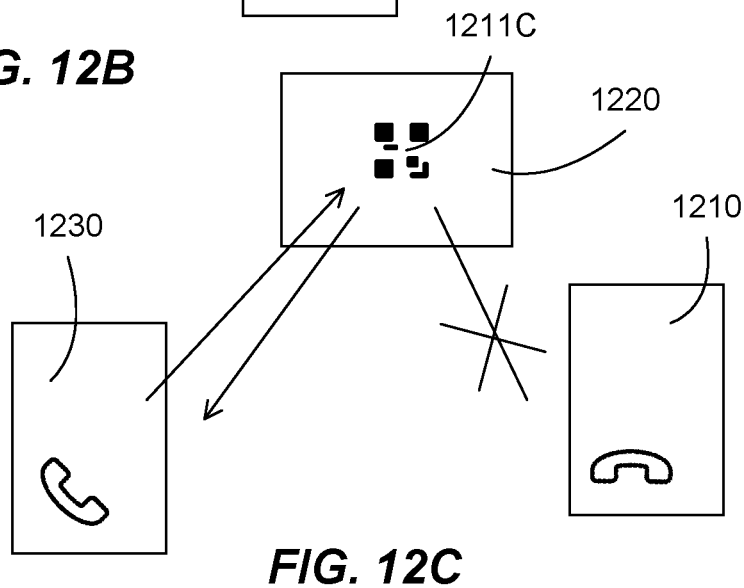

FIGS. 12A-12C illustrate configurations for profile conditions according to some embodiments. In FIG. 12A, the QR code can have a profile with a condition of one call only. This QR code can be set up by a receiver to answer questions related to an issue, such as follow up questions on a sale item. The QR code is thus valid only for one call, and subsequent calls are blocked by the server. As shown, the caller 1230 can use the QR code 1211A to contact the server 1220. For the first time calling, the call can reach the receiver 1210, for example, because the web page can perform the verification that the call is a first time call. A second time calling will not reach the receiver by the same caller, e.g., the call is blocked by the server, since the call does not meet the conditions of the profile of the QR code 1211A. For a different caller, the call might or might not reach the receiver, depending on the profile.

In FIG. 12B, the QR code can have a profile with a condition of the calling time, e.g., the available time to receive calls by the receiver. This QR code can be set up by a receiver to answer business related issues, so the available time can be between 9 am and 5 pm. This QR code can be set up by a receiver to answer personal related issues, so the available time can be between after 6 pm. As shown, the caller 1230 can use the QR code 1211B to contact the server 1220. Since the call occurs outside of the available time, the call is blocked by the server.

In FIG. 12C, the QR code can have a profile with a condition of getting a pre-recorded message, e.g., the QR code is designed for getting information without a direct contact to a person. This QR code can be set up by a receiver to answer a specific popular question, which can be asked by many users. As shown, the caller 1230 can use the QR code 1211C to contact the server 1220. Since the condition of the QR code is message-only, the server can send the message to the caller.

FIGS. 13A-13D illustrate flow charts for QR code token configurations according to some embodiments. In FIG. 13A, operation 1300 forms a QR code. The QR code can include a link to a website, a link to a communication device, and a profile comprising characteristics or limitations to communicate with the communication device. The link to the communication device can be at least updated when changes to allow the server to locate the communication device. The website can be configured to constantly update the link to the communication device to allow the server to locate the communication device. The website can be configured to at least update the link to the communication device when IP address of the communication device changes to allow the server to locate the communication device.

In FIG. 13B, operation 1320 forms a QR code. The QR code can include a link to a website and characteristics or limitations to communicate with a communication device. The website comprises a link to the communication device.

In FIG. 13C, operation 1340 forms a QR code. The QR code can include a link to a website. The website can be configured to communicate with a communication device subjected to characteristics or limitations provided by the communication device.

In FIG. 13D, operation 1360 forms a QR code. The QR code can be configured to provide communicate with a communication device subjected to characteristics or limitations. The characteristics or limitations can include at least one of an outgoing message, an expiration date, an available time, a call duration, a number of calls, users to call, multiple call property, conference call, file to get, or phone number.

Figure 14A:
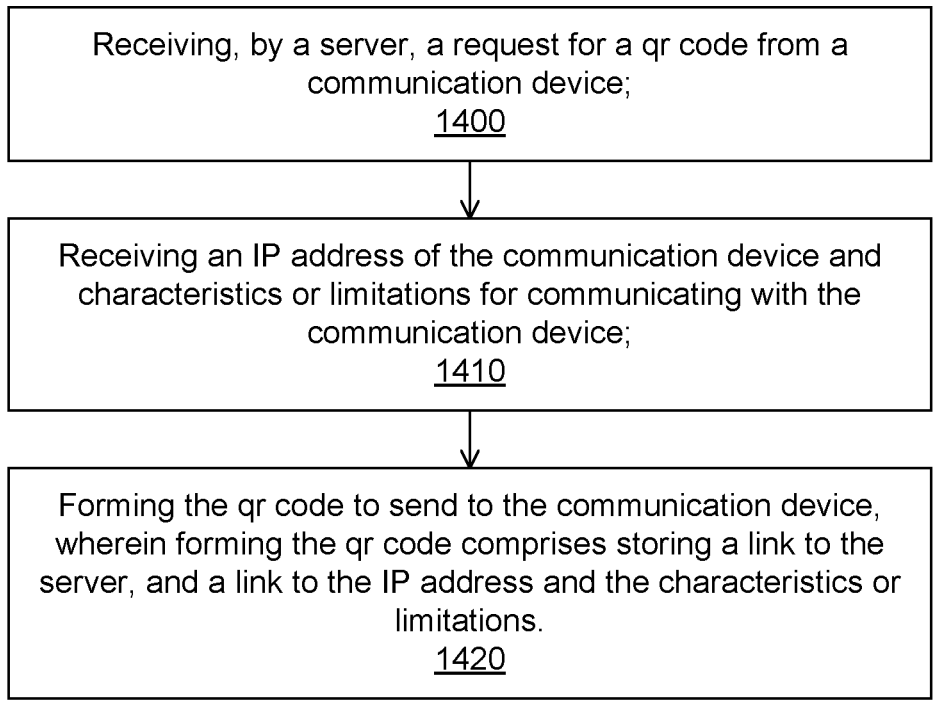
FIGS. 14A-14B illustrate flow charts for communication operations according to some embodiments.
Figure 14B:
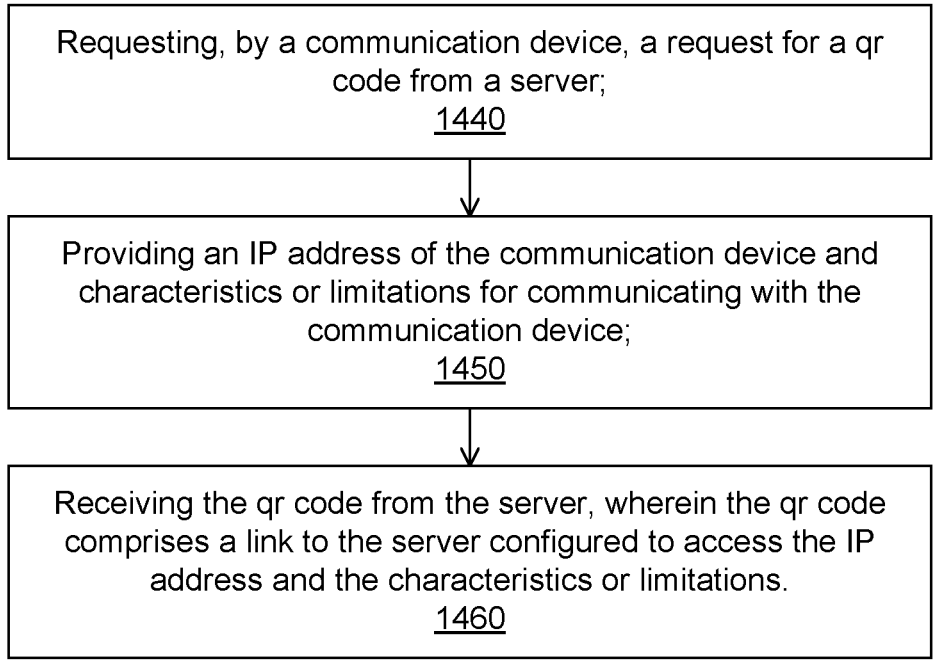

FIGS. 14A-14B illustrate flow charts for communication operations according to some embodiments. In FIG. 14A, operation 1400 receives, by a server, a request for a QR code from a communication device. Operation 1410 receives an IP address of the communication device and characteristics or limitations for communicating with the communication device. Operation 1420 forms the QR code to send to the communication device, with forming the QR code including storing a link to the server, and a link to the IP address and the characteristics or limitations.

In FIG. 14B, operation 1440 requests, by a communication device, a request for a QR code from a server. Operation 1450 provides an IP address of the communication device and characteristics or limitations for communicating with the communication device. Operation 1460 receives the QR code from the server. The QR code can include a link to the server configured to access the IP address and the characteristics or limitations.

FIGS. 15A-15C illustrate flow charts for communication operations according to some embodiments. In FIG. 15A, operation 1500 responds to a first communication device request using a QR code linked to a second communication device. The respond is based on characteristics or limitations related to the QR code. The respond can include a communication with the first communication device or a connection of the first communication device with the second communication device using an IP address linked to the QR code.

In FIG. 15B, operation 1520 receives, by a server, a communication from a first communication device using a QR code linked to a second communication device. Operation 1530 obtains characteristics or limitations related to the QR code. Operation 1540 communicates, based on the characteristics or limitations, with the first communication device or connecting the first communication device with the second communication device using an IP address linked to the QR code.

In FIG. 15C, operation 1560 offers access to a message, responding with a message, accepting a message, or connecting a first communication device to a second communication device. The respond is based on characteristics or limitations related to a QR code provided by the first communication device.

In some embodiments, a token can be used to communicate with more than one receiver. Also, the token can be used to communicate with the receivers that are not the original or the token requested server. The characteristics of the receivers, e.g., who the token can be used to connect to, can be determined in the profile. For example, the profile can state that only the requested receiver can be connected to communicate with the caller using the token. The profile can state that one or more other receivers, together with the requested receiver, can be connected to communicate with the caller using the token. The profile can state that one or more other receivers, without the requested receiver, can be connected to communicate with the caller using the token.

Figure 16A:
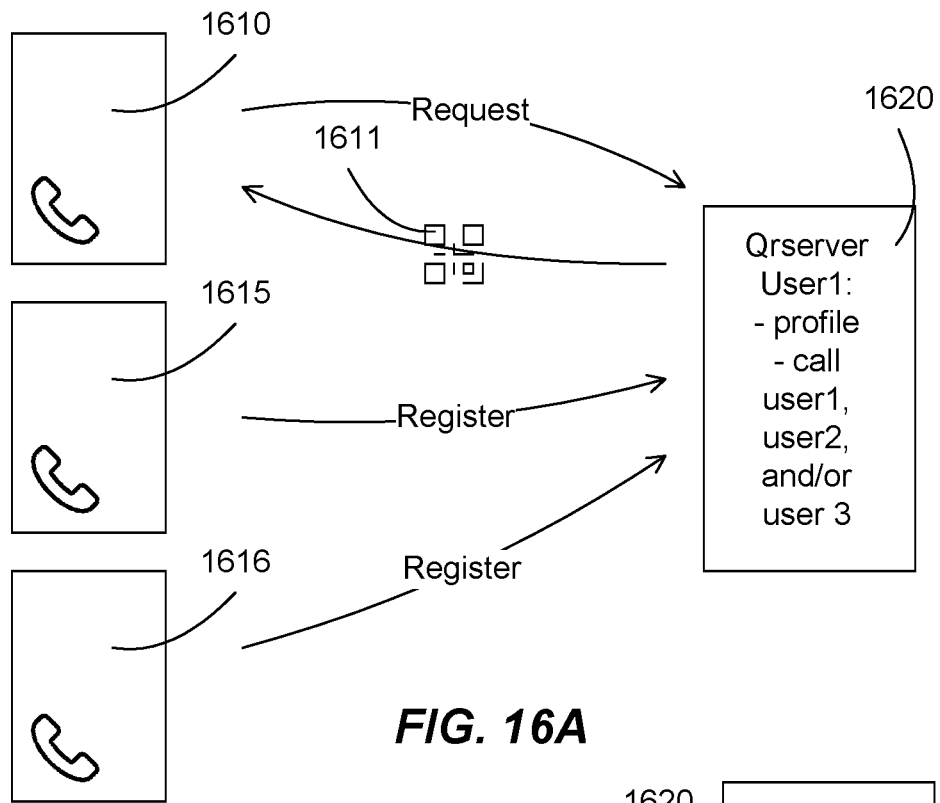
FIGS. 16A-16B illustrate configurations for a profile condition according to some embodiments.
Figure 16B:
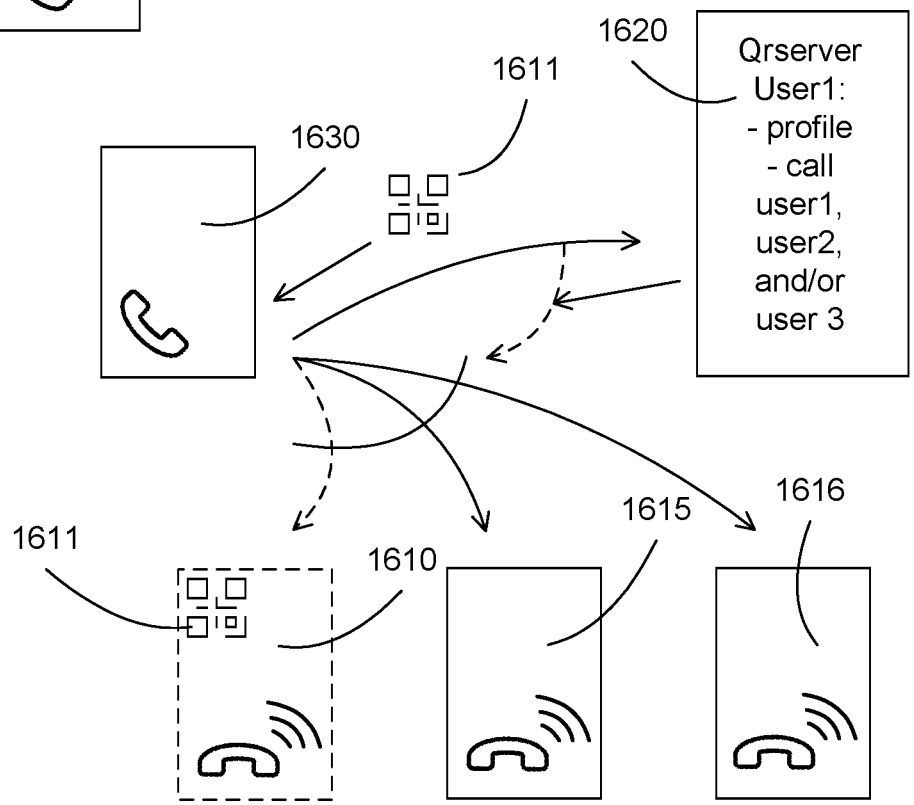

FIGS. 16A-16B illustrate configurations for a profile condition according to some embodiments. In FIG. 16A, a receiver 1610 can send a request for a QR code token to a server 1620, together with a profile for the token. The profile can list a number of receivers, such as the requested receiver 1610, e.g., the receiver that requests the token, and other receiver 1615 and receiver 1616, e.g., other receivers that the requested receiver desires to link the token 1611 to. The list of receivers can include the requested receiver 1610, e.g., receivers 1610, 1615, and 1616. The list of receivers can exclude the requested receiver 1610, e.g., receivers 1615, and 1616.

In some embodiments, all receivers register with the server, in order for the server to locate the receivers for connecting with the callers. The server then can issue the token 1611, listed in the profile the list of receivers to be linked to the token. The server then sends the token to the receiver 1610. Alternatively or additionally, the server can send the token to the other receivers 1615 and/or 1616, depending on the request from the receiver 1610. In other words, a receiver can request a token for other receivers.

The QR code can be set up as a multiple recipient QR code, e.g., the profile of the QR code is set to call multiple recipients. For example, a caller can call using the QR code. If the profile is set up for parallel multiple receivers, all receivers can ring to request connection. After one receiver picks up the phone, e.g., making the connection, other receivers can stop ringing.

In FIG. 16B, when a caller 1630 uses the token 1611, the caller is connected to the server 1620. The server then accesses the profile of the token, to perform the functions specified by the profile. For example, the server can attempt to connect the caller with the receivers 1610, 1615, and 1616, such as sending a notification in the form of a ring tone, text message, or a vibration signal, to the receivers 1610, 1615, and 1616. The receivers that the server sends the notification depend on the profile. For example, the server can send the notification for all receivers 1610, 1615, and 1616. Alternatively, the server can send the notification to receivers 1615 and 1616 only.

In some embodiments, the profile of the token can have a provision for treating the multiple receivers. For example, the profile can state that all listed receivers are to be connected. This provision can allow the token to be used for a conference call between the caller and all receivers. The profile can state that all receivers are to be notified of the call from the caller, but only one receiver is to be connected for communication. This provision can ensure that the caller, when using the token for communication, can be connected to a receiver. For example, all receivers listed in the profile can be notified by the server that a caller is calling, e.g., the server can send a ring tone, a text message, or a vibration signal to all receivers. When one receiver among the multiple notified receivers answers the call, the notification is terminated, and the answered receiver is connected to the caller.

The receivers listed in the profile can be sequentially notified by the server, e.g., the server can send a ring tone, a text message, or a vibration signal to each of the receivers, one after the other. For example, the server can send a notification to a first receiver for a period of time, e.g., a first receiver of the listed receivers is notified (e.g., the phone is ringing) for 10, 20, 30, 40, 50, or 60 seconds. After the period of time, the notification of the first receiver is terminated, and a second receiver is then notified for a same period of time. The process is continued until a receiver answers the notification. If the least receiver in the listed receivers still does not answer the call, the process can re-continue back to the first receiver. After a few cycles, such as 2 or 3 cycles, the process can be terminated, and the server can notify the caller that all lines are busy. Alternatively, the caller can be put on hold for another period of time, and the server can then attempt to re-notify the receivers.

Figure 17A:
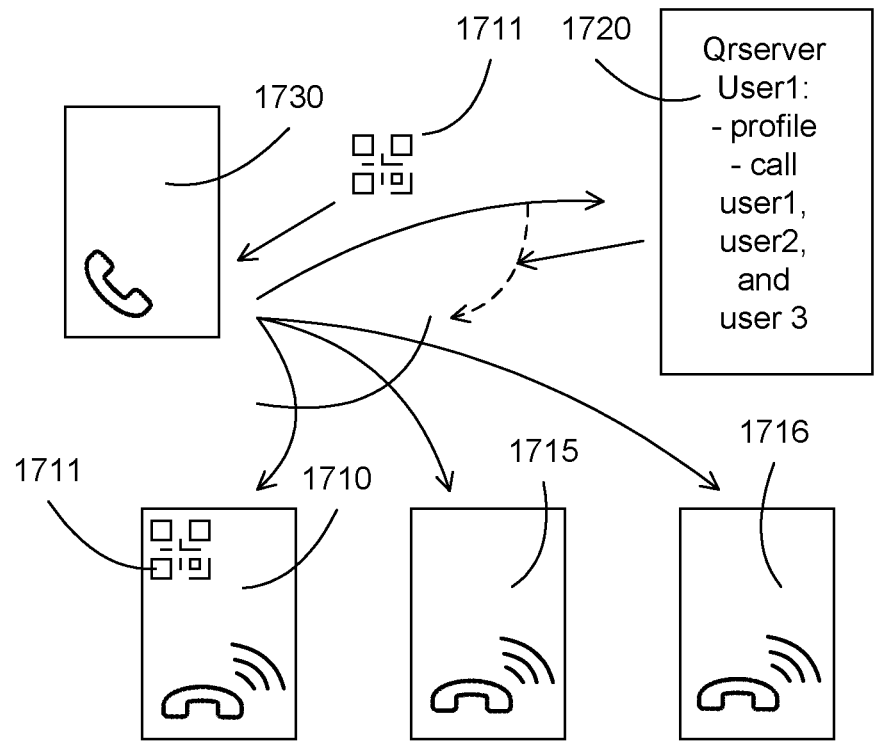
FIGS. 17A-17B illustrate a conference call process according to some embodiments.
Figure 17B:
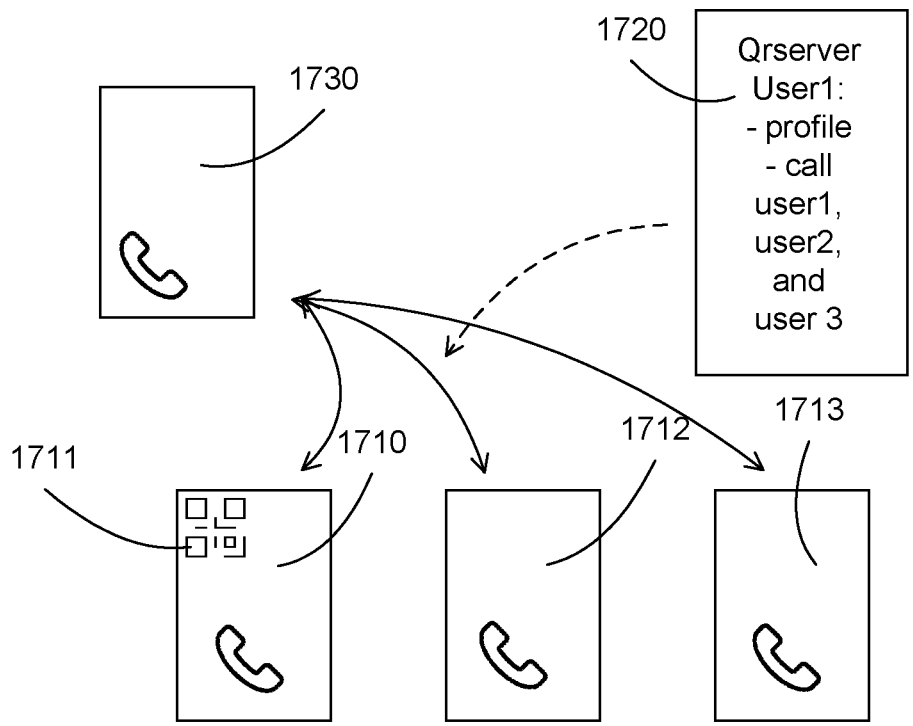

FIGS. 17A-17B illustrate a conference call process according to some embodiments. In FIG. 17A, a token 1711 is configured to establish a conference call with receivers 1710, 1715, and 1716. When a caller communicates with a server 1720, using the token 1711, the server can notify all receivers, e.g., locating the IP addresses of the receivers and sending a notification notice, based on other conditions of the profile. In FIG. 17B, when the receivers answer the notification notice, the server can connect the caller with the receivers.

Alternatively, when the caller communicates with the server, the server can locate the IP addresses of the receivers, and connect the caller with the receivers, e.g., the notification notice can be provided by the caller to the receivers.

Figure 18A:
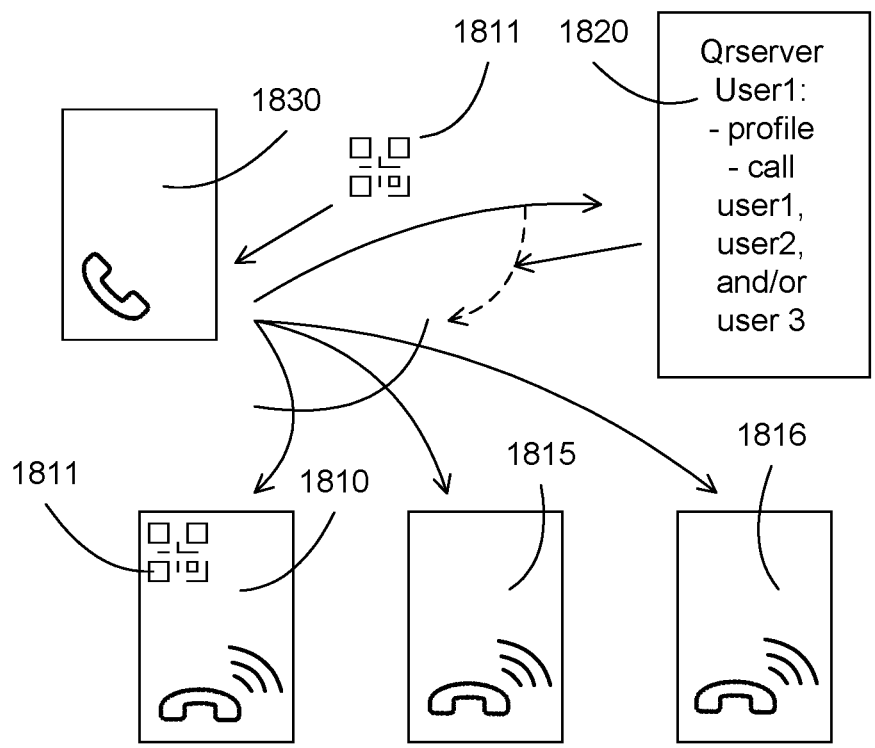
FIGS. 18A-18B illustrate a parallel notification process according to some embodiments.
Figure 18B:
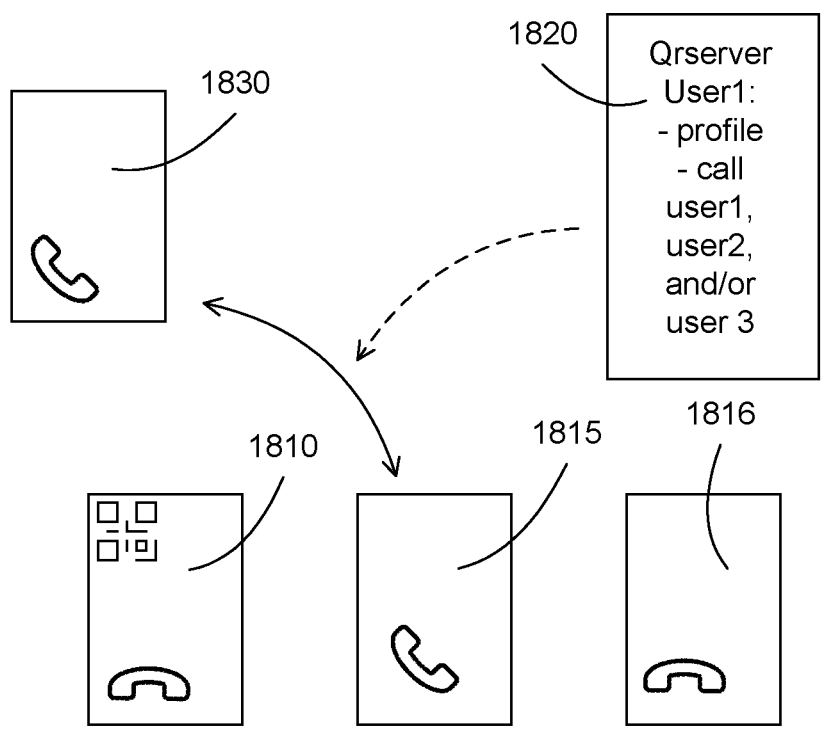

FIGS. 18A-18B illustrate a parallel notification process according to some embodiments. In FIG. 18A, a token 1811 is configured to establish a call with one of receivers 1810, 1815, and 1816, using a parallel notification process. When a caller communicates with a server 1820, using the token 1811, the server can notify all receivers, e.g., locating the IP addresses of the receivers and sending a notification notice, based on other conditions of the profile. In FIG. 18B, when one of the receivers answers the notification notice, such as receiver 1815, the server can connect the caller 1830 with the receiver 1815, and terminate the notification notice at other receivers 1810 and 1816.

Figure 19A:
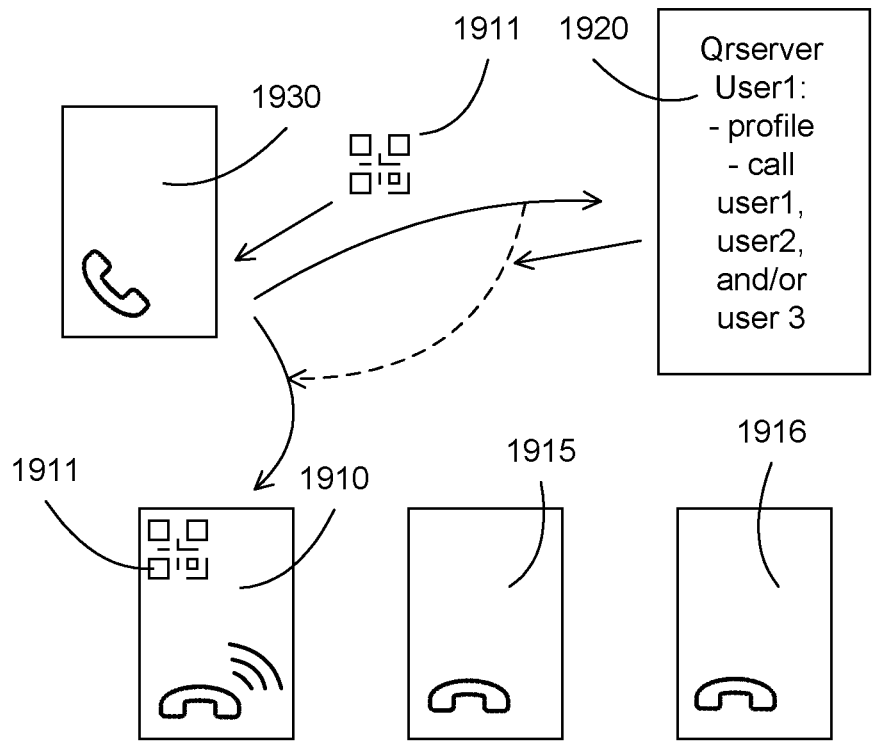
FIGS. 19A-19B illustrate a sequential notification process according to some embodiments.
Figure 19B:
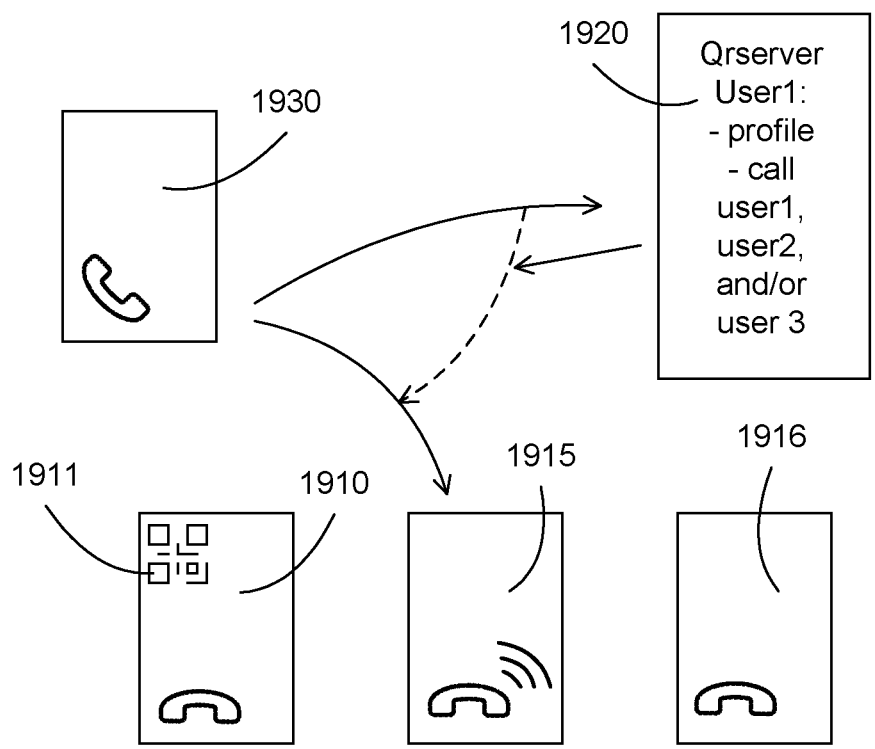

FIGS. 19A-19B illustrate a sequential notification process according to some embodiments. In FIG. 19A, a token 1911 is configured to establish a call with one of receivers 1910, 1915, and 1916, using a sequential notification process. When a caller communicates with a server 1920, using the token 1911, the server can first notify a receiver, such as receiver 1910. After a short period of time, the server can terminate the notification on receiver 1910, and start sending notification on receiver 1915. The process can continue until a receiver answers the call. In FIG. 19B, when one of the receivers answers the notification notice, such as receiver 1915, the server can connect the caller 1930 with the receiver 1915, and terminate the notification process.

In some embodiments, the present invention discloses a method for communication using a token, such as a QR code. The communication can be performed through the Internet network, and can also be transferred to cellular network. The token can include a profile, to tailor the token for different configurations.

Figure 20:
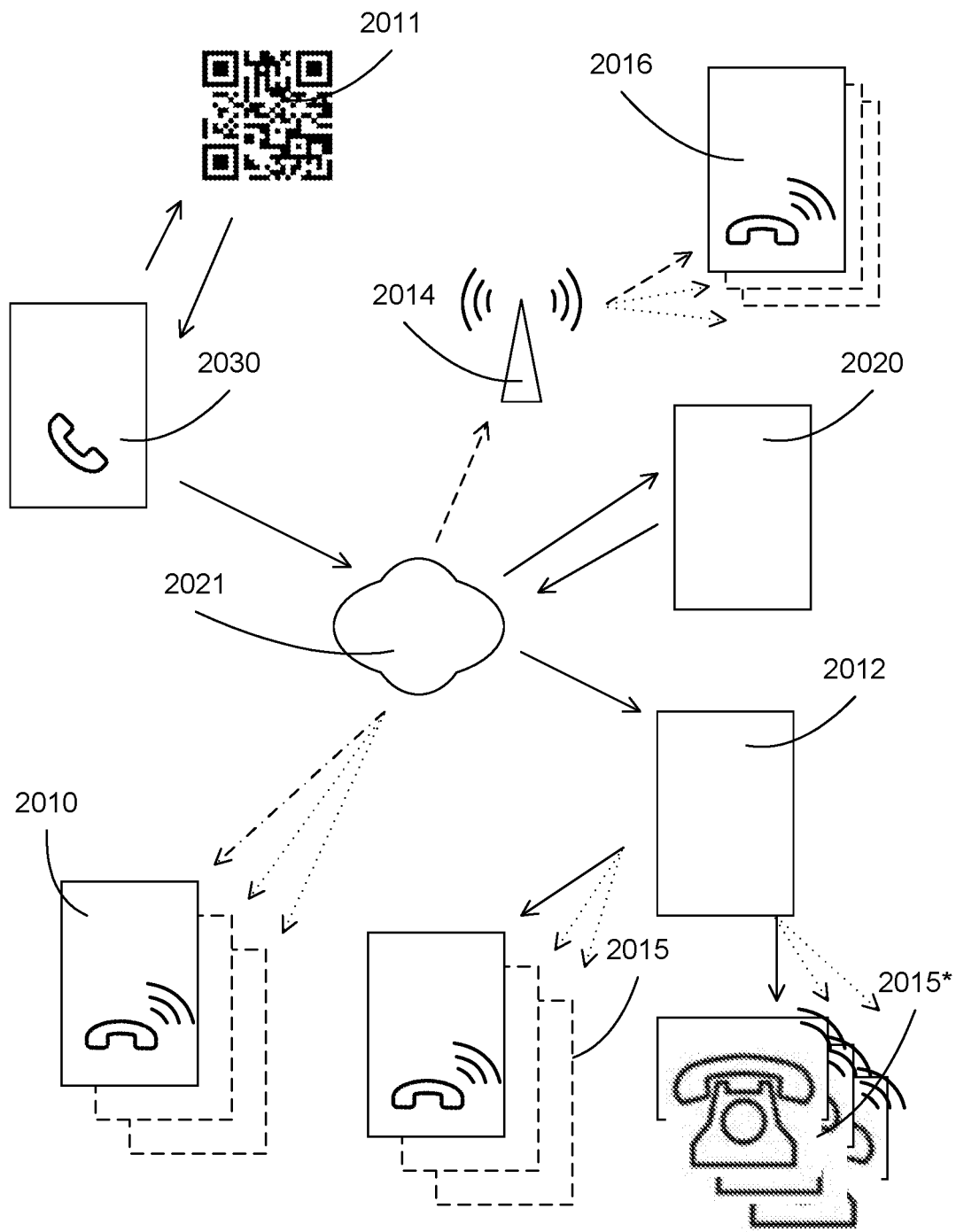
FIG. 20 illustrates a communication process according to some embodiments.

FIG. 20 illustrates a communication process according to some embodiments. A receiver, such as receiver 2010, can have a QR code 2011 generated, for example, by sending a request to a server 2020. The QR code can be linked to a profile, which can allow the receiver to configure the communication from callers.

A caller 2030 can access the QR code 2011. The communication can be sent to the server 2020, to be processed according to the profile. For example, the profile can state that the communication can be with one or more receivers 2010. The server then can connect the caller to the receivers 2010. The profile can state that the communication can be with other receivers, such as mobile device receivers 2015 or desktop receivers 2015*, through a LAN server 2012. The profile can state that the communication can be with cellular receivers 2016. The server then can transfer the communication from the caller to a cellular gateway to reach a cell tower 2014 to connect to the cellular receivers 2016.

Figure 21A:
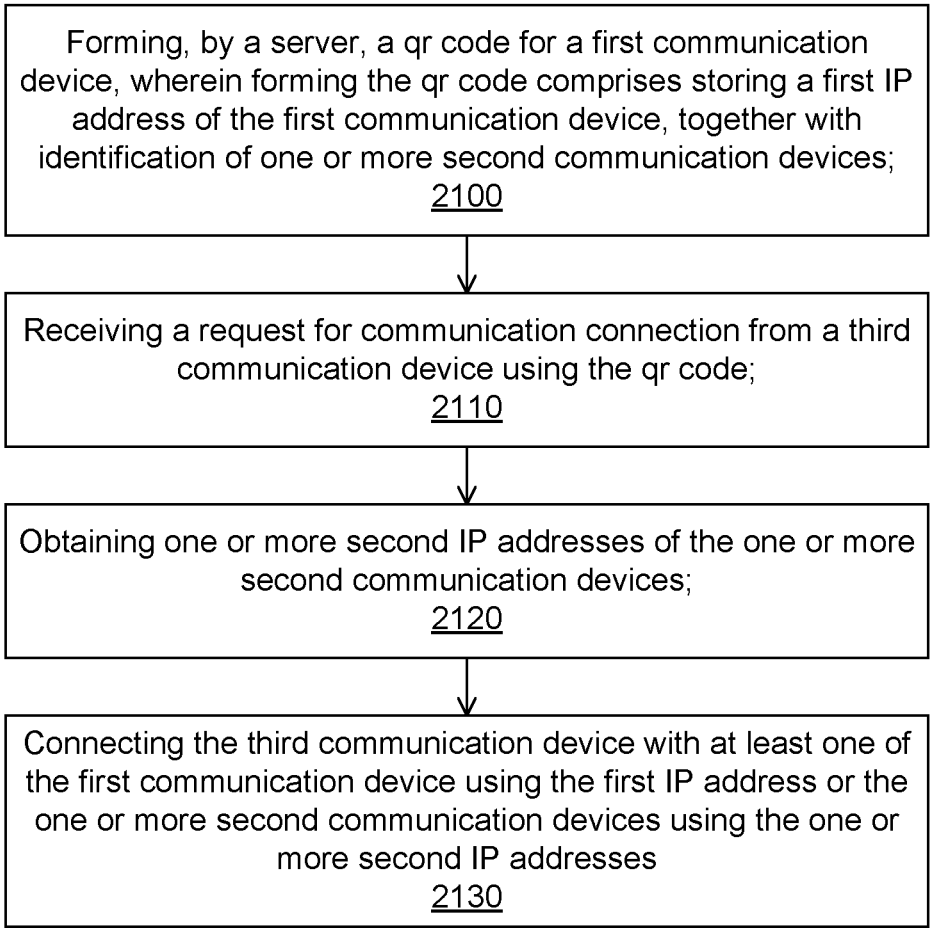
FIGS. 21A-21B illustrate flow charts for communication according to some embodiments.
Figure 21B:
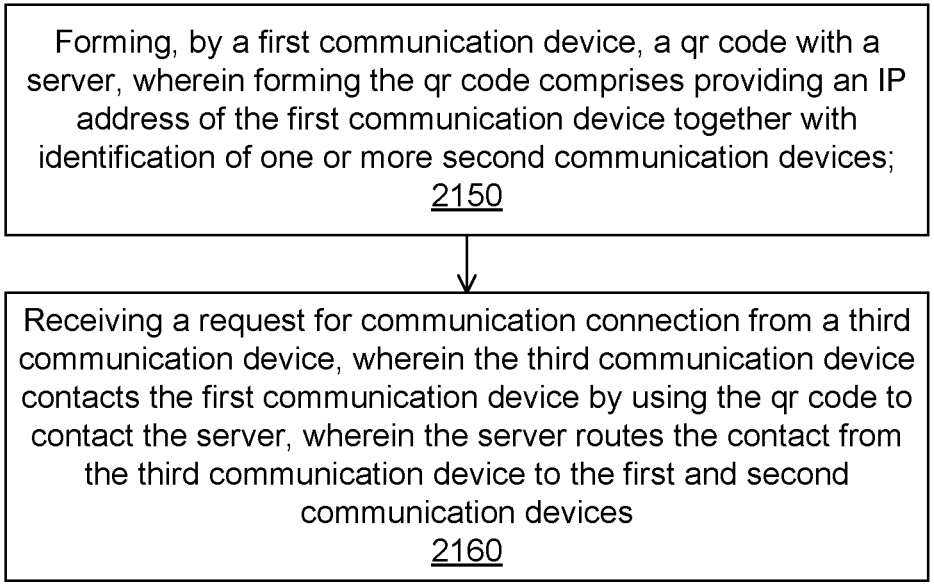

FIGS. 21A-21B illustrate flow charts for communication according to some embodiments. In FIG. 21A, operation 2100 forms, by a server, a qr code for a first communication device, with forming the qr code including storing a first IP address of the first communication device, together with identification of one or more second communication devices. Operation 2110 receives a request for communication connection from a third communication device using the QR code. Operation 2120 obtains one or more second IP addresses of the one or more second communication devices. Operation 2130 connects the third communication device with at least one of the first communication device using the first IP address or the one or more second communication devices using the one or more second IP addresses.

In FIG. 21B, operation 2150 forms, by a first communication device, a qr code with a server, with forming the qr code including providing an IP address of the first communication device together with identification of one or more second communication devices. Operation 2160 receives a request for communication connection from a third communication device. The third communication device contacts the first communication device by using the QR code to contact the server. The server routes the contact from the third communication device to the first and second communication devices.

FIGS. 22A-22B illustrate flow charts for communication according to some embodiments. In FIG. 22A, operation 2200 receives a request for communication connection from a first communication device using the QR code identifying a second and one or more third communication devices. Operation 2210 connects the first communication device with the second and the one or more third communication devices using corresponding IP addresses based on the identification in the QR code.

In FIG. 22B, operation 2230 receives a request for communication connection from a first communication device using the QR code identifying a second and one or more third communication devices. Operation 2240 notifies, simultaneously or sequentially, the second and the one or more third communication devices using corresponding IP addresses based on the identification in the QR code. Operation 2250 connects the first communication device with a communication device among the second and the one or more third communication devices which first corresponds to the request. Operation 2260 stops the notification of the remaining communication devices in the second and the one or more third communication devices.

In some embodiments, the communication token can be a machine readable pattern, such as a barcode, e.g., a two dimensional barcode or a QR code. After a receiver has a QR code formed for the purpose of allowing callers to communicate with the receiver, the receiver can distribute the QR code for the potential callers. A caller can obtain a QR code by different means, such as receiving the QR code sent by the receiver or a person knowing the receiver. A caller can obtain a QR code by seeing the QR code on a brochure, such as on an advertisement pamphlet, or on a display at a store. The caller then can scan the displayed QR code, to store the QR code, or to use the QR code to communicate with the receiver.

Figure 23A:
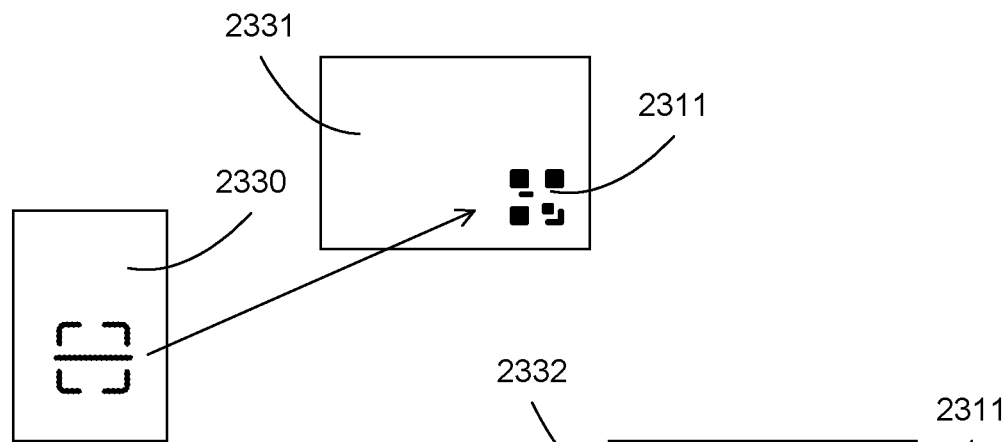
FIGS. 23A-23C illustrate mechanisms for obtaining QR codes according to some embodiments.
Figure 23B:
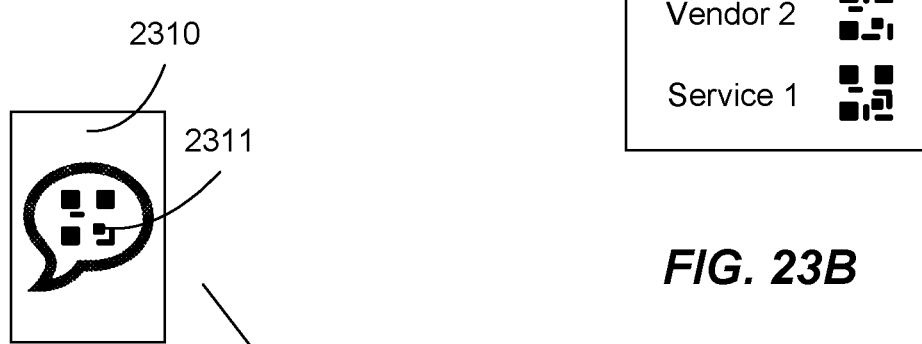
Figure 23C:
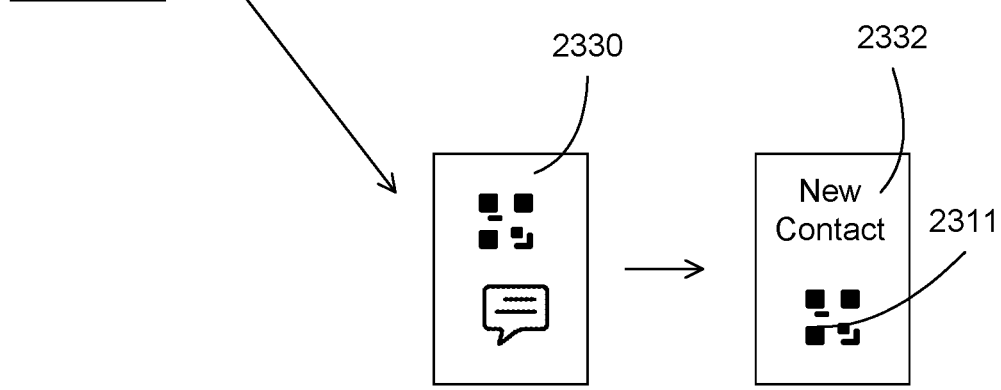

FIGS. 23A-23C illustrate mechanisms for obtaining QR codes according to some embodiments. In FIG. 23A, a caller communication device, such as a cell phone 2330 equipped with a scanner, can be used to read a QR code 2311, which can be shown on a display, such as on a web page, on a business card, on a brochure, or on a signage. The caller communication device can read and then store the QR code. The communication device can read and then access the web address stored in the QR code. After accessing the web site, the caller communication device can decide on a communication mode, such as calling, texting, emailing, or receiving a file. The communication mode can be displayed on the communication device, for example, as the content of the web site. The scanner can have a profile to dictate the actions following the scanning process, such as setting a default the calling decision after scanning. Alternatively, the communication mode can be determined by the QR code, e.g., the QR code only allows messages or only allows calling.

For example, the caller communication device can initiate a call when using the scanner to read the QR code, thus the caller communication device can automatically connect to the receiver communication device after accessing the web site.

In FIG. 23B, one or more QR codes can be stored in a caller communication device 2330, such as in a contact page, listing the entities and the associated QR codes 2311. A person can call (or text or other communication) using the QR code contact information.

In FIG. 23C, a caller communication device 2330 can receive a message, such as from a receiver communication device 2310. The message can include a QR code 2311. The caller device can receive the QR code, and can store the QR code, such as to store as a new contact.

In some embodiments, the communication token can be shown on a display, such as on a business card or on a brochure. The communication token can be in the form of a QR code.

In some embodiments, the present invention discloses methods to extend the storage capability of the QR codes. The brochure or business card can have limited space to display all information, especially support document. Further, the QR codes can also contain limited information, which is constrained by the size and error recovery scheme of the QR code. Thus, a typical data contained in a QR code can be a webpage address. By specializing the data contained in the QR codes, more information can be provided, e.g., at the webpage.

For example, the data contained in the QR codes can provide a link to a web address, together with arguments to configure the web page according to the QR code specification. The arguments can be stored in the QR codes, such as an argument to specify that the accessing of the web page is accompanied by a calling action to a telephone number, according to a set profile. For example, the web page can contain a script program, which can be activated by the argument in the QR code. The content of the script program can be encrypted or hidden, to ensure privacy.

The arguments to the web address can be added to the web address, after the web address is read from QR codes, for example, by an application reading the QR codes. For example, the application can read data from the communication device, such as GPS coordinates to identify the location of the communication device, and then add the GPS coordinates as an argument to the web address. The GPS argument can allow the script program in the web page to identify the location of the communication device, and act accordingly.

FIGS. 24A-24D illustrate business cards incorporating QR codes according to some embodiments. The QR codes can link to web pages which can provide information set up by the QR codes.

Figure 24A:
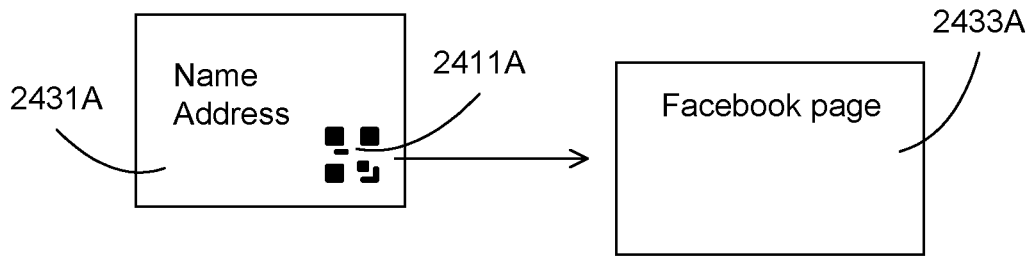
FIGS. 24A-24D illustrate business cards incorporating QR codes according to some embodiments.

In FIG. 24A, a business card 2431A can have a QR code 2411A, together with other information such as name and address. The QR code can contain information to allow a communication device to access a social media site, such as a facebook site. This business card can be provided to social acquaintances.

Figure 24B:
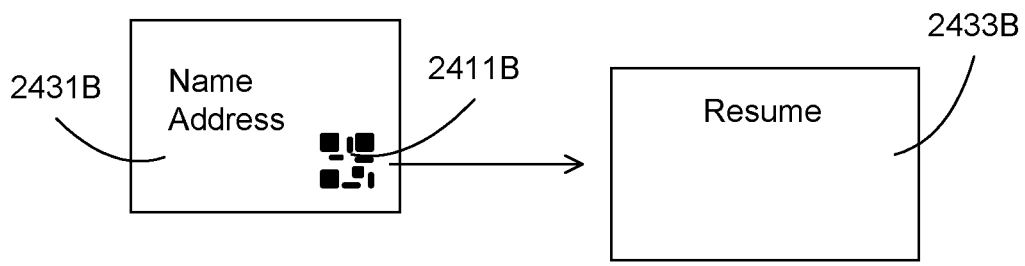

In FIG. 24B, a business card 2431B can have a QR code 2411B, together with other information such as name and address. The QR code can contain information to allow a communication device to access a resume, e.g., a server can send a resume to the communication device. This business card can be provided to prospective employers.

Figure 24C:
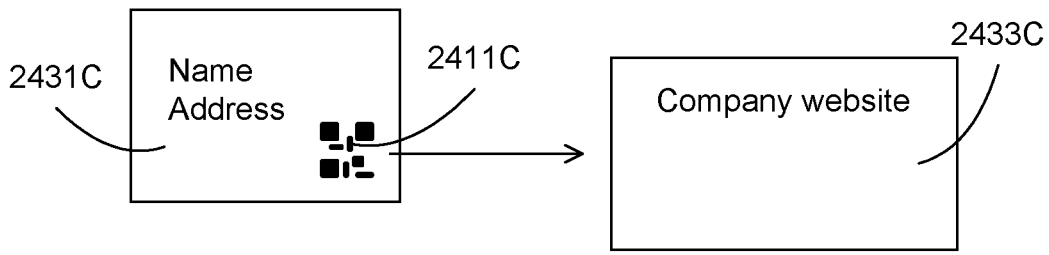

In FIG. 24C, a business card 2431C can have a QR code 2411C, together with other information such as name and address. The QR code can contain information to allow a communication device to access a company web site. This business card can be provided to business associates.

Figure 24D:
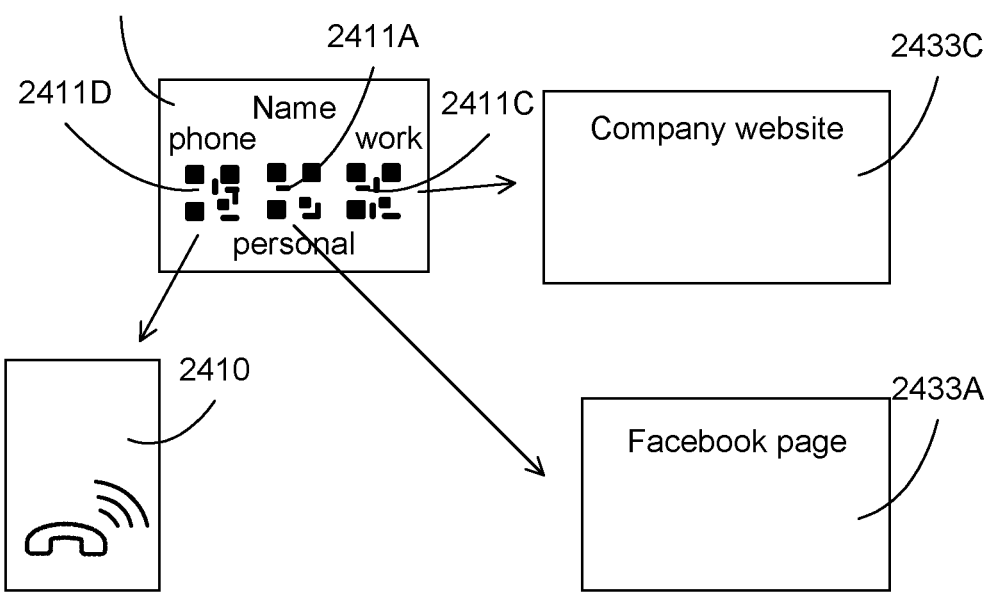

In FIG. 24D, a business card 2431D can have multiple QR codes 2411A, 2411C, and 2411D, together with other information such as name and address. The QR code 2411A can contain information to allow a communication device to access a social media site, such as a facebook site. The QR code 2411C can contain information to allow a communication device to access a company web site. The QR code 2411D can contain contact information to allow a caller communication device to call.

The token can also be incorporated in different components. Using an optical element of QR code, the QR code token can be printed on various materials, such as on paper, on plastic, or on metal.

Figure 25A:
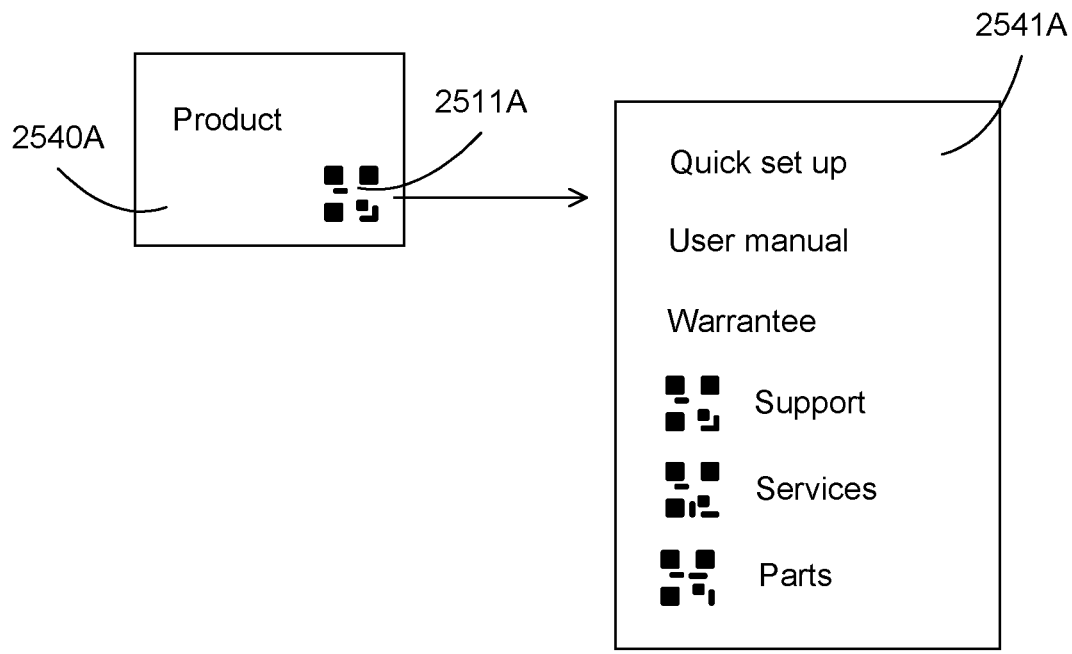
FIGS. 25A-25C illustrate items incorporating QR codes according to some embodiments.
Figure 25B:
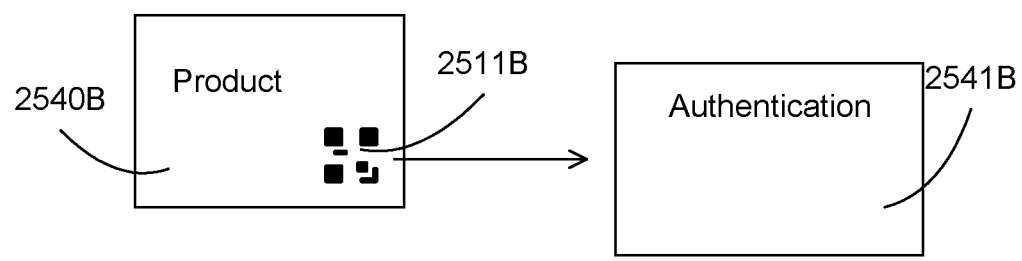
Figure 25C:
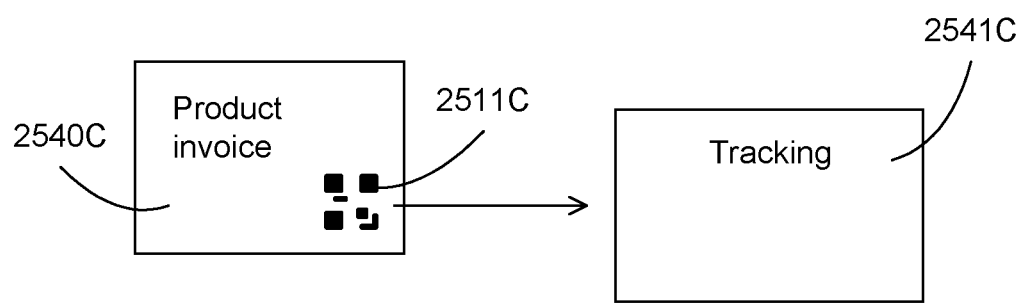

FIGS. 25A-25C illustrate items incorporating QR codes according to some embodiments. The QR codes can link to web pages which can provide information for the items.

In FIG. 25A, a product 2540A can have a QR code 2511A, together with other information such as product name and model number. The QR code can contain information to allow a communication device to access information 2541A related to the product, such as set up information, a user manual, warrantee information, and contact information (such as QR codes for calling, texting or emailing) for support, services, or parts.

In FIG. 25B, a product 2540B can have a QR code 2511B, together with other information such as product name and model number. The QR code can contain information to allow a communication device to check for the authentication 2541B of the product, e.g., to verify that the product is not a counterfeit product.

In FIG. 25C, a product invoice 2540C can have a QR code 2511C, together with other information such as product name and model number. The QR code can contain information to allow a communication device to check for the delivery of the product, such as to track the location 2541C of the product that has been shipped. Other usages of the QR codes can also be used, such as information on where to buy the products.

FIGS. 26A-26D illustrate applications of the communication according to some embodiments. In FIG. 26A, a person can advertise an item for sale, and listing on a brochure 2634A the for sale item, together with a QR code 2611A for callers to contact. The QR code can have a profile that restricts the time and the date of calling. For example, the QR code can limit the call to after business hours, such as early in the morning or in the evening. The QR code can have a date limit, e.g., after the date, the item is no longer available for sale.

In FIG. 26B, a person can advertise an item for sale, and listing on a brochure 2634B the for sale item, together with a contact QR code 2611B and a QR code 2611C for additional information. For example, a caller can call the information QR code 2611C to obtain files related to the sale item, such as pictures or manual. The profile for the QR code 2611B can be updated, for example, changed to invalid after the item is sold.

In FIG. 26C, a store, such as a restaurant, can provide a reservation number 2635A in a QR code 2611D. The profile of the QR code can be configured to have sequential receivers, such as the receptionist can be a first receiver, and other waiters can be subsequent receivers. Thus, a caller can use the QR code to make reservation. The receptionist device can be notified first. If the receptionist is not available, such as busy or out of battery or out of network range, the subsequent receivers can be notified, such as waiter 1. The QR code thus can provide security for answering callers, ensuring that there is always someone who can answer the phone.

In FIG. 26D, a store, such as a hardware store, can provide a service counter number 2635B in a QR code 2611E. The profile of the QR code can be configured to have parallel receivers, such as multiple workers in the store. Thus, a caller can use the QR code to call the service counter. All listed workers can be notified. When a worker answers the call, other notification can be terminated.

FIGS. 27A-27C illustrate flow charts for communication according to some embodiments. In FIG. 27A, operation 2700 forms a brochure for personal information. The brochure can include multiple QR codes for contact information and for additional information.

In FIG. 27B, operation 2720 forms a brochure for selling an item. The brochure can include a QR code for callers with calling conditions and a QR code for getting information regarding the item. Operation 2730 updates the calling conditions when there is a change in the selling process.

In FIG. 27C, operation 2750 lists a service. The listing comprises a QR code for a caller to call. The QR code is linked to multiple recipients. The multiple recipients are configured to be called in series or in parallel until one of the multiple recipients answers the call.

In some embodiments, the mode of communication for a token, e.g., QR code, can be based on the QR code. For example, the QR code can be configured for call, then the caller can use a calling icon to call the QR code, a scanner to scan the QR code, or other icons to communicate using the QR code, the server still treat the communication as a calling communication, e.g., either a voice communication or a video communication. Similarly, if the QR code is configured for a message or for a file transfer, the caller can also use the calling icon, the scanner function, or other icons such as the SMS icon, the server still treat the communication as a message or a file transfer communication, e.g., accept the message from the caller, sending the caller a message, accept a file from the caller, or sending the caller a file.

In some embodiments, the mode of communication for a token, e.g., QR code, can be based on the caller. For example, the caller can compose a message and send to the receiver using the QR code. Even though the QR code is configured for call, the caller can accept the message and forward it to the receiver.

In some embodiments, the communication can be through the Internet, such as from a caller communication device to the server to a receiver communication device. The QR code can be accessed by the caller communication device, such as scanning a QR code or from a stored QR code. The QR code can be accessed at a web page, such as at a web site of a vendor, also through the Internet. The communication mode can be selected before starting the communication, or after the server has been reached. The communication can include calling, texting, emailing, receiving or sending files. For privacy purpose, the information to enable the communication may or may not be shown to the user. For example, the caller can call, by contacting the server through the link in a QR code, but the identification of the receiver is not shown to the user.

In some embodiments, a caller communication device, such as a cell phone, can start a call by first reading a QR code. There can be multiple icons in the communication device, and the user can select the call icon to start the call. The QR code can be scanned by a scanner of the communication device, or the QR code can be stored or sent to the communication device. Alternatively, the user can select the scanner to read the QR code. The scanner can have a profile so that after scanned, the communication device can automatically be launched in a call mode (or other modes such as texting or emailing) Or the QR code can contain instruction so that after being scanned, the communication device can automatically be launched in a call mode (or other modes such as texting or emailing).

The communication device can then access the web address stored in the QR code. After accessing the web site hosted by a server, the caller communication device can be directed by the server to the receiver communication device, such as a cell phone or a desk phone. The receiver device can be connected to the server through a wire network, or a wireless network such as a local area network or a wide area network such as the Internet.

The user can select other icons, such as the message icon, compose the message and then start reading the QR code for sending the message. Alternatively, the user can compose the message after reading the QR code and before access the web address. For example, the communication device can access the web address with an argument containing the message. Thus, when connected with the server, the message can be sent to the destination.

Figure 28A:
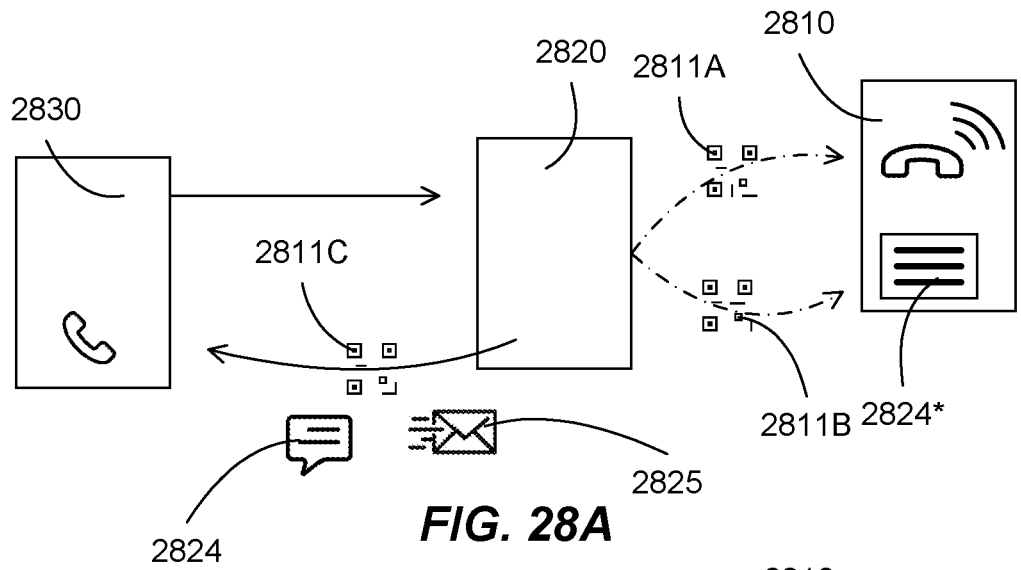
FIGS. 28A-28C illustrate mechanisms for communication according to some embodiments.
Figure 28B:
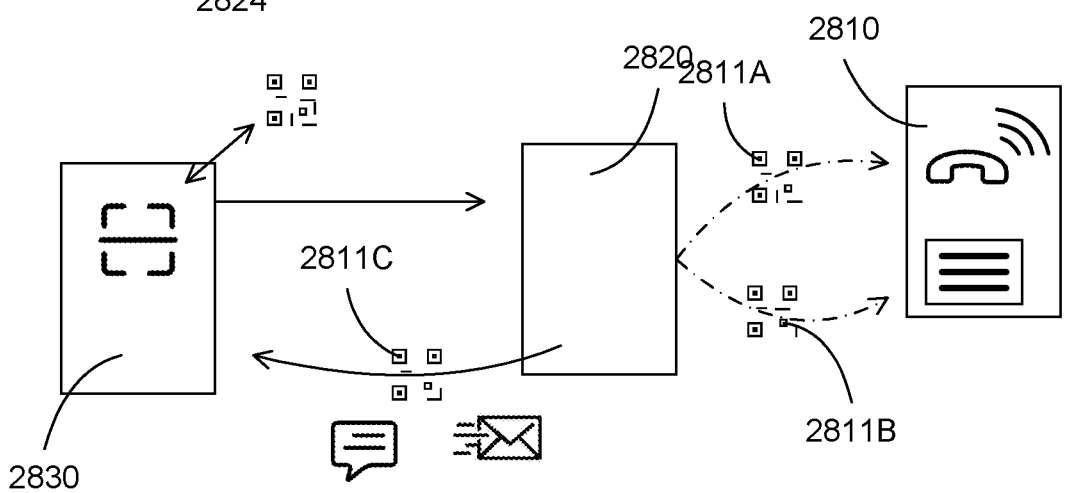
Figure 28C:
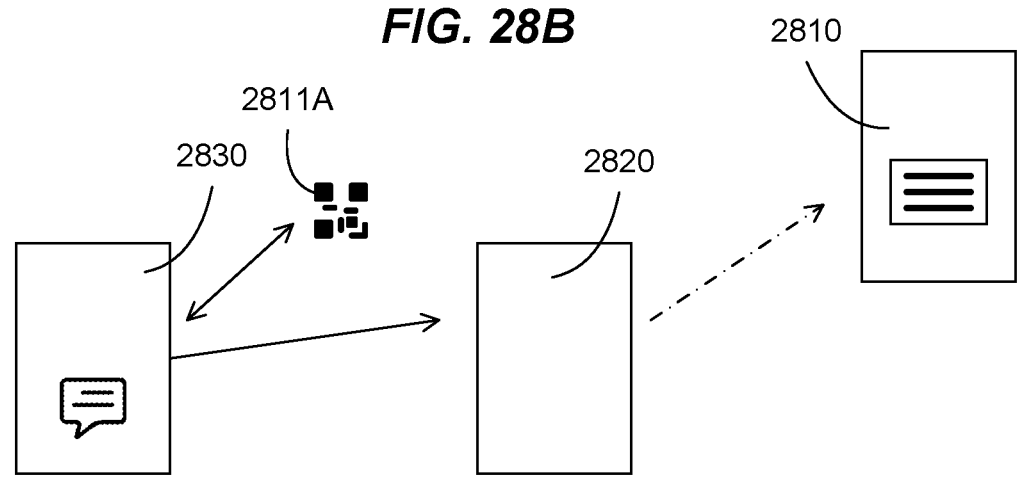

FIGS. 28A-28C illustrate mechanisms for communication according to some embodiments. In FIG. 28A, a caller communication device 2830 can call with a QR code to perform a communication, such as calling, messaging, or emailing. The communication mode can be determined by the QR code, even if the caller calls the receiver device.

For example, the QR code 2811A can be configured for calling. The caller can call the sever 2820 using the QR code 2811A. The server can connect the caller with the receiver device 2810 for voice or video communication. The QR code 2811B can be configured for sending a message, such as a SMS message. The caller can call the sever 2820 using the QR code 2811B. The server can connect the caller with the receiver device 2810 for message communication, e.g., for the caller to send a message 2824*. The caller can call the sever 2820 using the QR code 2811C. The server can connect the caller with the receiver device 2810 for message communication, e.g., for the caller to receive a message 2824. Other communication mode can be used, such as email communication for sending or receiving email 2825, or file transfer communication.

In FIG. 28B, the caller can use a scanner icon, and the communication mode is determined by the QR code. For example, QR code 2811A is for calling, QR code 2811B is for sending message, QR code 2811C is for receiving file, etc.

In FIG. 28C, the mode of communication can be determined by the caller action. For example, the caller 2830 can send a message using a QR code 2811A, which is configured for calling. The server 2920 can forward the message to the receiver device 2810, even though the caller uses a calling QR code to send a message.

In some embodiments, the communication can be through other networks, such as a cellular network or a local area network. The QR code can be accessed by the communication device, such as scanning a QR code or from a stored QR code. The QR code can be accessed at a web page, such as at a web site of a vendor, through the Internet. The QR code can also be accessed through other networks. The communication mode can be selected before starting the communication, or after the server has been reached. The communication can include calling, texting, emailing, receiving or sending files.

Figure 29A:
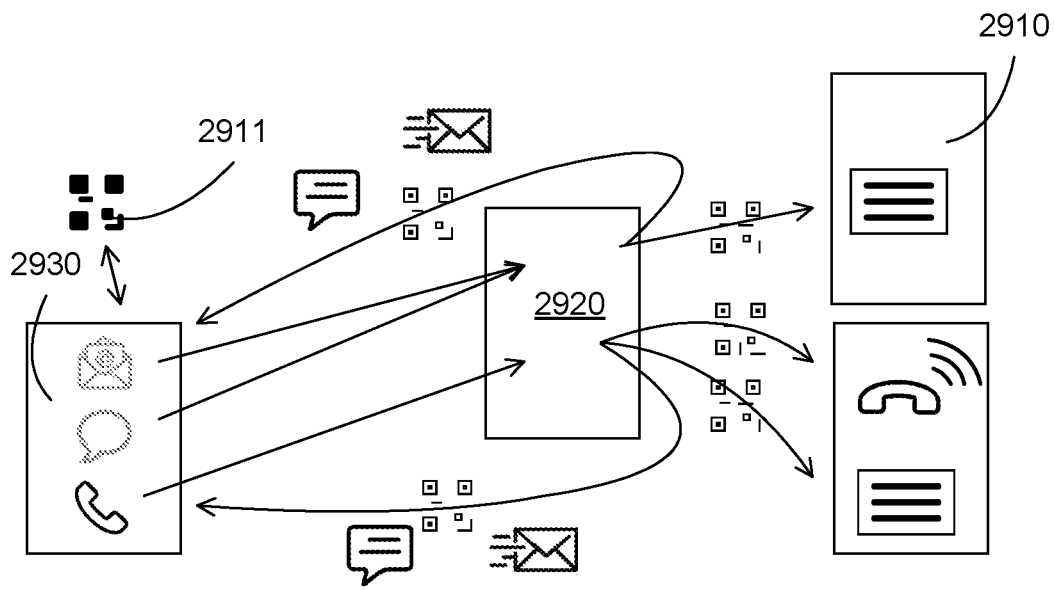
FIGS. 29A-29B illustrate mechanisms for communication according to some embodiments.
Figure 29B:
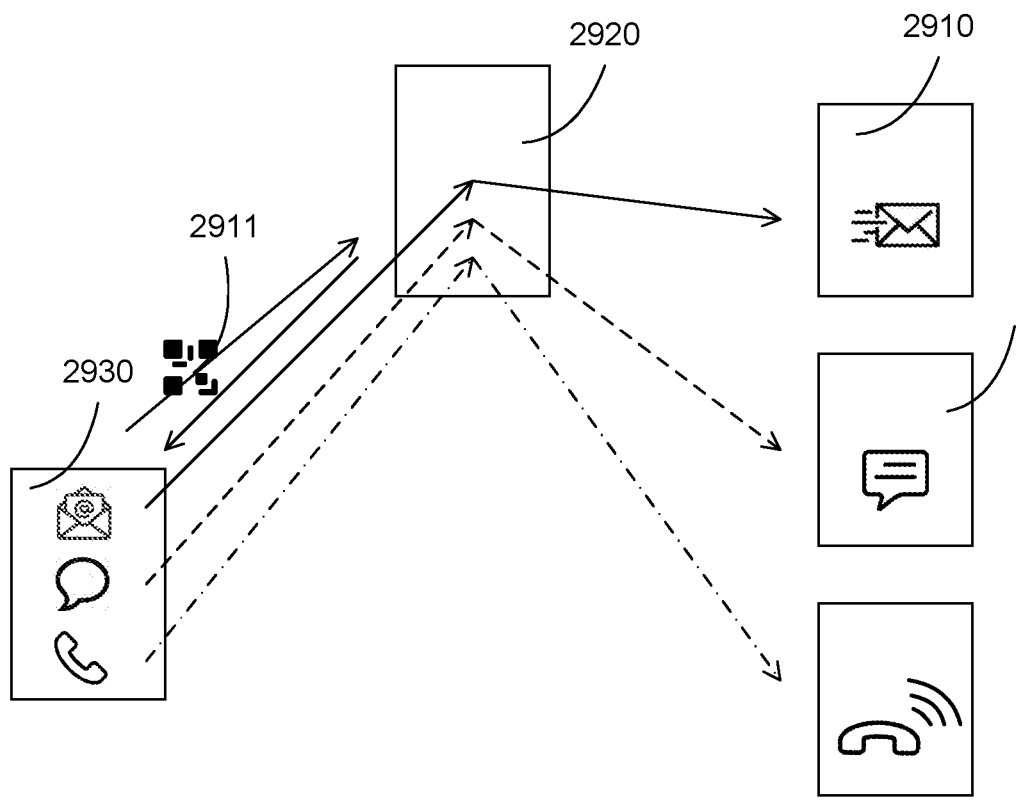

FIGS. 29A-29B illustrate mechanisms for communication according to some embodiments. In FIG. 29A, a caller communication device 2930 can use a QR code 2911 to perform a communication, such as calling, messaging, or emailing A communication device, such as a cell phone 2930, can start a call by first reading a QR code 2911. There can be multiple icons in the caller communication device, and the caller can select an icon to start the communication. The QR code can be scanned by a scanner of the communication device, or the QR code can be stored or sent to the communication device. The communication device can then access the web address stored in the QR code. After accessing the web site hosted by a server 2920, the server can direct the communication device to the destination 2910, such as a cell phone or a desk phone. The communication mode can be determined partly by the selection of the caller, and partly by the QR code.

For example, the caller can send select a call icon. Depending on the QR code, the server 2920 can treat the communication as a call, e.g., a voice or video communication. The server can also treat the communication as a sending message, to send a message to the receiver, or a receiving message or email, to get the information from the receiver.

The caller can select other icons, such as the message or email icon, compose the message or email and then start reading the QR code for sending the message. Alternatively, the user can compose the message after reading the QR code and before access the web address. For example, the caller communication device can access the web address with an argument containing the message. Thus, after connected with the server, the caller data can be forwarded to the receiver.

In FIG. 29B, a caller communication device can use a QR code to start a communication, such as calling, messaging, or emailing A caller communication device, such as a cell phone 2930, can first reading a QR code 2911. The caller communication device can then access the web address stored in the QR code. After accessing the web site hosted by a server 2920, the server can show multiple icons in the caller communication device, and the caller can select an icon to continue. For example, the caller can select the call icon to start a call, or select the message icon to send or receive messages. After the selection, the caller communication device can connect to the receiver device to complete the communication.

FIGS. 30A-30C illustrate flow charts for communication according to some embodiments. In FIG. 30A, operation 3000 receives, by a server, a call requesting a communication using a QR code from a caller communication device. Operation 3010 responds based on the conditions and limitations of the QR code. The response can include one of connecting the caller communication device to a receiver communication device, sending a message from the caller communication device to the receiver communication device, or sending a message to the caller communication device.

In FIG. 30B, operation 3030 receives, by a server, a message using a QR code from a caller communication device. Operation 3040 sends the message to a receiver communication device based on limitations of the qr code, regardless of whether the qr code is for message or not.

In FIG. 30C, operation 3000 receives, by a server, a message using a QR code from a caller communication device. Operation 3070 responds to the caller communication device. The respond can include a menu of calling, messaging, emailing, or receiving a message.

In some embodiments, the present invention discloses a call center utilizing tokens, such as QR codes, as contact information. There can be a large number of QR codes, for example, one for each function, which can allow the call center to distinguish the clients based on the QR codes. The number of QR codes can be much larger than the available communication devices in the call center, e.g., larger than the number of operators of the call center, since multiple QR codes can be directed to a same communication device. The QR codes can be fully customizable for its destination, scanning limit, one-time calling validity, expiration date, call duration, and other communication purposes to ensure complete privacy control. For example, a classified advertisement can be posted with a time-limited QR code, which can allow contact from prospective buyers for a certain time only. Once the transaction is completed, the QR code can be expired and there will be no valid contact information in the QR code.

Also, different QR codes can be created for different departments and automatically directs the customers to the right representatives for sales or customer service without any software or account. The QR code can also allow the operators of the call center to have records of the customers ready before answering the calls. The QR codes can also provide toll free business communication without barriers and boundary, with full flexibility, and privacy control.

Figure 31:
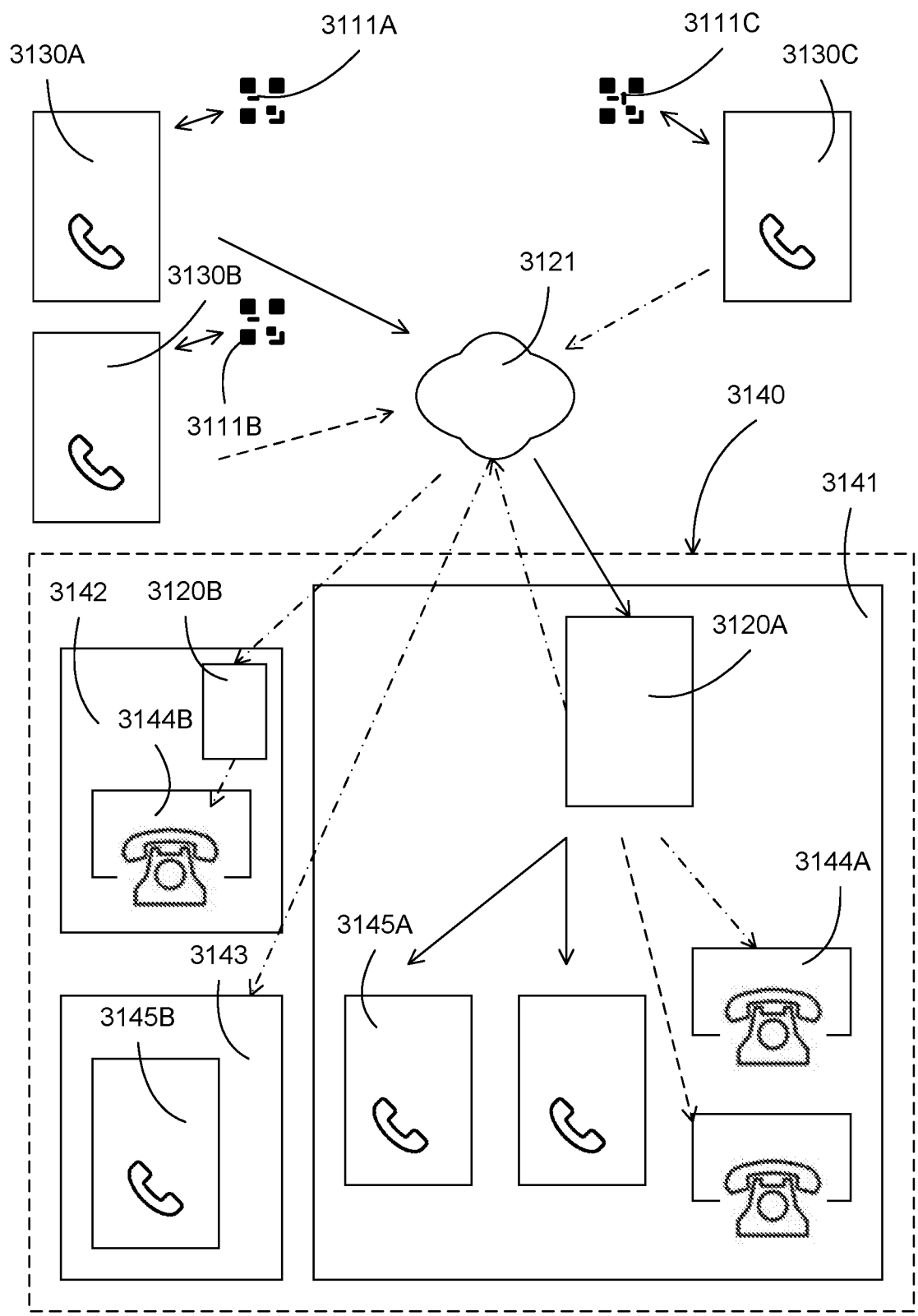
FIG. 31 illustrates a schematic of a call center according to some embodiments.

FIG. 31 illustrates a schematic of a call center according to some embodiments. A call center 3140, which can include a main center 3141 and one or more satellite center 3142 and 3143, can include servers 3120A and 3120B, together with multiple communication devices. Displays can be used with communication devices without screens, e.g., desk phones, to provide operators with caller information. Some of the communication devices 3144A and 3145A can be at the main center location, e.g., at a same location as the server 3141. The communication devices 3144A and 3145A can be connected to the server 3120A through wire or wireless connection, such as through a local area network. Some of the communication devices 3144B can be located in a satellite center 3142, e.g., away from the main center and from the server 3141, which can include a router or a server to be connected to the server 3141 through the Internet, or through other network. Some of the communication devices 3145B can be located in a satellite center 3143, e.g., away from the main center and from the server 3141, such as a mobile phone capable of connected to the server 3141 through the Internet, or through other network.

Callers 3130A, 3130B, and 3130C can use QR codes 3111A, 3111B, and 3111C to contact the call center. The calls can be directed to appropriate communication devices, with information about the callers shown on the displays. The information can be based on the QR codes, thus can allow the servers 3141, 3142, and 3143 of the call center to distribute the calls, together with passing information about the callers to the displays. A call center can be used to support one company or multiple companies, with no confusion between the companies. Different QR codes can serve as distinction between companies, e.g., different companies can have different sets of QR codes. Thus, the call center can be scalable, e.g., starting out small with one phone and one operator, but can be set up to handle multiple companies with multiple departments using different QR codes that are all linked to a same telephone number. With increased services, additional communication devices and operators can be added, and the QR code web pages can be modified to reflect the changes. The added operators and communication devices can be located at the call center, or can be located away from the call center.

FIGS. 32A-32F illustrate a scheme for the call center according to some embodiments. In FIG. 32A, each customer, or each group of customers, can have a unique QR code. Thus, when the customer using the individual QR code to call the call center, information related to the customer, such as the records of the customer, can be shown for an operator at the call center. The information can allow the call center to serve the customers based on their individual preferences, without needing asking the customers.

In FIG. 32B, different regions can unique QR codes, for example, a first QR code for Europe, a second QR code for the U.S., a third QR code for Asia, etc. Thus, no matter where the call center is located, all calls using the regional QR codes can be either recognized or routed to operators specializing in the regions. For example, a call using US QR code can be routed to an English speaking operator, while a call using China QR code can be routed to a Mandarin speaking operator.

In FIG. 32C, different products can unique QR codes, for example, a first QR code for desktop computers, a second QR code for laptop computers, a third QR code for electronic components or computer parts, etc. Thus, calls using the laptop computer QR codes can be recognized and then routed to sale persons for laptop computers.

In FIG. 32D, different functions can unique QR codes, for example, a first QR code for sales, a second QR code for services, a third QR code for support, etc. Thus, calls using the sale QR codes can be recognized and then routed to sale persons.

In FIG. 32E, different QR codes can be linked to different communication devices, such as QR codes for sale, service, and support, in addition to QR codes for regions, products, and customers. The number of communication devices can be based on the number of calls, in order to handle the calling traffic. In FIG. 32F, different QR codes can be linked to same communication devices, such as QR codes for different region, e.g., Asia, Europe, and US, in addition to QR codes for sale, service, support, products, and customers. The number of communication devices can be based on the size of the call center, including the number of calls, in order to optimize the cost.

FIGS. 33A-33C illustrate flow charts for communication according to some embodiments. In FIG. 33A operation 3300 forms a call center. The call center can include one or more servers configured to receive and process communication requests from callers using QR codes. The call center can include one or more operators configured to receive communication from the one or more servers to communicate with the callers. The one or more server can be configured to provide identification of the callers based on the QR codes for the one or more operators.

In FIG. 33B operation 3320 forms a call center. The call center can include one or more servers configured to receive and process communication requests from callers using QR codes. The call center can include one or more operators configured to receive communication from the one or more servers to communicate with the callers. The one or more server can be configured to classify the callers based on the QR codes to distribute to the one or more operators.

In FIG. 33C operation 3340 forms a call center. The call center can include one or more servers configured to receive and process communication requests from callers using QR codes. The call center can include one or more operators configured to receive communication from the one or more servers to communicate with the callers. The one or more server can be configured to distribute callers calling from different companies or from different departments or from different concerns to a same operator of the one or more operators.

Figure 34A:
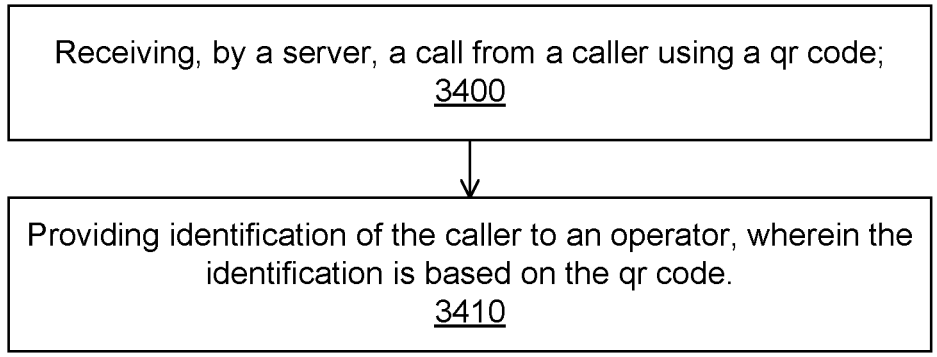
FIGS. 34A-34C illustrate flow charts for communication according to some embodiments.
Figure 34B:
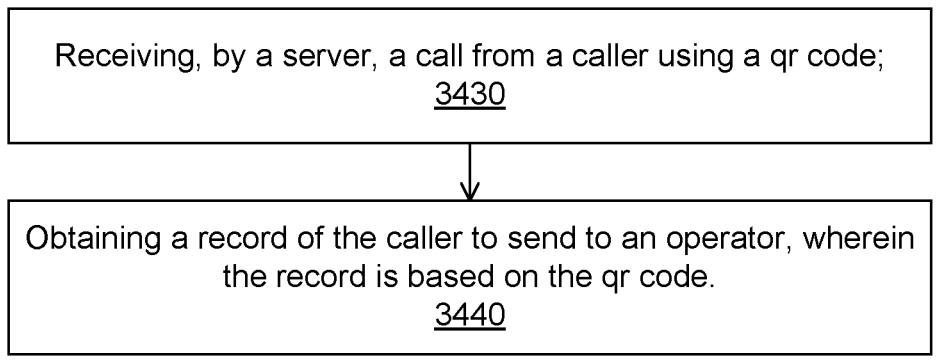
Figure 34C:
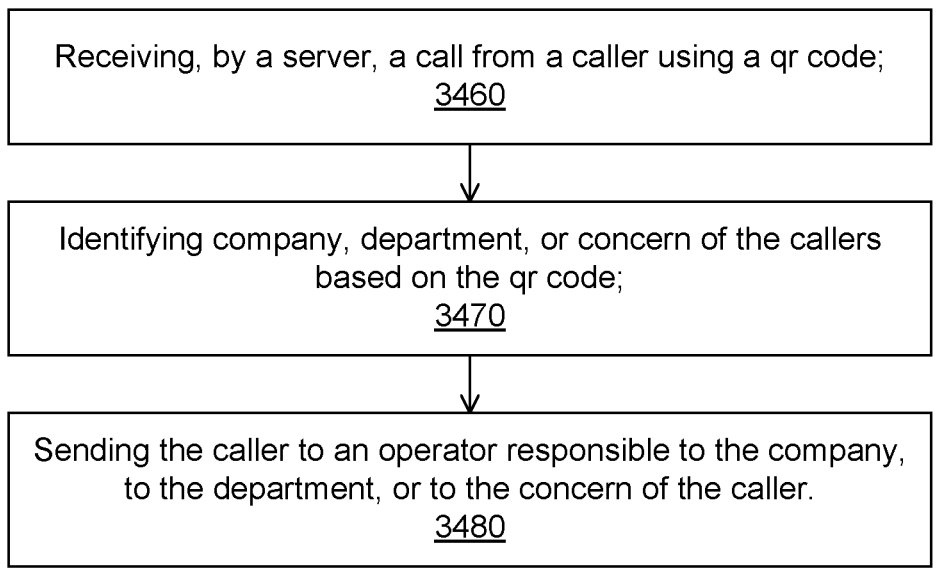

FIGS. 34A-34C illustrate flow charts for communication according to some embodiments. In FIG. 34A, operation 3400 receives, by a server, a call from a caller using a QR code. Operation 3410 provides identification of the caller to an operator. The identification is based on the QR code.

In FIG. 34B, operation 3430 receives, by a server, a call from a caller using a QR code. Operation 3440 obtains a record of the caller to send to an operator. The record is based on the QR code.

In FIG. 34C, operation 3460 receives, by a server, a call from a caller using a QR code. Operation 3470 identifies company, department, or concern of the callers based on the QR code. Operation 3480 sends the caller to an operator responsible to the company, to the department, or to the concern of the caller.

In some embodiments, the call center can be easily scalable, e.g., the number of operators and/or communication devices can always be optimized for the number of customers. For a small number of customers, which can include multiple companies, the number of operator can be small With an increase number of companies or employees per company, the number of operator can increase to meet the workload demand.

Figure 35A:
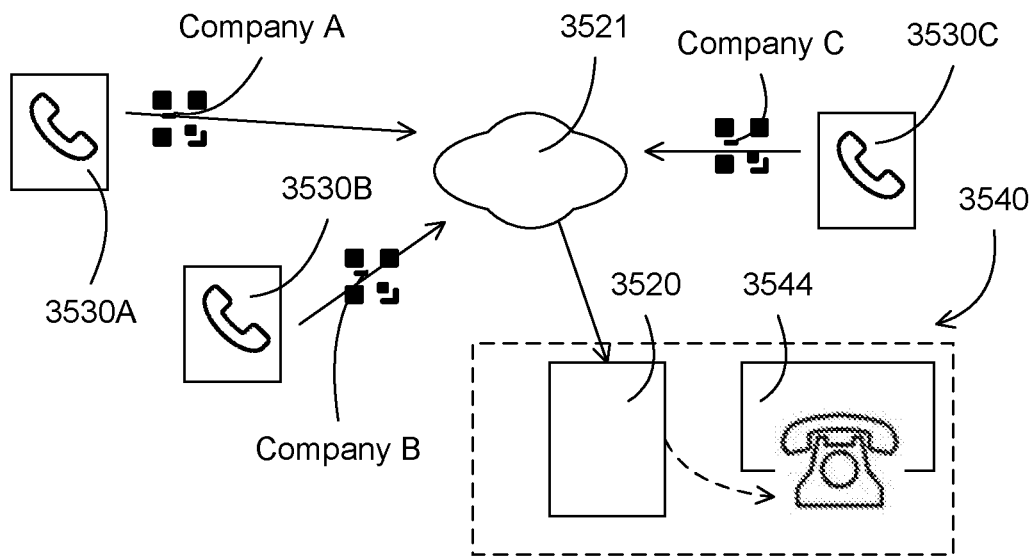
FIGS. 35A-35B illustrate a scaling up of a call center according to some embodiments.
Figure 35B:
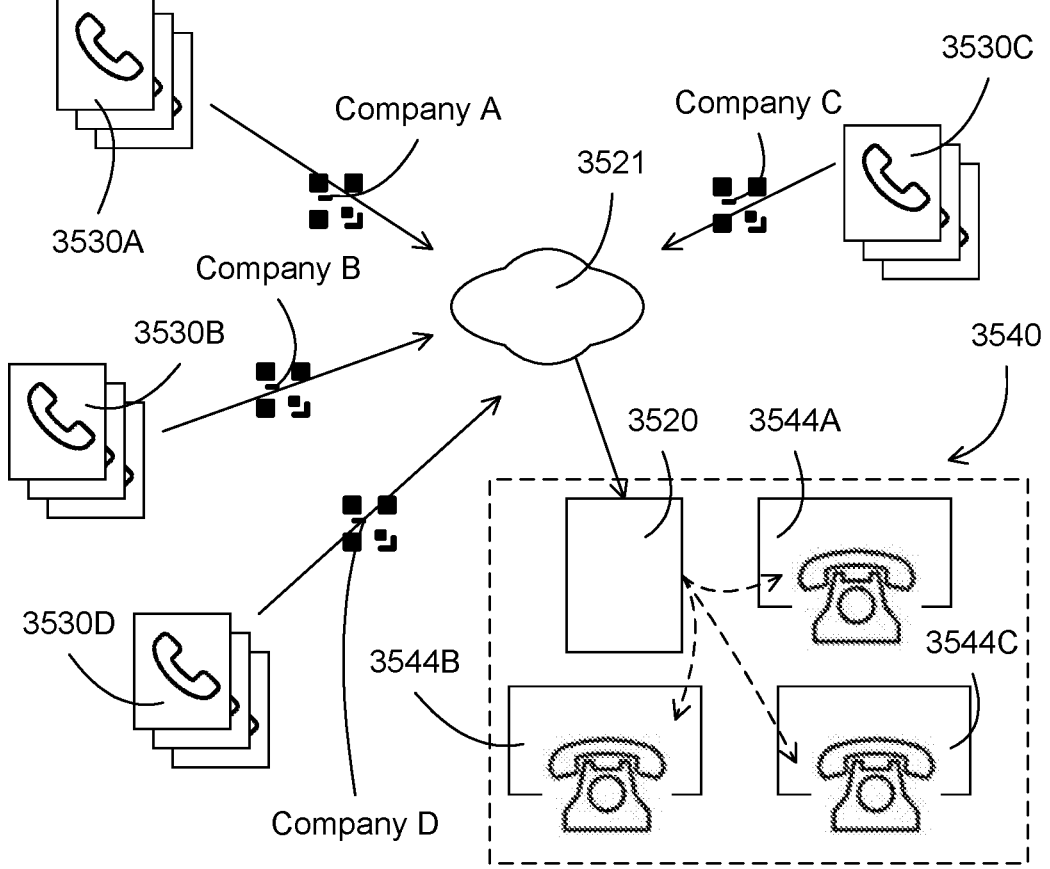

FIGS. 35A-35B illustrate a scaling up of a call center according to some embodiments. FIG. 35A shows a call center 3540, which can be a small call center with one operator running a communication device 3544, which is serviced by a server 3520. The call center can serve multiple companies, such as company A, company B, and company C. Each company can have a small number of employees, such as employees 3530A, 3530B, and 3530C. In general, the number of calls from the employees of the companies can be handled adequately by the operator. The operator can manage the multiple companies with multiple employees, due to the various tokens, e.g., QR codes. Each company, and optionally, each department or each employee of the companies, can call the call center using different QR codes. Thus, the operator can have a record of the call, displayed on a display in order to answer the call effectively.

Thus, using the QR codes, the calls can be sorted, which can assist the operator to quickly address the problems in the calls. The ability of the operator to handle different companies, different departments, and different inquiries can be attributed to the QR codes, which can allow the operator to recognize the called issue before talking to the callers. Further, from the point of view of the companies, the call center are well equipped, e.g., having different contact information for different issues.

FIG. 35B shows a same call center 3540 that has been scaled up to three operators 3544A-3544C to handle more calls, such as more companies with more employees. The call center now can serve company A, company B, company C, and company D, with each company having more employees, such as employees 3530A, 3530B, 3530C, and 3530D.

In some embodiments, the tokens, such as the QR codes, can allow the receiver to have advance knowledge of the call, since the receiver can issue different QR codes for different issues and concerns, such as different QR codes for different companies, different QR codes for different departments in a same company, and different QR codes for different employees in a company. The receiver can also have records of the companies, the departments, and the employees, and thus can have the records displayed before communicating with the callers.

Figure 36A:
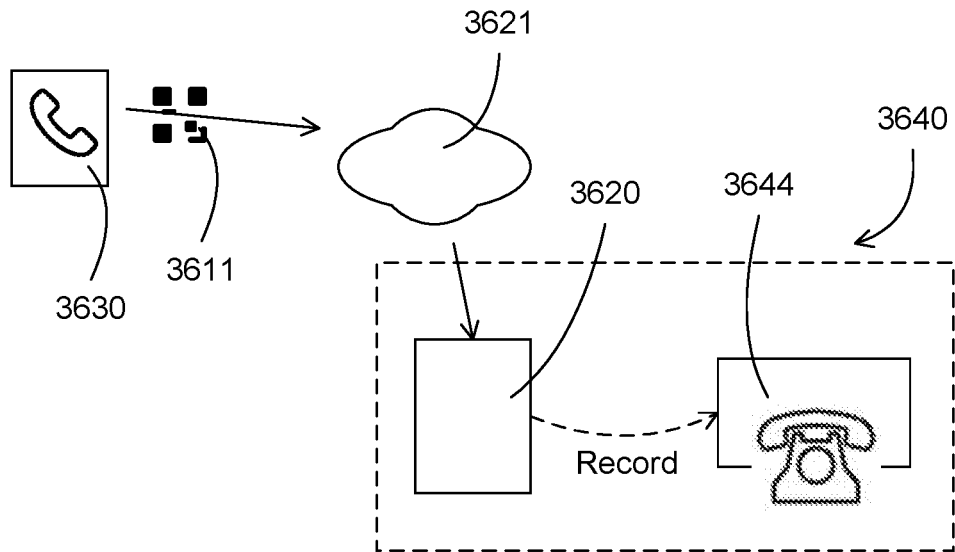
FIGS. 36A-36B illustrate a communication system for handling QR codes according to some embodiments.
Figure 36B:
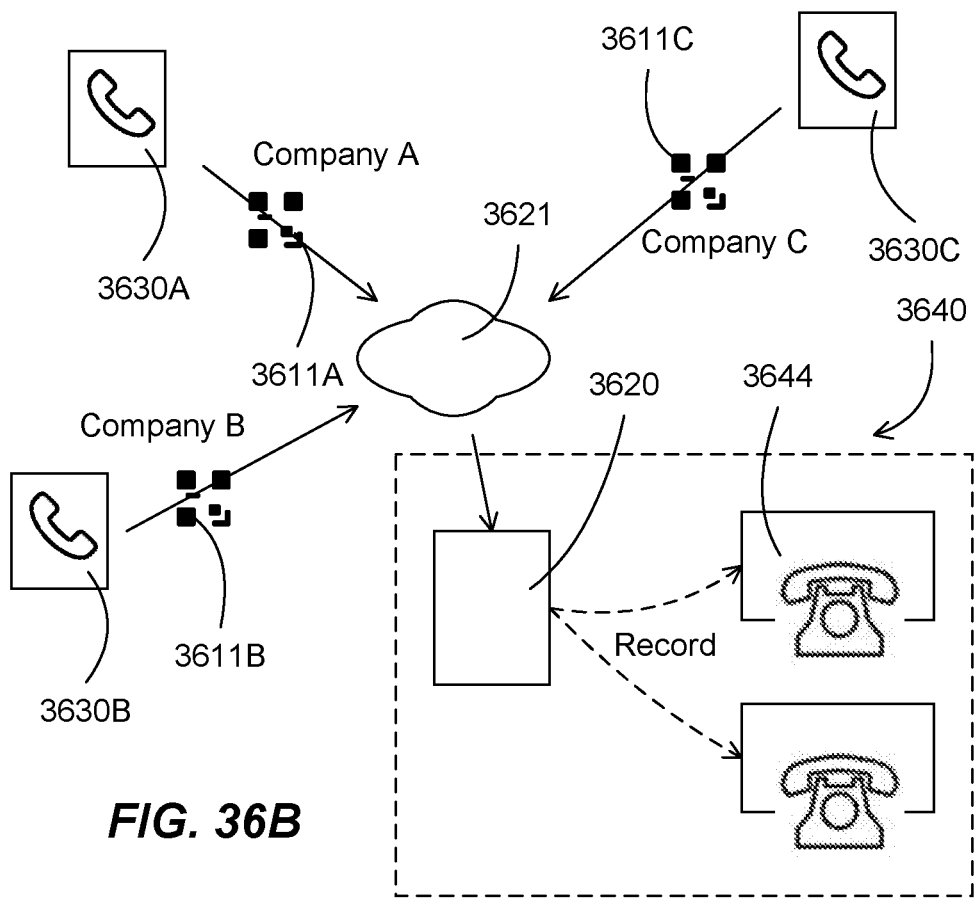

FIGS. 36A-36B illustrate a communication system for handling QR codes according to some embodiments. In FIG. 36A, a receptionist of a company 3640, such as a dental office, can have a communication device 3644 connected to a server 3620. A client 3630 can use a QR code 3611 to contact the dental office, through the Internet network 3621. The server 3620 can receive the call, and can pull records of the client from the database of the company. The records can be sent to the receptionist device 3644, together with a communication notification, e.g., a ring tone on the receptionist device. The receptionist can effectively communicate with the client, since the client records are readily displayed at the receptionist device for viewing.

In some embodiments, the company 3640 can be a call center, responsible for handling communication of the dental office.

In FIG. 36B, the call center 3640 can be scaled up to handle multiple companies, with the records of the clients stored in a database to allow the operator to view the records before communicating with the clients. For example, the call center 3640 can now have two operators, and designed to handle three companies A, B and C, with each company and clients of each company having different QR codes 3611A, 3611B, and 3611C.

Figure 37:
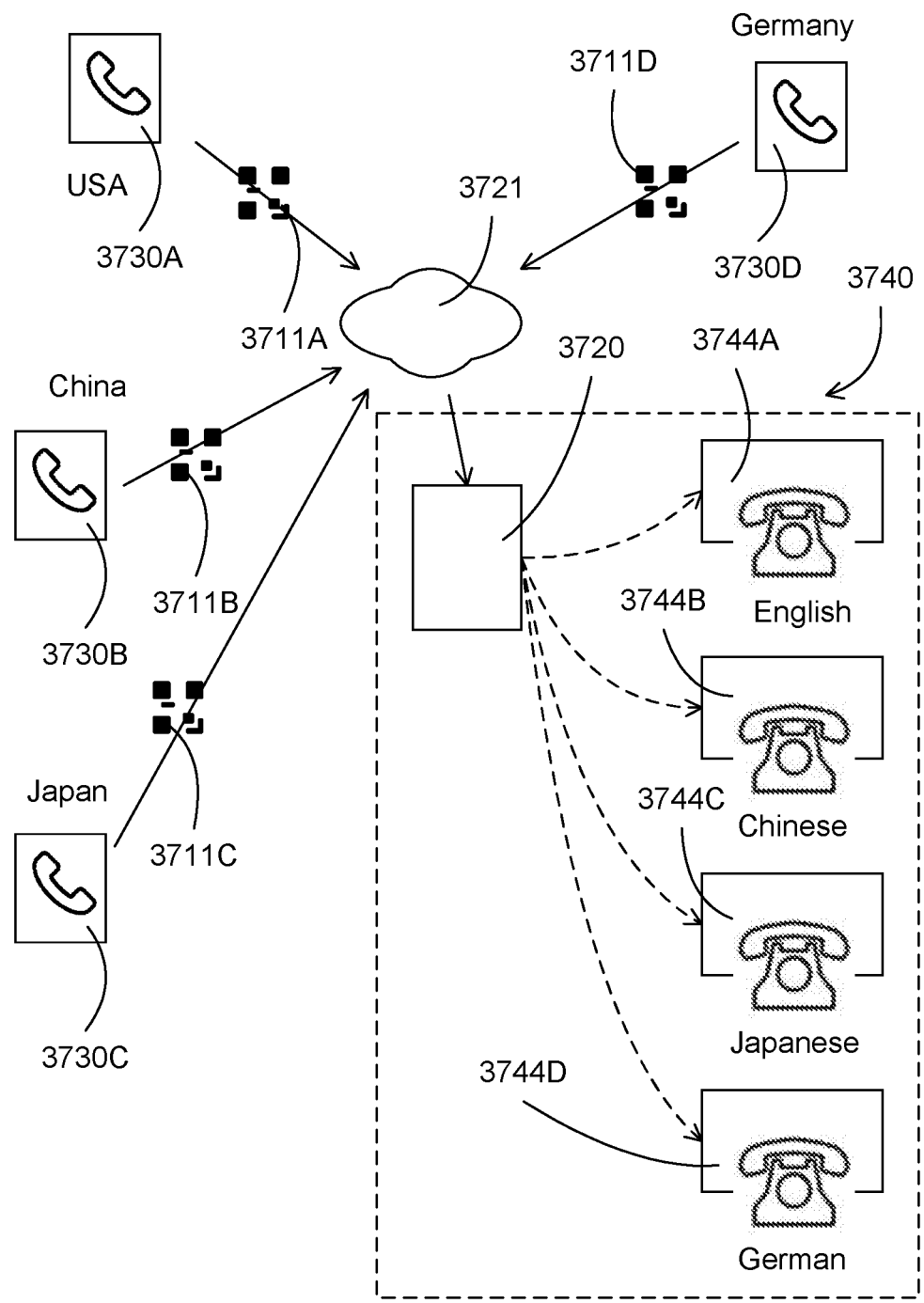
FIG. 37 illustrates a call center configuration according to some embodiments.

FIG. 37 illustrates a call center configuration according to some embodiments. A call center 3740 can be configured to answer calls from around the world, e.g., from callers in different countries talking different languages. The call center can have different operators working at different communication devices 3744A, 3744B, 3744C, and 3744D connected to a server 3720. Different operators can be fluent in different languages, such as English, Japanese, German, and Chinese. As shown, the operators are located in a main center of the call center. Other configurations can be used, such as the operators can be located in satellite centers of the call center at different countries. For example, an English speaking operator can be located in a satellite center in America. A Japanese speaking operator can be located in a satellite center in Japan.

Clients 3730A-3730D can use QR codes 3711A-3711D to contact the call center, through the Internet network 3721. Different clients from different countries can speak different languages. The server 3720 can receive the calls, and can pass the calls to appropriate operators, e.g., operators who speak the same language as the callers, based on the QR codes.

FIGS. 38A-38C illustrate flow charts for communication according to some embodiments. In FIG. 38A, operation 3800 provides a server. The server can include a number of operators configured to adequately respond to a number of calls using QR codes. Operation 3810 increases the number of operators when the number of calls increases to maintain the adequacy of responses.

In FIG. 38B, operation 3830 provides a server. The server can include a number of operators configured to adequately respond to calls from multiple companies or multiple departments or multiple products using QR codes to distinguish between the companies, the departments, or the products. Operation 3840 increases the number of operators when the calls increase to maintain the adequacy of responses.

In FIG. 38C, operation 3860 provides a call center for responding to calls using QR codes. The QR codes can be configured to allow the call center to distinguish between multiple companies, multiple departments, or multiple products. The QR codes can be configured to allow a scalability of number of operators with number of calls.

FIGS. 39A-39C illustrate flow charts for communication according to some embodiments. In FIG. 39A, operation 3900 provides a server. The server can include one or more operators configured to respond to callers using QR codes. Operation 3910 sends records of the callers to the one or more operators based on the QR codes.

In FIG. 39B, operation 3930 provides a server. The server can include one or more operators configured to respond to callers from multiple companies or multiple departments or multiple products using QR codes to distinguish between the companies, the departments, or the products. Operation 3940 sends records of the callers to the one or more operators based on the QR codes.

In FIG. 39C, operation 3960 provides a call center for responding to calls using QR codes. The QR codes can be configured to allow the call center to distinguish between multiple companies, multiple departments, or multiple products. The QR codes can be configured to allow retrieval records of callers to provide to operators receiving the calls.

FIGS. 40A-40C illustrate flow charts for communication according to some embodiments. In FIG. 40A, operation

4000 provides a server. The server can include one or more operators configured to respond to callers using QR codes. Operation 4010 sends the callers to operators of the one or more operators with appropriate languages based on the QR codes.

In FIG. 40B, operation 4030 provides a server. The server can include one or more operators configured to respond to callers from multiple regions or countries using QR codes to distinguish between the regions or the countries. Operation 4040 sends the callers to operators of the one or more operators with appropriate languages based on the QR codes.

In FIG. 40C, operation 4060 provides a call center for responding to calls using QR codes. The QR codes can be configured to allow the call center to distinguish between multiple regions or multiple countries. The QR codes can be configured to allow sending the callers to operators with appropriate languages.

In some embodiments, the present invention discloses a VoIP service, e.g., methods to communicate through the public network of Internet and platform, including systems and programs, to operate the VoIP service. The communication method can use the VoIP technology, to transfer communication data, such as voice, video, fax, messages, and files. The VoIP service can provide spontaneous communication using the Internet, which can include not requiring a caller to subscribe or register with the VoIP service in order to communicate with the receivers.

In some embodiments, the VoIP service method can include accepting registration from receivers, e.g., users who desire to be called using the VoIP technology. During registration, the receivers supply or let the VoIP service platform or server access the IP address of the receiver communication devices, such as the mobile devices including cell phone or smart phone and computer equipped with voice and video interface. The receivers also agree to supply or let the VoIP service platform access the IP address of the receiver communication devices when the receiver communication devices are connected to the Internet network.

The VoIP service method can also include accepting requests from the receivers to generate communication tokens, such as QR codes. The token can allow callers to communicate with the receivers through the VoIP service platform using VoIP technology. The method can also include accepting profiles associated with the tokens. The profiles can provide conditions, characteristics, and provisions to treat the communication from the callers, including when and how and who to connect the callers with, and what to do when the caller communication is rejected.

The method can include generating the tokens and sending the generated tokens to the receivers, e.g., to the users who request the tokens. The tokens are configured so that the callers can use the tokens to contact the platform. The tokens are also configured so that the platform can associate the tokens with the IP addresses of the receivers and the profiles, if there are any, of the tokens.

For example, the tokens can contain the identification of the VoIP service platform, such as the IP address of the platform, to allow the callers to contact the platform. The tokens can contain a link to the identity of the receivers, such as the IP addresses of the receivers (e.g., the platform can obtain the IP addresses of the receivers when the receivers are connected to the Internet network) or the identification of the receivers (e.g., so that the platform can inquire about the IP addresses of the receivers when being contacted by the callers). The tokens can contain the profiles or links to the profiles of the tokens, to allow the platform to assess the conditions, the characteristics, and the provisions to treat the callers.

In some embodiments, a token can contain a webpage of a website that the platform runs for managing the VoIP service. The webpage can include the platform IP address together with the link to the information of the token, e.g., the token profile, and the specific receiver associated with the token, e.g., the IP address of the receiver.

In operations, a caller can contact the platform using a token, e.g., accessing the webpage of the platform website. The platform can locate the profile associated with the token, and verify that the communication satisfies the requirements of the token profile. The platform then locates the IP address of the receiver associated with the token, and connects the caller with the receiver.

In some embodiments, the IP address of the receiver is updated when the receiver changes the network address, such as moving from one network to another network. The platform can also obtain the new IP address of the receiver when the receiver is re-connected to the network. For example, the platform can recognize when the receiver is disconnected from the network, and can quickly respond to attempts of communication from the caller. For example, if the receiver is not connected to the network, the platform, after receiving a communication from the caller, can send a notice, such as a voice message or a text message, telling the caller that the receiver is not available.

The token profile can have a provision of calling back the caller. In that case, the platform can notify the caller that the receiver is not available, and will communicate with the caller when available. The platform then contacts with the caller when the receiver is connected to the network, to establish a communication between the caller and the receiver.

In some embodiments, the method can include generating and operating tokens for multiple receivers, such as for a conference call between a caller and multiple receivers, or a parallel and sequential notification to multiple receivers to ensure that there is a receiver available to communicate.

In some embodiments, the method can include generating and operating tokens for one or more other receivers, e.g., a token requester user can request tokens so that callers can communicate with other receivers, and not with the requested user.

In some embodiments, the VoIP service platform can include a data processing system having a network interface configured to be connected to the Internet. The data processing system can be configured to run a program executing the communication method, including registering clients (e.g., users of the platform functioned as receivers of the communication), generating tokens, accepting profiles, and linking the tokens to the IP address of the data processing system, to the receivers, and to the profiles. The data processing system can be configured to accept a communication from callers using the tokens, and connect the callers with the receivers if the callers satisfy the conditions listed in the tokens. The data processing system can be configured to communicate with the callers following the provisions in the profiles.

In some embodiments, the present invention discloses a distributed server configuration for a VoIP service platform, for example, to handle communication using tokens such as QR codes. The distributed server configuration can include multiple data processing systems, in addition to the platform system, which can be configured to connect the callers to the receivers to transfer the communication data, such as voice calls, video calls, and other modes of communication such as texting, messaging, and emailing.

Internet communication, especially video calling, can require large data transfer, and thus, a data processing system acting as the VoIP platform can be overloaded when the number of callers and receivers increase. The bottleneck can be the processing capability of the platform, or the communication medium of the platform, such as the fiber optic cable or the satellite signal transfer bringing data in and out of the platform.

In some embodiments, satellite servers can be added at different locations, e.g., not at the main platform location and thus not share the Internet connection cable with the platform. The satellite servers can be under control of the platform, and can extend the capability of the VoIP service.

In some embodiments, new servers can be added at different locations. The new servers can form a distributed server configuration for the VoIP service. A distributed server can function as a relay server, which can act as an access point or a routing point for a communication route between the caller and the receiver of the VoIP communication service. For example, after verifying that the caller satisfies conditions of the token profile, the platform can select one or more servers of the distributed servers to route the communication between the caller and the receiver.

A difference between a satellite server and a distributed server is that the satellite server is under control of the platform, while the distributed server is not. For example, the relationship between the central server and the distributed servers can be an independent, contract-like, and at-will relationship. For example, the distributed servers can be independent from the central server, such as financial independent, operation independent, service and maintenance independent, functionality and purpose independent from the central server, except for an agreed scope of work with the central server, including an agreement that the distributed servers performs as access points and/or relaying servers for data transmission for the central server.

The distributed servers can operate as an independent contractor, e.g., the distributed servers are solely responsible for how the data transfer will be accomplished, such as the use of equipment, software, and network. For example, the distributed server is responsible for all aspects of maintaining the server operation, including providing network connectivity and servicing all equipment needed for operation, and can simply provide server services to the communication network in a prior agreement with the communication network. The distributed servers can be compensated, as a result of a bargaining with the platform. For example, the distributed servers can be compensated proportionally to the transfer data amount.

As such, the distributed server can be a time-shared data processing system, e.g., a part time server for the communication network which participates in the communication network in a time shared fashion, such as during low load of the main function of the data processing system. For example, a data processing system can have a main function of supporting IT (Information Technology) services in a corporation. The data processing system can participate in the communication network as a distributed server during its off-time, e.g., when the data processing system is free and not busy with the main function of IT support and services. For example, the data processing system can operate as a distributed server after business hours, such as in the evening, on weekends and on holidays.

The distributed servers can operate with an at-will agreement with the central server, e.g., the relationship can be terminate any time, either by the distributed servers or by the central server. In addition, the distributed servers can have flexible operating hours, such as operating as distributed servers when the main load of the distributed servers is light, for example, in the evening or weekends for a distributed server functioned as a computer system for a 9-5 corporation. The distributed servers can operate in a time-shared fashion, for example, time sharing with the load of a distributed server functioned as a computer system for a 9-5 corporation.

The distributed server network can cover many geographical areas, especially business areas, since there can be a data processing system in every business region. Thus, callers and receivers in a same geographic region can be connected in a shorted way possible, instead of in an unpredictable way of the Internet. Further, the distributed server network can reduce congestion for the platform, with the communication data routed through the distributed servers.

The distributed server network can allow a scale up operation, e.g., the ability to grow and to handle more calls without concerning about the data transfer bottleneck.

The platform can select one or more distributed servers as relaying servers. The communication between the caller and the receiver and a distributed server can be through the Internet, or can be direct or through a local area network.

For example, in some cases, a first device and a second device, such as the caller, a distributed server, or the receiver, both can have good connection to the Internet, and thus can be directly connected through the Internet.

In some cases, only one device can have good connection to the Internet. For example, the first device only connected to the second device through a local area network, without the ability to connect to the Internet. The second device can be connected to the same local area network, and also to the Internet. Thus, the first device can be connected to the Internet through the second device.

In some cases, only one device can have good connection to the Internet. For example, the first device can have a poor connection to the Internet, and the second device can have a good connection to the Internet. The second device can broadcast its presence to the first device, such as forming a wifi hotspot for the first device. Thus, the first device can be connected to the Internet through the second device.

In some cases, one device can have good connection to the Internet through its cellular network. For example, the first device can have a poor connection to the Internet, and the second device can use its cellular network to connect to the Internet. The second device can broadcast its presence to the first device, such as forming a wifi hotspot. Thus, the first device can be connected to the Internet by sharing the Internet connection with the second device.

Thus, the distributed server can allow the caller to be connected to the receiver even if either or both caller and receiver have no connection to the Internet.

Figure 41:
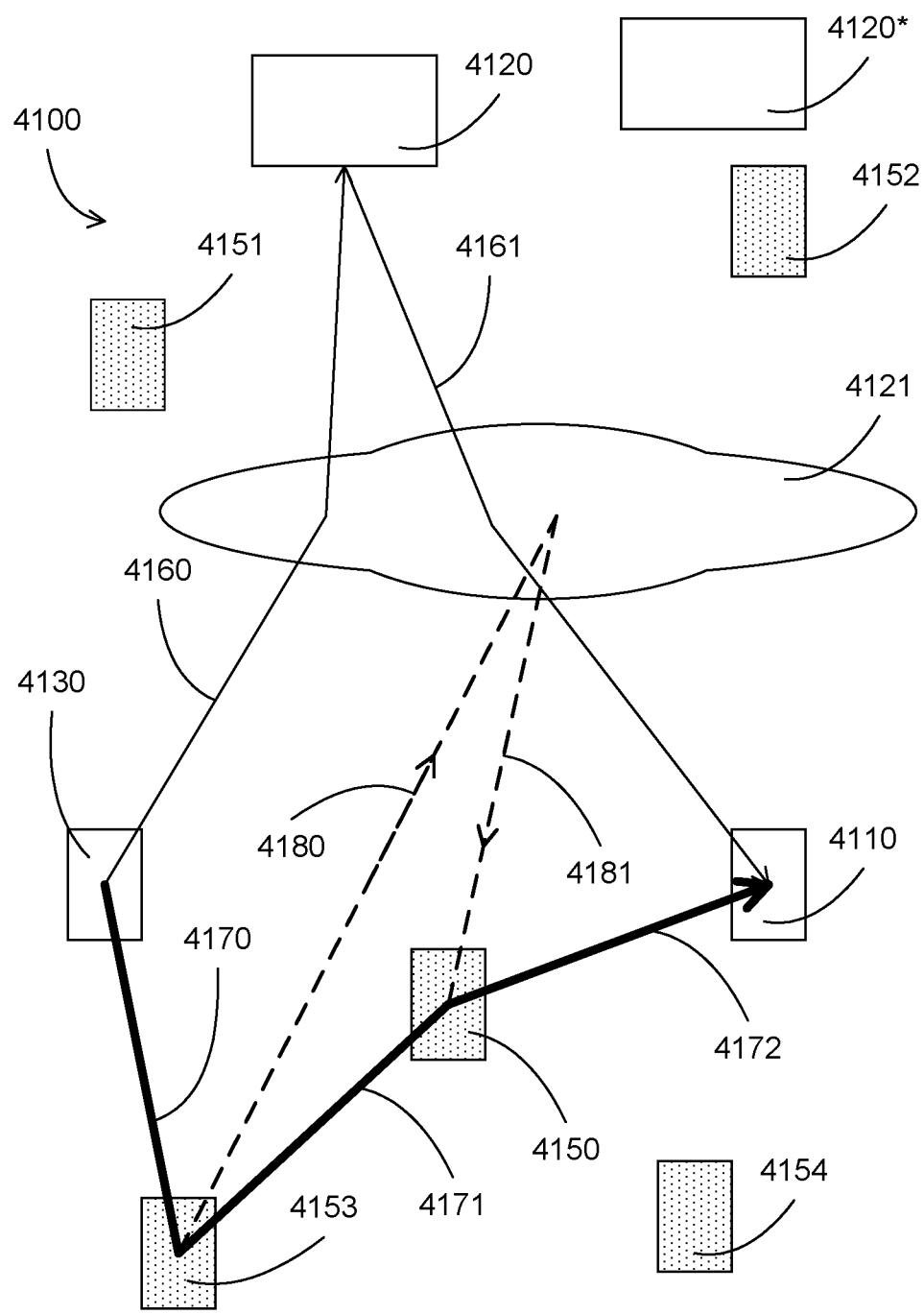
FIG. 41 illustrates a VoIP service having a distributed server network according to some embodiments.

FIG. 41 illustrates a VoIP service having a distributed server network according to some embodiments. The VoIP service 4100 can include a platform 4120, e.g., a central server of the VoIP service, and a satellite server 4120*, which is under control of the platform 4120. The satellite server 4120* can provide a secure and stable relaying server for the communication between callers and receivers.

The VoIP service 4100 can include a distributed server network, which includes distributed servers 4150-4154. A caller 4130 can use a token to contact the platform 4120, in order to be connected with a receiver 4110. The request from the caller 4130 can be sent 4160 to the platform. The platform can then locate the receiver 4110, and send 4161 a notice of requesting communication, such as sending a ring signal, to the receiver 4110. The receiver 4110 can hear a ring in his device, together with an optional display of the caller 4130 identification.

When the receiver 4110 accepts the communication, the platform can connect the caller with the receiver for a communication data exchange. The connection can be through one or more distributed servers 4153 and 4150, e.g., the distributed servers can function as relaying servers to relay the communication data between the members. The selection of servers 4153 and 4150 is based on an optimization of the communication data exchange between the caller and the receiver, as determined by the platform.

For example, the caller 4130 can have limited connectivity to the Internet, such as having no connection or poor connection. The server 4153 can be in a vicinity of the caller, and thus can offer its service as a relay server for the data transfer. For example, the server 4153 can be a cell phone, in a location with no available Internet network. The server then can function as a hotspot, allowing the caller to share its wifi service based on the cellular network. Thus, the caller can be connected 4170 to the server 4153. The server 4153 can be connected 4171 to server 4150 through the Internet, e.g., the communication data can go 4180 through the Internet to reach 4181 the server 4150. The receiver 4110 can also be in an area with no available Internet connection, but can be linked to the server 4150 through a local area network. Thus, the data can be transferred 4172 from the server 4150 to the receiver 4110 through the local area network.

The distributed servers can assist in communication data transfer, for example, when either or both the caller and receiver have not Internet connectivity. The distributed servers can provide fast communication data transfer, for example, due to a selection of local distributed servers, e.g., distributed servers located in a same geographical region as the members. The distributed servers can provide a strong communication link for the communication data transfer, for example, due to a selection of distributed servers having high bandwidth and not busy data lines.

In some embodiments, the platform can decide to route the communication between the caller and the receiver through the platform or through the satellite server, for example, for communication requiring highly stable and always available communication connectivity.

In some embodiments, the present invention discloses processes, and software programs, to make or convert a data processing system into a distributed server, with the ability to channel data in and out of the system while maintaining the security of the system, e.g., keeping the firewall active.

The system can run a software program, which can provide a process to allow a manager, for example, a server of a distributed communication network, to acknowledge that the system is now a distributed server of the distributed communication network.

The distributed server can periodically send signals to the manager to notify the manager of its status, such as its location, e.g., geographical area, its capability, e.g., bandwidth and data transfer speed, and its availability, e.g., that the system is available for data transferring in a time period, together with a port address and the time the port is opened. The location, capability and availability can allow the central server to decide whether to select the distributed server as a relay server for two communication parties. The port address and port open time can allow the central server to bypass the firewall of the distributed server, e.g., to accept data from a party directed by the central server to another party.

If there are not activities, e.g., there is no incoming data directed by central server, the port can be close after the stated time. The open time can be a few seconds, such as less than 100 seconds, less than 60 seconds, less than 30 seconds, or less than 10 seconds. The short opening time can provide a security against intruders through the open port. The port can be close until the next time when the distributed server sends another status signal. The status signals can be sent periodically, e.g., with a time period such as less than a few minutes, less than 1 minutes, or less than 30 seconds. The status signals can be sent randomly, e.g., the time between two consecutive signal sending can be random, to increase security.

Further, the port address can be random, which can prevent intruders to obtain the port address and its open time from observing the operation of the distributed server.

The port is close after the open time, if there is no data transferred to the distributed server during the open port time. If there is data transferred to the distributed server during the open port time, the port can be kept open, until receiving a close port signal. The close port signal can be sent by a party of the communication parties, signifying that the communication is ended. The close port signal can be sent by the central server, after determining that the communication between the parties is ended. The close port signal can be sent by the distributed server, e.g., the distributed server closes its port, if the distributed server decides that the communication is ended, for example, by detecting an end signal from either party or by a long period of inactivity in the communication stream.

The status sending process can be periodic, with a constant period. Alternatively, the process can be repeated using a random time sequence, to improve the security against intruders.

In some embodiments, the present invention discloses a distributed VoIP communication network, and method to operate a distributed communication network, including a central server and multiple independent distributed servers. The distributed servers can repeatably signal the central server about its availability, so that when the central server receive a request for communication between parties, the central server can select one of the multiple distributed servers for data transfer between the parties.

The central server can keep track of the availability of the distributed servers, and can compile a tabulated list, organizing the abilities of the distributed servers, for example, based on locations, capabilities, bandwidth, and speed. The central server can also downgrade the distributed servers that have used some of their resources for the data transfer, such as already acting as a relay server for a voice call or a video call. Thus, when receiving a request for communication, the central server can quickly select a server best suitable for data transfer.

Alternatively, the central server can wait until receiving the request for communication before gathering status from the distributed servers.

In some embodiments, the present invention discloses a distributed server network, and method to operate a distributed server network, which can include a manager server connected to multiple independent distributed servers. The distributed servers can repeatably signal the manager server about its availability, so that the manager server can have an up-to-date status of the distributed servers. Alternatively, the manager server can query the distributed servers to obtain the status of the distributed servers.

The distributed server network can assess the capability and availability of the distributed servers to provide a suitable server acting as a relay server for data transfer. The manager server can manage the distributed servers, e.g., the distributed servers can participate in the distributed server network as independent contractors. For example, the distributed servers can be financial independent, operation independent, and managing independent. The distributed servers can be responsible only for data transfer.

In some embodiments, the manager server can function as a manager for the distributed servers, e.g., representing the distributed servers to a communication network, and recommending the distributed servers to the communication network for data transfer.

The manager server can collect the status signals, and can compile a list of the capability, availability, and location of the distributed servers. The status signals can include identification of open ports, together with the duration of the open time. The distributed servers can have the port open during the stated time, and close otherwise. The distributed servers can repeatedly send status signals, to signal that the port is open, after a time period of close port. The port can be another port, e.g., the port address can be randomly selected. The open port duration can also be randomly selected.

If a distributed server does not send the status signal, the distributed server can be busy, and does not wish to be considered as a relay server at the time.

The status signal can include capability of the server, such as the data transfer rate, the bandwidth, and the open port information including the open port address and open time. Other information can be included, such as the number of video and audio calls that the server are hosting at the time of status signal. Alternatively, the manager server can keep track of this information, as to not overloading the server. For example, a server is best to host one video call, since hosting more than one video calls can strain the bandwidth of the server. A server can host a number of audio calls, such as less than 5 calls, since the data transfer for audio calls is much less than that of the video calls.

In some embodiments, the distributed server network can be coupled to a communication network, which can include a central server connected to multiple members and which can function to provide communication between the members. The coupling between the distributed server network and the communication network can be such that the manager server of the distributed server network is configured to communicate with the central server of the communication network. The manager server can function to supply the central server with a suitable relay server, among the distributed servers of the distributed server network, for communication data transfer between members of the communication network.

For example, upon receiving a request for communication between members of the communication network, the central server can contact the manager server of the distributed server network to supply the identification of the members such as their locations and/or IP addresses and/or network to the manager server. The manager server can look at the capability and availability of the distributed servers, and return a suitable server for the communication. The return message can include the server identification, such as the IP address and the open port of the server. The central server can then direct the members to communicate through the open port at the IP address of the suitable server.

In some embodiments, the distributed server network can also be a communication network. The communication network can be a distributed communication network, e.g., having members and distributed servers reporting to the central server. The central server can assume also the role of the manager server, to manage the distributed servers. The distributed servers can report to the central server, so that the central server can select relaying servers.

In some embodiments, the distributed server network can be independent from the communication network. The central server can first consider using the resources of the communication network as relaying servers, such as using the central server or an auxiliary server, before considering asking the distributed server network for a relay server. Alternatively, the central server can consider all servers, e.g., the servers of the distributed server network and the servers of the communication network, and select the server most suitable for the member communication needs.

Figure 42:
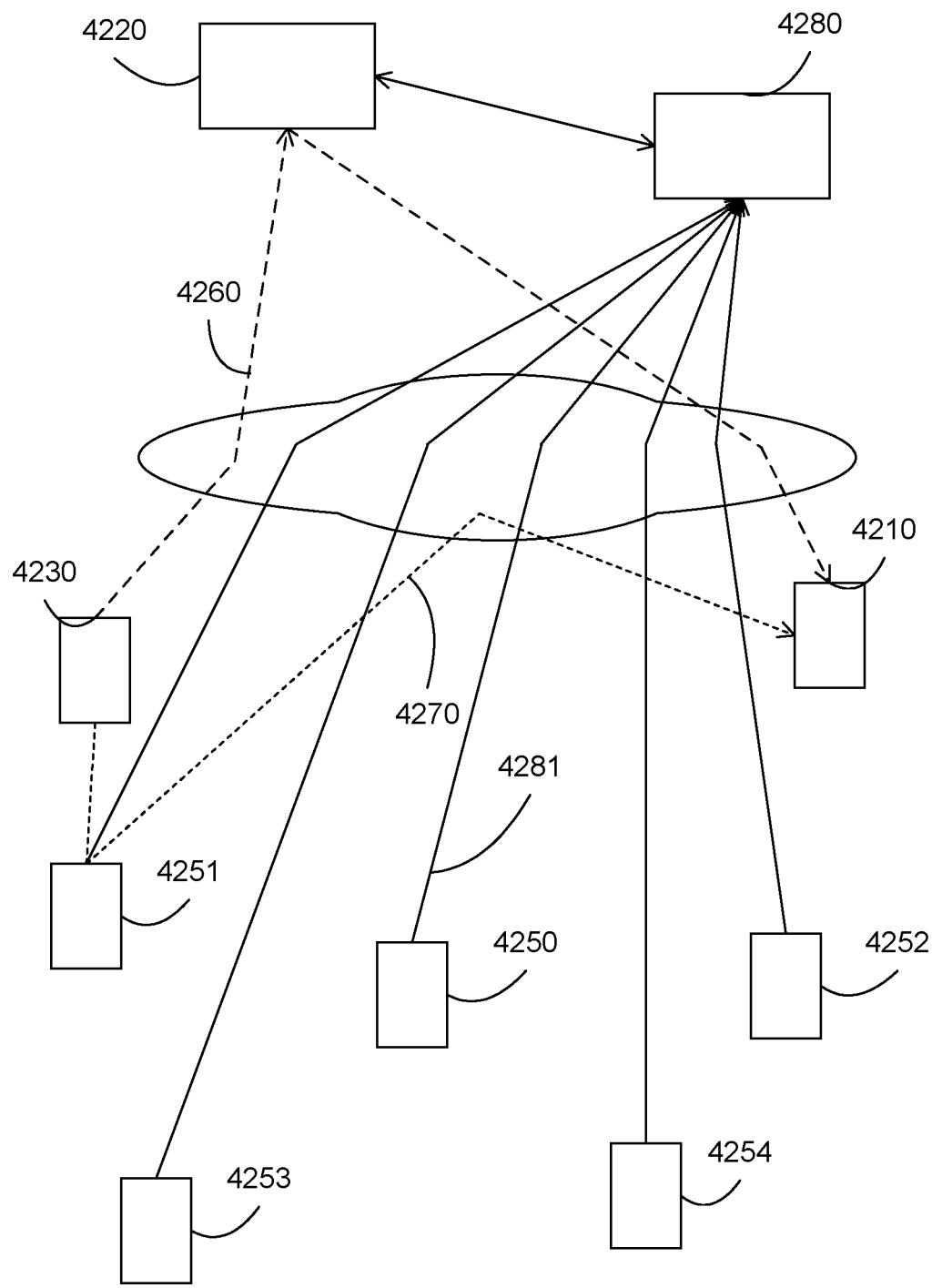
FIG. 42 illustrates a distributed server network according to some embodiments.

FIG. 42 illustrates a distributed server network according to some embodiments. A distributed server can include a manager 4280, which can manage a number of distributed servers 4250-4254, e.g., servers distributed throughout the world and are independent of the manager server. The distributed servers all report to the manager server of the distributed server network, ready to function as relay servers for data transmission. For example, server 4150 can contact 4281 the manager server to report its status, that it is ready for service, and its open port for accepting incoming data.

A data processing system, such as the VoIP platform 4220 or a call center, can use the distributed server network for transferring of communication data. A caller 4230 can contact 4260 the platform 4220, using a token, with a request to communicate with a receiver 4210. The platform can identify the receiver 4210, e.g., locating the IP address of the receiver device, by using the link embedded in the token.

The platform then can contact the manager of a distributed server network, and supply the locations, e.g., IP addresses of the caller and the receiver. The manager can look at the available servers, e.g., servers reported with the manager for their readiness, and determine an optimized communication route 4270 involving suitable servers. The manager then can answer the platform, supplying the IP addresses, including the port information and optionally the port opening time, of the suitable servers forming the optimized route 4270. The platform then connects the caller with the receiver along the optimized route. The optimized route can pass through the Internet, can share the Internet connection with a server, or can be of the same local area network as a server.

The suitable servers can be selected based on locations of the servers, relative to the caller and receiver. For example, if the caller and receiver are located in a same city, the servers located in the same city can be selected. If the caller and receiver are located farther apart, the servers can be located in area to provide a shortest distance of signal travel, or area having a strongest signal to transmit data.

The suitable servers can be selected based on capability of the servers, such as high bandwidth and high transfer rate, e.g., fiber optic cable connection. The capability of the servers can also include the current status of the server, such as the commitment of the servers to the data transmission, or how busy the server can be due to handling other communication transfer assigned by the distributed server network.

For example, a server can have a regular job, such as an IT system in a corporation, and thus cannot commit to a high data transfer rate at certain periods of time. The capability of the server can be degraded, e.g., reduced by a factor related to the assigned resources committed to be the relaying server.

The servers can also already handle a communication data transfer for different members at an earlier time. For example, a server can also be a relaying server for one or more calls between members of the communication network. In this case, the capability of the server can be degraded, e.g., reduced by a factor related to the number of calls, in order to not overloading the server. For example, a server can service a maximum number of one video call, or 5 audio calls. Once the maximum number of calls is exceeded, the server is not suitable for consideration as relaying servers.

The information about the available servers can include information the open port of the servers, such as the port addresses and the open port times.

In some embodiments, the present invention discloses a computer program having machine-readable instructions to cause a processing device to implement any one of the methods described above. The present invention also discloses a machine readable storage, having stored there on a computer program having a plurality of code sections for causing a machine to perform the various steps and/or implement the components and/or structures disclosed herein. In some embodiments, the present invention may also be embodied in a machine or computer readable format, e.g., an appropriately programmed computer, a software program written in any of a variety of programming languages. The software program would be written to carry out various functional operations of the present invention. Moreover, a machine or computer readable format of the present invention may be embodied in a variety of program storage devices, such as a diskette, a hard disk, a CD, a DVD, or a nonvolatile electronic memory. The software program may be run on a variety of devices, including a processor or a processing device to perform any one of the methods described above.

In some embodiments, the methods can be embodied as devices, systems, methods, and/or computer program products, e.g., realized in hardware, software, or a combination of hardware and software. The methods can include computer-implemented methods, using a computer or a data processing system to execute the methods, including executing operations by a hardware processor. The methods can be realized in a centralized fashion in a data processing system, such as a computer system or in a distributed fashion where different elements are spread across several interconnected computer systems. Any kind of computer system or other apparatus adapted for carrying out the methods described herein can be used. A typical combination of hardware and software can be a general-purpose computer system with a computer program that can control the computer system so that the computer system can perform the methods. The methods also can be embedded in a computer program product, which includes the features allowing the implementation of the methods, and which when loaded in a computer system, can perform the methods.

In some embodiments, the present invention discloses a system having a non-transitory memory and one or more hardware processors coupled to the non-transitory memory and configured to read instructions from the non-transitory memory to cause the system to perform operations necessary to perform the methods described above.

In some embodiments, the present invention can take the form of a computer program product on a storage medium having program code embodied in the medium for use by or in connection with an instruction execution system. The storage medium can include any medium that can contain, store, communicate, propagate, or transport the program for use or read by a data processing system, such as a computer.

The terms "computer program", "software", "application", variants and/or combinations thereof, in the context of the present specification, mean any expression, in any language, code or notation, of a set of instructions intended to cause a system having an information processing capability to perform a particular function either directly. The functions can include a conversion to another language, code or notation, or a reproduction in a different material form. For example, a computer program can include a subroutine, a function, a procedure, an object method, an object implementation, an executable application, an applet, a servlet, a source code, an object code, a shared library/dynamic load library and/or other sequence of instructions designed for execution on a data processing system, such as a computer.

In some embodiments, the methods can be implemented using a data processing system, such as a general purpose computer system. A general purpose computer system can include a graphical display monitor with a graphics screen for the display of graphical and textual information, a keyboard for textual entry of information, a mouse for the entry of graphical data, and a computer processor. In some embodiments, the computer processor can contain program code to implement the methods. Other devices, such as a light pen (not shown), can be substituted for the mouse. This general purpose computer may be one of the many types well known in the art, such as a mainframe computer, a minicomputer, a workstation, or a personal computer.

Figure 43A:
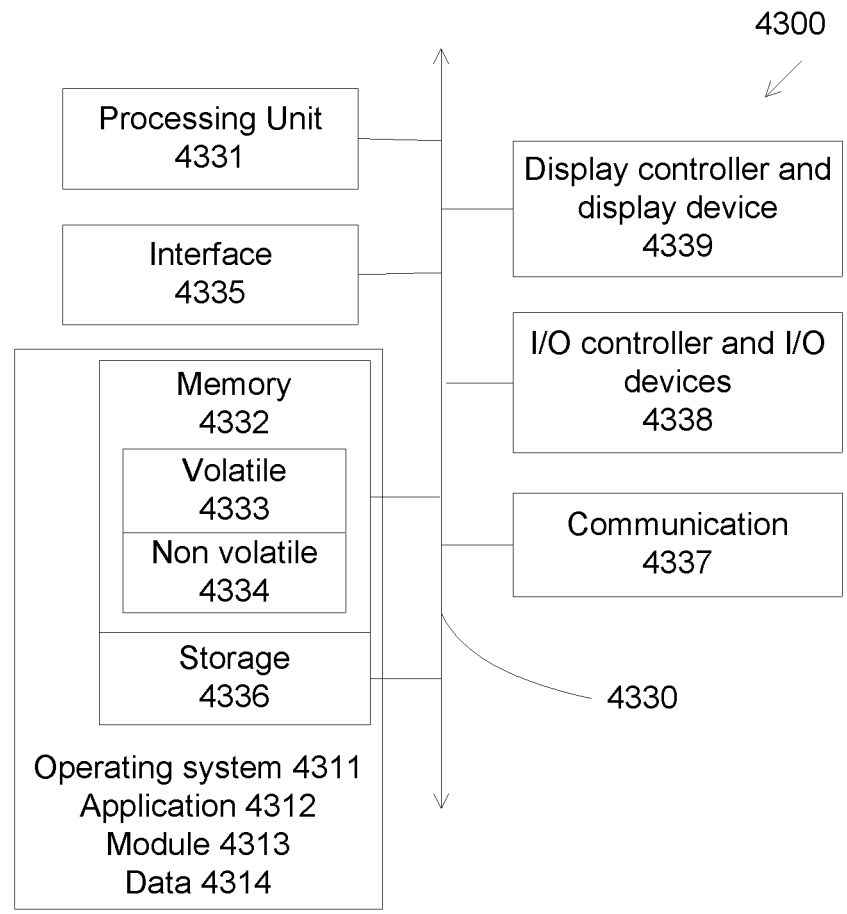
FIGS. 43A-43B illustrate a computing environment according to some embodiments.
Figure 43B:
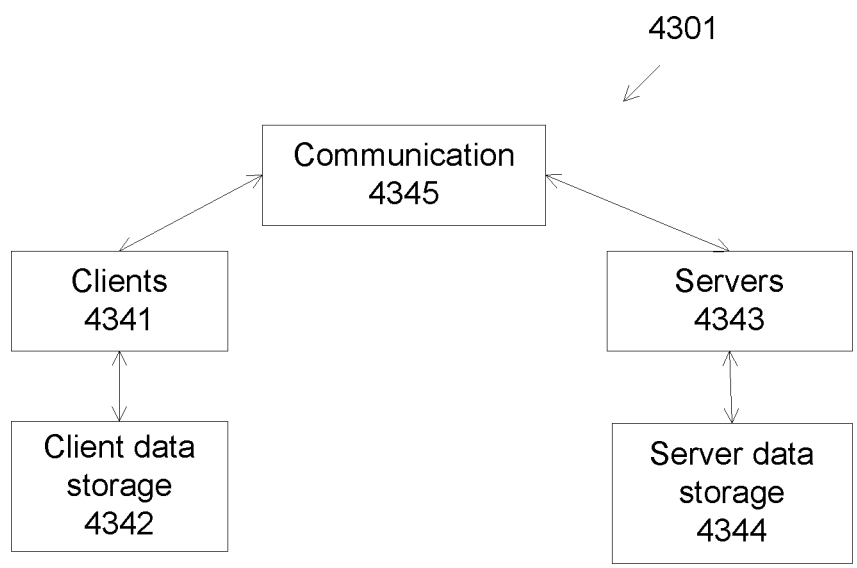

FIGS. 43A-43B illustrate a computing environment according to some embodiments. In FIG. 43A, an environment for implementing various aspects of the invention includes a computer 4301, comprising a processing unit 4331, a system memory 4332, and a system bus 4330. The processing unit 4331 can be any of various available processors, such as single microprocessor, dual microprocessors or other multiprocessor architectures. The system bus 4330 can be any type of bus structures or architectures. The system memory 4332 can include volatile memory 4333 and nonvolatile memory 4334.

Computer 4301 also includes storage media 4336, including removable storage media or nonremovable storage media, and volatile or nonvolatile disk storage. A removable or non-removable interface 4335 can be used to facilitate connection. These storage devices can be considered as part of the I/O device 4338 or at least they can be connected via the bus 4330. Storage devices that are "on board" generally include EEPROM used to store the BIOS.

The computer system 4301 further can include software to operate in the environment, such as an operating system 4311, system applications 4312, program modules 4313 and program data 4314, which are stored either in system memory 4332 or on disk storage 4336. Various operating systems or combinations of operating systems can be used.

Input devices can be used to enter commands or data, and can include a pointing device such as a mouse, stylus, touch pad, and other devices such as keyboard, microphone, connected through interface ports 4338. Interface ports 4338 can include connection ports, such as serial ports, parallel ports, or universal serial buses (USB). The interface ports 4338 can also accommodate output devices. For example, a USB port may be used to provide input to computer 4301 and to output information from computer 4301 to an output device. Output adapter 4339, such as video or sound cards, is provided to connect to some output devices such as monitors, speakers, and printers.

Computer 4301 can operate in a networked environment with remote computers. The remote computers, including a memory storage device, can be a data processing system, such as a personal computer, or a workstation, and typically includes many or all of the elements described relative to computer 4301. Remote computers can be connected to computer 4301 through a network interface 4335 and communication connection 4337, with wire or wireless connections. Network interface 4335 can be communication networks such as local-area networks (LAN), wide area networks (WAN) or wireless connection networks.

FIG. 43B shows a schematic block diagram of a sample computing environment with which the present invention can interact. The system 4300 includes a plurality of client systems 4341. The system 4300 also includes a plurality of servers 4343. The servers 4343 can be used to employ the present invention. The system 4300 includes a communication network 4345 to facilitate communications between the clients 4341 and the servers 4343. Client data storage 4342, connected to client system 4341, can store information locally. Similarly, the server 4343 can include server data storages 4344.

What is claimed is:

1. A method comprising receiving, by a data processing device, a request for a communication token from a first communication device;
    obtaining a network address of the first communication device;
    forming the communication token, wherein the communication token comprises a network address of the data processing device to allow a second communication device to communicate with the data processing device, wherein the communication token comprises a link to the network address of the first communication device to allow the data processing device to locate the first communication device to connect the second communication device with the first communication device;
    sending the communication token to the first communication device;
    receiving a communication from the second communication device using the communication token,
    wherein the communication token comprises a profile listing one or more additional third communication devices to be called, wherein the profile comprises a serial calling flag for the one or more additional third communication devices;
    connecting the second communication device in series with the first communication device and the one or more additional third communication devices;
    stopping the serial connection process when a communication device among the first communication device and the one or more additional third communication devices answers the second communication device.
2. A method as in claim 1
    wherein the communication token comprises a Quick Response (QR) code.
3. A method as in claim 1
    wherein the network address of the data processing device comprises the website address of the data processing device,
    wherein the network address of the first communication device comprises an Internet address.
4. A method as in claim 1 further comprising
    updating the network address of the first communication device when the first communication device changes the network address.
5. A method as in claim 1 further comprising
    receiving a communication from the second communication device using the communication token,
        wherein the communication token comprises a link to a profile,
        wherein the profile comprises conditions imposed by the first communication device on the communication using the communication token;
    retrieving the profile from the communication token;
    locating the first communication device based on the communication token;
    connecting the second communication device with the first communication device subjected to the conditions listed in the profile.
6. A method as in claim 1 further comprising
    obtaining a profile for the communication token from the first communication device,
        wherein the profile comprises conditions imposed by the first communication device on the communication with the second communication device using the communication token;
    forming a link between the communication token and the profile.
7. A method as in claim 1
    wherein the conditions comprise a flag indicating the validity of the communication token, an expiration date, an available time to call, a number of calls, or one or more additional third communication devices to be called.
8. A method as in claim 1 further comprising
    receiving a communication from the second communication device using the communication token,
        wherein the communication token comprises a profile having a flag indicating the validity of the communication token;
    rejecting the communication if the flag indicates that the communication token is not valid or no longer valid.
9. A method as in claim 1 further comprising
    receiving a communication from the second communication device using the communication token,
        wherein the communication token comprises a profile having an expiration date;
    rejecting the communication if the communication occurs later than the expiration date.
10. A method as in claim 1 further comprising
    receiving a communication from the second communication device using the communication token,
        wherein the communication token comprises a profile having an available time to call;
    rejecting the communication if the communication occurs outside of the available time to call.
11. A method as in claim 1 further comprising
    receiving a communication from the second communication device using the communication token,
        wherein the communication token comprises a profile having a number of calls;
    rejecting the communication if the number of communication from the second communication device is more than the number of calls.
12. A method as in claim 1 further comprising
    receiving a communication from the second communication device using the communication token, wherein the communication token comprises a profile listing one or more additional third communication devices to be called, wherein the profile comprises a parallel calling flag for the one or more additional third communication devices;

connecting the second communication device in parallel with the first communication device and the one or more additional third communication devices;

stopping the parallel connection process when a communication device among the first communication device and the one or more additional third communication devices answers the second communication device.

13. A method as in claim 1 further comprising receiving a communication from the second communication device using the communication token, wherein the communication token comprises a profile listing one or more additional third communication devices to be called, wherein the profile comprises a conference call flag for the one or more additional third communication devices;

connecting the second communication device with the first communication device and the one or more additional third communication devices.

14. A method as in claim 1 further comprising receiving a communication from the second communication device using the communication token, wherein the communication token comprises a profile comprising an outgoing message or a file to be retrieved;

sending the second communication device the outgoing message, the file to be retrieved, or a link to the file to be retrieved.

15. A method comprising receiving, by a data processing device, a request for a communication token from a first communication device;

obtaining a profile for the communication token from the first communication device, wherein the profile comprises conditions imposed by the first communication device on communication using the communication token;

forming the communication token, wherein the communication token comprises a network address of the data processing device to allow a second communication device to communicate with the data processing device, wherein the communication token comprises a link to network addresses of one or more third communication devices to allow the data processing device to locate the one or more third communication devices to connect the second communication device with the one or more third communication devices, wherein the communication token comprises a link to the profile; sending the communication token to the first communication device;

receiving a communication from the second communication device using the communication token, wherein the communication token comprises a profile listing one or more additional third communication devices to be called, wherein the profile comprises a serial calling flag for the one or more additional third communication devices;

connecting the second communication device in series with the first communication device and the one or more additional third communication devices;

stopping the serial connection process when a communication device among the first communication device and the one or more additional third communication devices answers the second communication device.

16. A method as in claim 15 further comprising receiving registration from the one or more third communication devices, wherein the registration comprises obtaining network addresses of the one or more third communication devices.

17. A method as in claim 15 further comprising receiving a communication from the second communication device using the communication token;

retrieving the profile from the communication token;

retrieving the network addresses of the one or more third communication devices from the communication token;

locating the one or more third communication devices based on the network addresses of the one or more third communication devices;

connecting the second communication device with the one or more third communication devices subjected to the conditions listed in the profile.

18. A system comprising: a data processing device including a processor and a memory in communication with the processor and for use in storing data and machine instructions that causes the processor to perform operations comprising receiving a request for a communication token from a first communication device; forming the communication token, wherein the communication token comprises a network address of the data processing device to allow the second communication device to communicate with the data processing device, wherein the communication token comprises a link to network addresses of at least one of the first communication device or one or more third communication devices to allow the data processing device to locate the first communication device or the one or more third communication devices to connect the second communication device with the first communication device or the one or more third communication devices; sending the communication token to the first communication device;

receiving a communication from the second communication device using the communication token, wherein the communication token comprises a profile listing one or more additional third communication devices to be called, wherein the profile comprises a serial calling flag for the one or more additional third communication devices;

connecting the second communication device in series with the first communication device and the one or more additional third communication devices;

stopping the serial connection process when a communication device among the first communication device and the one or more additional third communication devices answers the second communication device.

19. A method as in claim 18 further comprising obtaining network addresses of at least one of the first communication device or the one or more third communication devices.

* * * * *